(12) United States Patent
Masuda et al.

(10) Patent No.: US 10,027,891 B2
(45) Date of Patent: *Jul. 17, 2018

(54) DISTANCE MEASUREMENT DEVICE, DISTANCE MEASUREMENT CONTROL METHOD, AND DISTANCE MEASUREMENT CONTROL PROGRAM

(71) Applicant: FUJIFILM CORPORATION, Minato-ku, Tokyo (JP)

(72) Inventors: Tomonori Masuda, Saitama (JP); Masaaki Orimoto, Saitama (JP); Hiroshi Tamayama, Saitama (JP); Chikara Yamamoto, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,287

(22) Filed: Sep. 15, 2017

(65) Prior Publication Data

US 2018/0007271 A1 Jan. 4, 2018

Related U.S. Application Data

(63) Continuation of application No. PCT/JP2015/081050, filed on Nov. 4, 2015.

(30) Foreign Application Priority Data

Mar. 20, 2015 (JP) ................................. 2015-057911

(51) Int. Cl.
*H04N 5/232* (2006.01)
*G01S 17/08* (2006.01)
(Continued)

(52) U.S. Cl.
CPC ......... *H04N 5/23267* (2013.01); *G01S 17/08* (2013.01); *H04N 5/23251* (2013.01);
(Continued)

(58) Field of Classification Search
CPC .................................................. H04N 5/23267
See application file for complete search history.

(56) References Cited

U.S. PATENT DOCUMENTS

| 6,069,656 A | 5/2000 | Silver |
| 2004/0046953 A1 | 3/2004 | Nagata et al. |

(Continued)

FOREIGN PATENT DOCUMENTS

| JP | H04-261278 A | 9/1992 |
| JP | 2004-101342 | 4/2004 |

(Continued)

OTHER PUBLICATIONS

International Search Report issued in International Application No. PCT/JP2015/081050 dated Feb. 2, 2016.
(Continued)

*Primary Examiner* — Tung Vo
*Assistant Examiner* — Rowina Cattungal
(74) *Attorney, Agent, or Firm* — SOLARIS Intellectual Property Group, PLLC

(57) ABSTRACT

A distance measurement device includes an emission unit, a detection unit, a first reduction unit that reduces, based on a detection result of the detection unit, influence of variation of an optical axis of the image formation optical system on the subject image received as light by the light receiving section, a second reduction unit that reduces variation of an optical axis of the directional light with respect to the subject based on the detection result of the detection unit, and a control unit that, in the case of operating the first reduction unit and the second reduction unit at the same time, controls
(Continued)

the first reduction unit and the second reduction unit to reduce variation of an irradiation position of the directional light in the subject image received as light by the light receiving section.

19 Claims, 24 Drawing Sheets

(51) Int. Cl.
    *G01S 7/481*     (2006.01)
    *G01S 7/497*     (2006.01)

(52) U.S. Cl.
    CPC ........ *H04N 5/23287* (2013.01); *G01S 7/4814* (2013.01); *G01S 7/497* (2013.01); *H04N 5/23293* (2013.01); *H04N 5/23296* (2013.01)

(56) References Cited

U.S. PATENT DOCUMENTS

| | | |
|---|---|---|
| 2008/0043333 A1 | 2/2008 | Hirakawa et al. |
| 2009/0119050 A1 | 5/2009 | Hayashi |
| 2012/0133917 A1 | 5/2012 | Tiefenthaler et al. |
| 2015/0362588 A1 | 12/2015 | Ohmuro et al. |
| 2017/0234974 A1 | 8/2017 | Mochizuki |

FOREIGN PATENT DOCUMENTS

| | | | |
|---|---|---|---|
| JP | 2008-46415 A | 2/2008 | |
| JP | 2009-109458 A | 5/2009 | |
| JP | 2009-270856 A | 11/2009 | |
| JP | 2012-118076 A | 6/2012 | |
| WO | 2009270856 A * | 11/2009 | ............... G01C 3/06 |
| WO | 2014/129210 A1 | 8/2014 | |
| WO | WO2014129210 A1 * | 8/2014 | ............ G01S 17/10 |
| WO | 2016/030925 A1 | 3/2016 | |

OTHER PUBLICATIONS

Written Opinion of the ISA issued in International Application No. PCT/JP2015/081050 dated Feb. 2, 2016.
English language translation of the following: Office action dated Jan. 9, 2018 from the JPO in a Japanese patent application No. 2017-507326 corresponding to the instant patent application. This office action translation is submitted now in order to supplement the understanding of the cited reference which is being disclosed in the instant Information Disclosure Statement.

* cited by examiner

DISTANCE MEASUREMENT DEVICE, DISTANCE MEASUREMENT CONTROL METHOD, AND DISTANCE MEASUREMENT CONTROL PROGRAM

CROSS-REFERENCE TO RELATED APPLICATION

This application is a continuation application of International Application No. PCT/JP2015/081050, filed Nov. 4, 2015, the disclosure of which is incorporated herein by reference in its entirety. Further, this application claims priority from Japanese Patent Application No. 2015-057911 filed Mar. 20, 2015, the disclosure of which is incorporated herein by reference in its entirety.

BACKGROUND OF THE INVENTION

1. Field of the Invention

The technology of the present disclosure relates to a distance measurement device, a distance measurement control method, and a distance measurement control program.

2. Description of the Related Art

Known is a distance measurement device that measures distance based on a round-trip time of laser light emitted by an emission unit toward a subject assumed as a distance measurement target by a user. In the distance measurement device, a subject image that is formed and acquired by incidence of reflective light from the subject on an image formation optical system is visually recognized by the user through a finder.

Typically, in the case of measuring distance by the distance measurement device, the distance measurement device is used in a state of being gripped by the user. In this state, in the case of occurrence of a hand shake (shake) that is a phenomenon of vibration of the distance measurement device by transmission of vibration of a hand of the user, an optical axis of the image formation optical system included in the distance measurement device varies along with the hand shake. In addition, in the case of the distance measurement device being mounted in a vehicle, transmission of vibration of the vehicle may vibrate the distance measurement device and vary the optical axis of the image formation optical system. In addition, the optical axis of the image formation optical system may vary due to transmission of vibration to the distance measurement device from an external device that is used as being connected to the distance measurement device. Furthermore, the optical axis of the image formation optical system may vary due to vibration of an internal device (for example, a motor) that is mounted in the distance measurement device. Variation of the optical axis means, for example, inclination of the optical axis with respect to a reference axis (for example, the optical axis before occurrence of the hand shake).

An image shake that is a phenomenon of shifting of the subject image from a reference position (for example, the position of the subject image that is acquired in the state of absence of the hand shake) occurs if the optical axis of the image formation optical system varies. The image shake is visually recognized by the user through, for example, the subject image acquired from the image formation optical system through the finder or a picture imaged and acquired by an imaging element and hinders a work of aiming at the subject of the distance measurement target.

As a method for reducing such an image shake, considered is, for example, a method of applying an image shake reduction mechanism mounted in a commercially available imaging device to the distance measurement device.

Generally, the user visually recognizes the subject image through the finder, aims at the subject of the distance measurement target assuming that the center of the subject image is irradiated with laser light, and provides the distance measurement device with an instruction to initiate distance measurement, thereby causing a laser diode to emit the laser light. However, for example, if the hand shake occurs, not only an image shake but also a phenomenon of variation of the optical axis of the laser light with respect to the subject (laser shake) occurs. Thus, even if the image shake is reduced by the image shake reduction mechanism, what may happen is shifting of an irradiation position of the laser light from the center of the subject image, which is the position intended by the user, in the subject image visually recognized by the user. The "irradiation position" refers to, for example, a position in the subject where the laser light hits.

In JP2009-270856A, disclosed is a distance measurement device including a shake reduction function that reduces the image shake and the laser shake. In the distance measurement device disclosed in JP2009-270856A, an optical path on which the optical axis of the image formation optical system coincides with the optical axis of the laser light exists, and an anti-shake lens disposed on the common optical path performs an anti-shake operation, thereby reducing the image shake and the laser shake.

SUMMARY OF THE INVENTION

However, the distance measurement device disclosed in JP2009-270856A assumes a configuration in which the optical axis of the image formation optical system coincides with the optical axis of the laser light, and the shake reduction function does not effectively work for a configuration in which the optical axis of the image formation optical system does not coincide with the optical axis of the laser light (optical axis non-coincidence type configuration).

For the optical axis non-coincidence type configuration, it is considered to reduce the image shake and the laser shake individually by using the image shake reduction mechanism mounted in a commercially available imaging device. However, if an operation of reducing the image shake and an operation of reducing the laser shake are performed regardless of each other, the irradiation position of the laser light in the subject image may be shifted, by the operation of reducing the image shake, from a position where the irradiation position is supposed to be present. The "position where the irradiation position is supposed to be present" refers to, for example, the center of the subject image. The same problem may arise not only with the laser light but also with directional light that is light having directivity.

One embodiment of the present invention provides a distance measurement device, a distance measurement control method, and a distance measurement control program that, compared with the case of performing an operation of reducing influence of variation of an optical axis of an image formation optical system on a subject image and an operation of reducing variation of an optical axis of directional light with respect to a subject regardless of each other, can reduce shifting, by the operation of reducing influence of variation of the optical axis of the image formation optical system on the subject image, of an irradiation position of the directional light from a position where the irradiation position is supposed to be present in the subject image.

A distance measurement device according to a first aspect of the present invention comprises a light receiving section that receives reflective light from a subject as a subject image through an image formation optical system, an emission unit that has a light emitting element emitting directional light which is light having directivity, and emits the directional light toward the subject on a different optical path from an optical path of the image formation optical system, a detection unit that detects variation exerted on the device, a first reduction unit that is any of a single mechanism and a subject image processing unit and reduces, based on a detection result of the detection unit, influence of variation of an optical axis of the image formation optical system on the subject image received as light by the light receiving section, a second reduction unit that reduces variation of an optical axis of the directional light with respect to the subject based on the detection result of the detection unit, and a control unit that, in the case of operating the first reduction unit and the second reduction unit at the same time, controls the first reduction unit and the second reduction unit to reduce variation of an irradiation position of the directional light in the subject image received as light by the light receiving section.

Accordingly, the distance measurement device according to the first aspect of the present invention can reduce shifting, by an operation of reducing influence of variation of the optical axis of the image formation optical system on the subject image, of the irradiation position of the directional light from a position where the irradiation position is supposed to be present in the subject image, compared with the case of performing an operation of reducing influence of variation of the optical axis of the image formation optical system on the subject image and an operation of reducing variation of the optical axis of the directional light with respect to the subject regardless of each other.

A distance measurement device according to a second aspect of the present invention is such that in the distance measurement device according to the first aspect of the present invention, the control unit controls the first reduction unit to reduce influence of variation of the optical axis of the image formation optical system on the subject image with a first reduction amount determined in accordance with the detection result of the detection unit and a reduction result of the first reduction unit and, in the case of operating the first reduction unit and the second reduction unit at the same time, controls the second reduction unit to reduce variation of the optical axis of the directional light with respect to the subject with a second reduction amount determined in accordance with the reduction result of the first reduction unit and a reduction result of the second reduction unit.

Accordingly, with a simple configuration, the distance measurement device according to the second aspect of the present invention, compared with the case of performing a control to reduce variation of the optical axis of the directional light with respect to the subject with the second reduction amount determined in accordance with the detection result of the detection unit and the reduction result of the second reduction unit, can reduce shifting, by an operation of reducing influence of variation of the optical axis of the image formation optical system on the subject image, of the irradiation position of the directional light from the position where the irradiation position is supposed to be present in the subject image.

A distance measurement device according to a third aspect of the present invention is such that in the distance measurement device according to the first aspect of the present invention, the control unit controls the first reduction unit to reduce influence of variation of the optical axis of the image formation optical system on the subject image with a first reduction amount determined in accordance with the detection result of the detection unit and a reduction result of the first reduction unit and, in the case of operating the first reduction unit and the second reduction unit at the same time, controls the second reduction unit to reduce variation of the optical axis of the directional light with respect to the subject with a second reduction amount determined in accordance with the detection result of the detection unit and a reduction result of the second reduction unit.

Accordingly, with high accuracy, the distance measurement device according to the third aspect of the present invention, compared with the case of performing a control to reduce variation of the optical axis of the directional light with respect to the subject with the second reduction amount determined in accordance with the reduction result of the first reduction unit and the reduction result of the second reduction unit, can reduce shifting, by an operation of reducing influence of variation of the optical axis of the image formation optical system on the subject image, of the irradiation position of the directional light from the position where the irradiation position is supposed to be present in the subject image.

A distance measurement device according to a fourth aspect of the present invention further comprises, in the distance measurement device according to the second aspect or the third aspect of the present invention, a view angle changing unit that changes an angle of view of the subject image, in which the first reduction amount is determined in accordance with the detection result of the detection unit, the reduction result of the first reduction unit, and an amount of change in the angle of view by the view angle changing unit.

Accordingly, with high accuracy, the distance measurement device according to the fourth aspect of the present invention, compared with the case of determining the first reduction amount without considering the amount of change in the angle of view by the view angle changing unit, can reduce shifting, by an operation of reducing influence of variation of the optical axis of the image formation optical system on the subject image, of the irradiation position of the directional light from the position where the irradiation position is supposed to be present in the subject image, even if the angle of view is changed.

A distance measurement device according to a fifth aspect of the present invention is such that in the distance measurement device according to the fourth aspect of the present invention, the control unit, based on the first reduction amount acquired by change in the angle of view by the view angle changing unit, the second reduction amount, an allowed range of the first reduction amount, an allowed range of the second reduction amount, an operable range of the first reduction unit, and an operable range of the second reduction unit, controls the first reduction unit to reduce influence of variation of the optical axis of the image formation optical system on the subject image and controls the second reduction unit to reduce variation of the optical axis of the directional light with respect to the subject.

Accordingly, the distance measurement device according to the fifth aspect of the present invention can reduce a difference between the degree of reduction by the first reduction unit and the degree of reduction by the second reduction unit, compared with the case of reduction by the first reduction unit and the second reduction unit without considering the first reduction amount acquired by change in the angle of view, the second reduction amount, the allowed range of the first reduction amount, the allowed range of the second reduction amount, the operable range of the first reduction unit, and the operable range of the second reduction unit.

A distance measurement device according to a sixth aspect of the present invention is such that in the distance measurement device according to any one of the first aspect to the fifth aspect of the present invention, the single mechanism is a first anti-shake lens mechanism that includes a first anti-shake lens disposed on the optical path of the image formation optical system and a first lens variation mechanism varying the first anti-shake lens.

Accordingly, the distance measurement device according to the sixth aspect of the present invention can reduce variation of the optical axis of the image formation optical system with a simple configuration, compared with the case of reducing variation of the optical axis of the image formation optical system by using a plurality of mechanisms.

A distance measurement device according to a seventh aspect of the present invention is such that in the distance measurement device according to any one of the first aspect to the sixth aspect of the present invention, the subject image processing unit is a subject image processing unit that processes the subject image by performing signal processing for the subject image.

Accordingly, the distance measurement device according to the seventh aspect of the present invention can reduce influence of variation of the optical axis of the image formation optical system on the subject image with a simple configuration, compared with the case of not having the subject image processing unit.

A distance measurement device according to an eighth aspect of the present invention is such that in the distance measurement device according to any one of the first aspect to the seventh aspect of the present invention, the second reduction unit is at least one of a second anti-shake lens mechanism that includes a second anti-shake lens disposed on a different optical path from the optical path of the image formation optical system and a second lens variation mechanism varying the second anti-shake lens, or a light emitting element variation mechanism that varies the light emitting element.

Accordingly, the distance measurement device according to the eighth aspect of the present invention can reduce variation of the optical axis of the directional light with respect to the subject with a simple configuration, compared with the case of the second reduction unit not being the second anti-shake lens mechanism including the second anti-shake lens and the second lens variation mechanism nor being the light emitting element variation mechanism.

A distance measurement device according to a ninth aspect of the present invention is such that in the distance measurement device according to any one of the first aspect to the eighth aspect of the present invention, the control unit, during operation of the first reduction unit, controls the second reduction unit to reduce variation of the optical axis of the directional light with respect to the subject within a range of a reduction amount of the first reduction unit.

Accordingly, with high accuracy, the distance measurement device according to the ninth aspect of the present invention, compared with the case of performing a control to reduce variation of the optical axis of the directional light with respect to the subject without considering the reduction amount of the first reduction unit, can reduce shifting, by an operation of reducing influence of variation of the optical axis of the image formation optical system on the subject image, of the irradiation position of the directional light from the position where the irradiation position is supposed to be present in the subject image, during operation of the first reduction unit.

A distance measurement device according to a tenth aspect of the present invention is such that in the distance measurement device according to any one of the first aspect to the ninth aspect of the present invention, the control unit, during operation of the first reduction unit, controls the second reduction unit not to operate the second reduction unit outside of a distance measurement operation period and to operate the second reduction unit within the di stance measurement operation period.

Accordingly, the distance measurement device according to the tenth aspect of the present invention can reduce power consumption, compared with the case of operating the second reduction unit at all times during operation of the first reduction unit.

A distance measurement device according to an eleventh aspect of the present invention is such that in the distance measurement device according to any one of the first aspect to the tenth aspect of the present invention, the control unit, during operation of the first reduction unit, controls the second reduction unit to reduce operation of the second reduction unit in a case of working of a scan distance measurement function that measures distance while scanning the directional light.

Accordingly, the distance measurement device according to the eleventh aspect of the present invention can reduce occurrence of the actual scan range of the directional light being narrower than an intended scan range of a user, compared with the case of not reducing operation of the second reduction unit during operation of the first reduction unit independently of working of the scan distance measurement function.

A distance measurement device according to a twelfth aspect of the present invention is such that in the distance measurement device according to any one of the first aspect to the eleventh aspect of the present invention, the image formation optical system has a zoom lens, and the control unit, in a case of change in an angle of view by movement of the zoom lens, performs a control to maintain, before and after change in the angle of view, an irradiation position of the directional light in the subject image received as light by the light receiving section.

Accordingly, the distance measurement device according to the twelfth aspect of the present invention, compared with the case of a relative positional relationship between the optical axis of the image formation optical system and the zoom lens being fixed independently of movement of the zoom lens, can reduce shifting, by an operation of reducing influence of the variation of the optical axis of the image formation optical system on the subject image, of the irradiation position of the directional light from the position where the irradiation position is supposed to be present in the subject image, even if the zoom lens is moved.

A distance measurement device according to a thirteenth aspect of the present invention is such that in the distance measurement device according to any one of the first aspect to the twelfth aspect of the present invention, the light receiving section is an observation optical system.

Accordingly, the distance measurement device according to the thirteenth aspect of the present invention, compared with the case of not having the observation optical system, can cause the user to visually recognize the subject image with reduction of shifting, by an operation of reducing influence of the variation of the optical axis of the image formation optical system on the subject image, of the irradiation position of the directional light from the position where the irradiation position is supposed to be present in the subject image.

A distance measurement device according to a fourteenth aspect of the present invention is such that in the distance measurement device according to the thirteenth aspect of the present invention, the control unit, in a case of operating the single mechanism and the second reduction unit at the same time, controls the single mechanism and the second reduction unit to reduce variation of an irradiation position of the directional light in the subject image received as light by the observation optical system.

Accordingly, the distance measurement device according to the fourteenth aspect of the present invention, compared with the case of not controlling the single mechanism and the second reduction unit to reduce variation of the irradiation position of the directional light in the subject image received as light by the observation optical system, can reduce shifting, by operation of the single mechanism that is an operation of reducing influence of variation of the optical axis of the image formation optical system on the subject image, of the irradiation position of the directional light from the position where the irradiation position is supposed to be present in the subject image.

A distance measurement device according to a fifteenth aspect of the present invention is such that in the distance measurement device according to any one of the first aspect to the twelfth aspect of the present invention, the light receiving section is an imaging element that picks up the subject image.

Accordingly, the distance measurement device according to the fifteenth aspect of the present invention, compared with the case of not having the imaging element, can acquire a picture with reduction of shifting, by an operation of reducing influence of the variation of the optical axis of the image formation optical system on the subject image, of the irradiation position of the directional light from the position where the irradiation position is supposed to be present in the subject image.

A distance measurement device according to a sixteenth aspect of the present invention is such that in the distance measurement device according to the fifteenth aspect of the present invention, the single mechanism is an imaging element variation mechanism that varies the imaging element.

Accordingly, the distance measurement device according to the sixteenth aspect of the present invention, compared with the case of disposing an anti-shake lens on the optical path of the image formation optical system, can reduce shifting, by an operation of reducing influence of variation of the optical axis of the image formation optical system on the subject image, of the irradiation position of the directional light from the position where the irradiation position is supposed to be present in the subject image, without posing limitation to the degree of freedom in design of the image formation optical system.

A distance measurement device according to a seventeenth aspect of the present invention is such that in the distance measurement device according to the fifteenth aspect or the sixteenth aspect of the present invention, the control unit controls the single mechanism and the subject image processing unit to operate the single mechanism as the first reduction unit in a case of imaging a still picture by the imaging element and to operate the subject image processing unit as the first reduction unit in a case of imaging a motion picture by the imaging element.

Accordingly, the distance measurement device according to the seventeenth aspect of the present invention can reduce power consumption, compared with the case of operating the single mechanism as the first reduction unit independently of whether a still picture is imaged or a motion picture is imaged.

A distance measurement device according to an eighteenth aspect of the present invention is such that in the distance measurement device according to any one of the fifteenth aspect to the seventeenth aspect of the present invention, the control unit, during operation of the first reduction unit, controls the second reduction unit to operate the second reduction unit per interval that is determined in accordance with a frame rate of a picture imaged and acquired by the imaging element.

Accordingly, with simple control, the distance measurement device according to the eighteenth aspect of the present invention, compared with the case of operating the second reduction unit at an irrelevant timing to the frame rate, can reduce shifting, by an operation of reducing influence of variation of the optical axis of the image formation optical system on the subject image, of the irradiation position of the directional light from the position where the irradiation position is supposed to be present in the subject image.

A distance measurement device according to a nineteenth aspect of the present invention is such that in the distance measurement device according to any one of the fifteenth aspect to the eighteenth aspect of the present invention, the control unit controls a display unit that displays a picture imaged and acquired by the imaging element, to display, in a display region of the picture, a distance measurement result that is acquired based on a round-trip time of the directional light emitted toward the subject by the emission unit.

Accordingly, the distance measurement device according to the nineteenth aspect of the present invention, compared with the case of not displaying the distance measurement result in the display region of the picture, can cause the user to easily recognize, along with the corresponding picture, the distance measurement result that is acquired in a situation where shifting, by an operation of reducing influence of variation of the optical axis of the image formation optical system on the picture, of the irradiation position of the directional light from the position where the irradiation position is supposed to be present in the picture is reduced.

A distance measurement control method according to a twentieth aspect of the present invention comprises, for a distance measurement device including a light receiving section that receives reflective light from a subject as a subject image through an image formation optical system, an emission unit that has a light emitting element emitting directional light which is light having directivity, and emits the directional light toward the subject on a different optical path from an optical path of the image formation optical system, a detection unit that detects variation exerted on the device, a first reduction unit that is any of a single mechanism and a subject image processing unit and reduces, based on a detection result of the detection unit, influence of variation of an optical axis of the image formation optical system on the subject image received as light by the light receiving section, and a second reduction unit that reduces variation of an optical axis of the directional light with respect to the subject based on the detection result of the detection unit, in a case of operating the first reduction unit and the second reduction unit included in the distance measurement device at the same time, controlling the first reduction unit and the second reduction unit to reduce variation of an irradiation position of the directional light in the subject image received as light by the light receiving section.

Accordingly, according to the distance measurement control method according to the twentieth aspect of the present invention, the same effect as the distance measurement device according to the first aspect of the present invention can be achieved.

A distance measurement control program according to a twenty-first aspect of the present invention is a distance measurement control program for a distance measurement device including a light receiving section that receives reflective light from a subject as a subject image through an image formation optical system, an emission unit that has a light emitting element emitting directional light which is light having directivity, and emits the directional light toward the subject on a different optical path from an optical path of the image formation optical system, a detection unit that detects variation exerted on the device, a first reduction unit that is any of a single mechanism and a subject image processing unit and reduces, based on a detection result of the detection unit, influence of variation of an optical axis of the image formation optical system on the subject image received as light by the light receiving section, and a second reduction unit that reduces variation of an optical axis of the directional light with respect to the subject based on the detection result of the detection unit, the program causing a computer to execute a process, the process comprising, in a case of operating the first reduction unit and the second reduction unit included in the distance measurement device at the same time, controlling the first reduction unit and the second reduction unit to reduce variation of an irradiation position of the directional light in the subject image received as light by the light receiving section.

Accordingly, according to the distance measurement control program according to the twenty-first aspect of the present invention, the same effect as the distance measurement device according to the first aspect of the present invention can be achieved.

According to one embodiment of the present invention, achieved is an effect that can reduce shifting, by an operation of reducing influence of variation of the optical axis of the image formation optical system on the subject image, of the irradiation position of the directional light from the position where the irradiation position is supposed to be present in the subject image, compared with the case of performing an operation of reducing influence of variation of the optical axis of the image formation optical system on the subject image and an operation of reducing variation of the optical axis of the directional light with respect to the subject regardless of each other.

DESCRIPTION OF THE PREFERRED EMBODIMENTS

Hereinafter, one example of embodiments according to the technology of the present disclosure will be described in accordance with the appended drawings. In the present embodiments, "distance measurement" refers to measurement of a distance to a subject as a measurement target. In addition, in the present embodiments, "approximately perpendicular" refers to perpendicularity having a meaning that includes errors within an allowed range, and "approximately parallel" refers to parallelism having a meaning that includes errors within an allowed range.

[First Embodiment]

A distance measurement device 10A (refer to FIG. 1) according to a first embodiment includes a distance measurement system function that emits distance measurement laser light to measure distance, and an imaging system function that performs imaging.

The distance measurement device 10A has a normal mode and a scan mode as operating modes of a distance measurement system that utilizes the distance measurement system function. The normal mode is an operating mode that performs one measurement sequence (refer to FIG. 2) in accordance with one instruction. The scan mode is an operating mode that utilizes a scan distance measurement function. The scan distance measurement function refers to a function that successively performs a plurality of measurement sequences by scanning laser light with a user moving the distance measurement device 10A. The normal mode and the scan mode are selectively set in accordance with an instruction of the user.

The distance measurement device 10A has a still picture imaging mode and a motion picture imaging mode as operating modes of an imaging system. The still picture imaging mode is an operating mode that images a still picture, and the motion picture imaging mode is an operating mode that images a motion picture. The still picture imaging mode and the motion picture imaging mode are selectively set in accordance with an instruction of the user.

Figure 1:
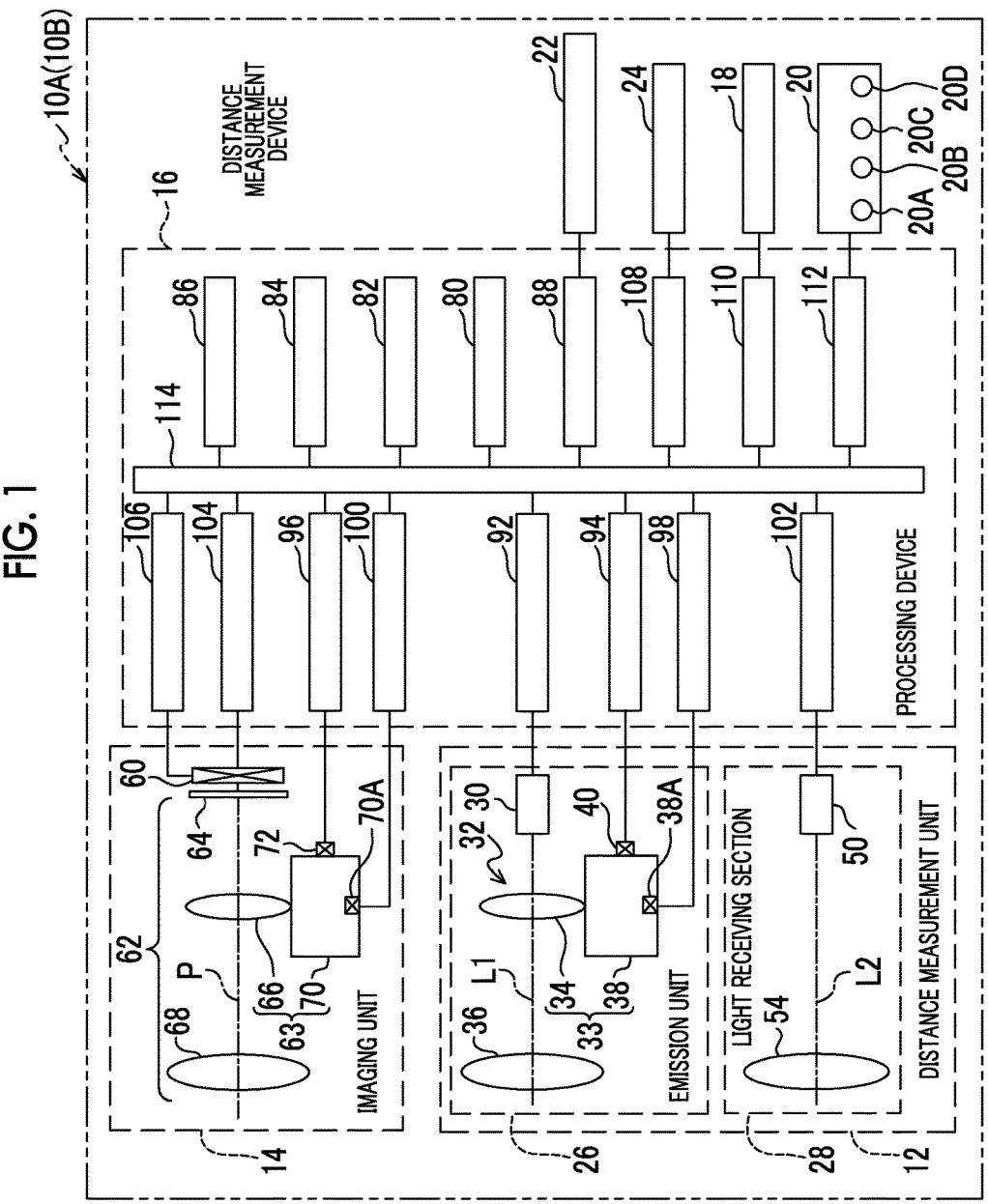
FIG. 1 is a block diagram illustrating one example of a hardware configuration of a main portion of a distance measurement device according to first and second embodiments.

As illustrated in FIG. 1 as one example, the distance measurement device 10A includes a distance measurement unit 12, an imaging unit 14, a processing device 16, an angular velocity sensor 18, a reception device 20, an electronic viewfinder 22, and a memory card 24.

The distance measurement unit 12 has an emission unit 26 and a light receiving section 28. The emission unit 26 has a laser diode (LD) 30 as one example of a light emitting element according to the technology of the present disclosure, an emission optical system 32, and a laser shake reduction unit 33 as one example of a second reduction unit and a second anti-shake lens mechanism according to the technology of the present disclosure.

The emission optical system 32 has a condensing lens (not illustrated), an emission system anti-shake lens 34, and an object lens 36. The condensing lens, the emission system anti-shake lens 34, and the object lens 36 are disposed along an optical axis L1 of the laser light and are arranged in the order of the condensing lens, the emission system anti-shake lens 34, and the object lens 36 along the optical axis L1 from the LD 30 side.

The LD 30 emits distance measurement laser light that is one example of directional light according to the technology of the present disclosure. Hereinafter, for convenience of description, the wavelength of the laser light emitted by the LD 30 will be assumed to be 900 nanometers. However, the technology of the present disclosure is not limited thereto, and the wavelength of the laser light may obviously be a wavelength other than 900 nanometers.

The condensing lens condenses the laser light emitted by the LD 30. The emission system anti-shake lens 34 passes the laser light condensed by the condensing lens and varies the laser light in an approximately perpendicular direction to an optical axis of the emission system anti-shake lens 34. The object lens 36 faces the subject and emits the laser light passing the emission system anti-shake lens 34 to the subject.

The laser shake reduction unit 33 is a mechanism reducing a laser shake and has the emission system anti-shake lens 34 as one example of a second anti-shake lens according to the technology of the present disclosure and an anti-shake lens variation mechanism 38 as one example of a second lens variation mechanism according to the technology of the present disclosure. A laser shake occurs along with, for example, a hand shake.

In the first embodiment, the "hand shake" refers to a phenomenon of vibration of the distance measurement device 10A by transmission of vibration of a hand of the user. In the first embodiment, the "laser shake" refers to a phenomenon of variation of the optical axis L1 with respect to the subject. In the first embodiment, "reduction of the laser shake" includes not only a meaning of preventing the laser shake but also a meaning of decreasing the laser shake.

A laser shake reduction result of the laser shake reduction unit 33 is one example of a reduction result of the second reduction unit according to the technology of the present disclosure. The laser shake reduction result of the laser shake reduction unit 33 refers to, for example, the current position of the emission system anti-shake lens 34 in the case of reduction of the laser shake by operation of the laser shake reduction unit 33.

The anti-shake lens variation mechanism 38 includes a motive power source 38A and a first motive power transmission mechanism (not illustrated). The motive power source 38A generates motive power. The first motive power transmission mechanism receives the motive power generated by the motive power source 38A and transmits the received motive power to the emission system anti-shake lens 34, thereby varying the emission system anti-shake lens 34 along an emission system two-dimensional plane. The emission system two-dimensional plane refers to, for example, a two-dimensional plane that is approximately perpendicular to the optical axis of the emission system anti-shake lens 34.

A piezo element that expands and contracts along the emission system two-dimensional plane is employed as one example of the motive power source 38A in the first embodiment. However, the technology of the present disclosure is not limited thereto, and a voice coil motor, a stepping motor, or the like may be used.

The emission unit 26 has a position detection sensor 40. The position detection sensor 40 detects the current position of the emission system anti-shake lens 34 and outputs a position signal indicating the detected current position. The current position of the emission system anti-shake lens 34 refers to a current position in the emission system two-dimensional plane.

A Hall element is employed as one example of the position detection sensor 40 in the first embodiment. However, the technology of the present disclosure is not limited thereto, and a magnetic sensor, a photo sensor, or the like other than a Hall element may be used.

The light receiving section 28 has a photo diode (PD) 50 and an object lens 54. The object lens 54 is arranged on a light receiving surface side of the PD 50. Reflective laser light that is laser light hit and reflected by the subject after being emitted by the emission unit 26 is incident on the object lens 54. The object lens 54 passes and guides the reflective laser light to a light receiving surface of the PD 50. The PD 50 receives the reflective laser light passing the object lens 54 and outputs an analog signal corresponding to the intensity of received light as a light reception signal.

The imaging unit 14 has the imaging element 60 as one example of a light receiving section according to the technology of the present disclosure, the image formation optical system 62, and an image shake reduction unit 63 as one example of a first reduction unit and a first anti-shake lens mechanism according to the technology of the present disclosure. The imaging element 60 is a complementary metal oxide semiconductor (CMOS) type image sensor and includes a color filter (not illustrated). The color filter includes a G filter corresponding to green (G), an R filter corresponding to red (R), and a B filter corresponding to blue (B) that mostly contribute to acquisition of a brightness signal. The imaging element 60 has a plurality of pixels (not illustrated) arranged in a matrix shape, and each pixel is assigned any filter of the R filter, the G filter, and the B filter included in the color filter.

The image formation optical system 62 has a filter 64, an imaging system anti-shake lens 66, and an imaging lens 68. The filter 64, the imaging system anti-shake lens 66, and the imaging lens 68 are disposed along an optical axis P of the image formation optical system 62 and are arranged in the order of the filter 64, the imaging system anti-shake lens 66, and the imaging lens 68 along the optical axis P from the imaging element 60 side.

As illustrated in FIG. 1 as one example, the optical axis P, the optical axis L1, and an optical axis L2 of the reflective laser light in the light receiving section 28 are arranged in approximately parallel on different optical paths, and the interval between the optical axes is approximately a few millimeters.

Subject light that is reflective light from the subject is incident on the imaging lens 68. The imaging lens 68 passes and guides the subject light to the imaging system anti-shake lens 66. The imaging system anti-shake lens 66 passes the subject light incident from the imaging lens 68 and varies the subject light in an approximately perpendicular direction to an optical axis of the imaging system anti-shake lens 66.

The filter 64 absorbs the reflective laser light and passes light of an effective wavelength to which the imaging element 60 has sensitivity. For example, in the case of the effective wavelength being greater than or equal to 500 nanometers and less than or equal to 750 nanometers, the filter 64 may be any filter that absorbs light of a wavelength of greater than or equal to 800 nanometers. While the filter that absorbs reflective laser light is illustrated as the filter 64 in the first embodiment, the filter 64 is not limited thereto and may be a filter that reflects reflective laser light.

The subject light that passes the filter 64 forms an image on the light receiving surface of the imaging element 60, and charges corresponding to the intensity of the received subject light are accumulated in the pixels of the imaging element 60. The imaging element 60 outputs the charges accumulated in each pixel as a picture signal that indicates a picture corresponding to a subject image acquired as an image formed on the light receiving surface by the subject light.

The image shake reduction unit 63 is a mechanism that reduces influence of variation of the optical axis P with respect to the subject image acquired as the image formed on the light receiving surface of the imaging element 60, that is, a mechanism that reduces an image shake, and is a single mechanism including the imaging system anti-shake lens 66 and an anti-shake lens variation mechanism 70. The imaging system anti-shake lens 66 is one example of a first anti-shake lens according to the technology of the present disclosure, and the anti-shake lens variation mechanism 70 is one example of a first lens variation mechanism according to the technology of the present disclosure.

In the first embodiment, the "image shake" refers to a phenomenon of shifting of the subject image from a reference position, for example, a phenomenon of shifting of the subject image acquired as the image formed on the light receiving surface of the imaging element 60 from a reference position by relative movement of the optical axis P with respect to the subject. The "reference position" refers to, for example, the position of the subject image that is acquired as the image formed on the light receiving surface of the imaging element 60 in the state of absence of the hand shake. In the first embodiment, "reduction of the image shake" includes not only a meaning of preventing the image shake but also a meaning of decreasing the image shake.

An image shake reduction result of the image shake reduction unit 63 is one example of a reduction result of the first reduction unit according to the technology of the present disclosure. The image shake reduction result of the image shake reduction unit 63 refers to, for example, the current position of the imaging system anti-shake lens 66 in the case of reduction of the image shake by operation of the image shake reduction unit 63.

The anti-shake lens variation mechanism 70 includes a motive power source 70A and a second motive power transmission mechanism (not illustrated). The motive power source 70A generates motive power. The second motive power transmission mechanism receives the motive power generated by the motive power source 70A and transmits the received motive power to the imaging system anti-shake lens 66, thereby varying the imaging system anti-shake lens 66 along an imaging system two-dimensional plane. The imaging system two-dimensional plane refers to, for example, a two-dimensional plane that is approximately perpendicular to the optical axis of the imaging system anti-shake lens 66.

A piezo element that expands and contracts along the imaging system two-dimensional plane is employed as one example of the motive power source 70A in the first embodiment. However, the technology of the present disclosure is not limited thereto, and a voice coil motor, a stepping motor, or the like may be used.

The imaging unit 14 has a position detection sensor 72. The position detection sensor 72 detects the current position of the imaging system anti-shake lens 66 and outputs a position signal indicating the detected current position. The current position of the imaging system anti-shake lens 66 refers to a current position in the imaging system two-dimensional plane. A Hall element is employed as one example of the position detection sensor 72 in the first embodiment. However, the technology of the present disclosure is not limited thereto, and a magnetic sensor, a photo sensor, or the like other than a Hall element may be used.

Hereinafter, for convenience of description, the position signal output by the position detection sensor 40 will be referred to as an "emission system position signal", and the position signal output by the position detection sensor 72 will be referred to as an "imaging system position signal". The emission system position signal and the imaging system position signal will be referred to as a "position signal unless otherwise required to be distinguished from each other.

The processing device 16 has a main control unit 80. The main control unit 80 controls the entirety of the distance measurement device 10A. In addition, the processing device 16 has a picture processing unit 82 as one example of a subject image processing unit according to the technology of the present disclosure, a picture memory 84, a distance measurement control unit 86, and a display control unit 88. In addition, the processing device 16 has an LD driver 92, position signal processing circuits 94 and 96, variation mechanism drivers 98 and 100, a light reception signal processing circuit 102, an imaging element driver 104, and a picture signal processing circuit 106. Furthermore, the processing device 16 has a media interface (I/F) 108, a sensor I/F 110, and a reception I/F 112.

The main control unit 80, the picture processing unit 82, the picture memory 84, the distance measurement control unit 86, and the display control unit 88 are connected to a busline 114. In addition, the LD driver 92, the position signal processing circuits 94 and 96, the variation mechanism drivers 98 and 100, the light reception signal processing circuit 102, the imaging element driver 104, and the picture signal processing circuit 106 are connected to the busline 114. Furthermore, the media I/F 108, the sensor I/F 110, and the reception I/F 112 are connected to the busline 114.

The angular velocity sensor 18 is connected to the sensor I/F 110, detects an angular velocity in a yaw direction and an angular velocity in a pitch direction, and outputs an angular velocity signal indicating the detected angular velocity to the sensor I/F 110. The sensor I/F 110 operates the angular velocity sensor 18 in accordance with an instruction of the main control unit 80 and outputs the angular velocity signal input from the angular velocity sensor 18 to the main control unit 80.

The reception device 20 has a distance measurement instruction button 20A, a release button 20B, a distance measurement system operating mode switching button 20C, an imaging system operating mode switching button 20D, and the like and receives various instructions from the user.

The distance measurement instruction button 20A receives an instruction to initiate distance measurement. The release button 20B receives an instruction to initiate imaging of a still picture, an instruction to initiate imaging of a motion picture, and an instruction to terminate imaging of the motion picture. The distance measurement system operating mode switching button 20C receives an instruction to switch between the normal mode and the scan mode. The imaging system operating mode switching button 20D receives an instruction to switch between the still picture imaging mode and the motion picture imaging mode.

The reception device 20 is connected to the reception I/F 112 and outputs an instruction content signal indicating the content of the received instruction to the reception I/F 112. The reception I/F 112 operates the reception device 20 in accordance with an instruction of the main control unit 80 and outputs the instruction content signal input from the reception device 20 to the main control unit 80. The main control unit 80 executes processes in accordance with the instruction content signal input from the reception I/F 112.

In the distance measurement device 10A according to the first embodiment, a manual focus mode and an auto focus mode are selectively set in accordance with an instruction of the user through the reception device 20. The release button 20B receives a push input in two stages of an imaging preparation instruction state and an imaging instruction state. The imaging preparation instruction state refers to, for example, the state of a push from a standby position to an intermediate position (half push position), and the imaging instruction state refers to the state of a push to a final push position (full push position) beyond the intermediate position. Hereinafter, for convenience of description, "the state of a push from the standby position to the half push position" will be referred to as a "half push state", and "the state of a push from the standby position to the full push position" will be referred to as a "full push state".

In the auto focus mode, an imaging condition is adjusted if the release button 20B is placed into the half push state. Then, exposure is made if the release button 20B is placed into the full push state immediately after the half push state. That is, if the release button 20B is placed into the half push state, an automatic exposure (AE) function works to adjust exposure. Then, an auto-focus (AF) function works to control focus, and exposure is made if the release button 20B is placed into the full push state.

The LD driver 92 is connected to the LD 30 and drives the LD 30 to emit laser light in accordance with an instruction of the distance measurement control unit 86.

The position signal processing circuit 94 is connected to the position detection sensor 40, amplifies the emission system position signal input from the position detection sensor 40, and performs analog/digital (A/D) conversion of the amplified emission system position signal. The position signal processing circuit 94 outputs the emission system position signal digitized by A/D conversion to the main control unit 80.

The variation mechanism driver 98 is connected to the motive power source 38A and drives the motive power source 38A in accordance with an instruction of the main control unit 80.

The light reception signal processing circuit 102 is connected to the PD 50, amplifies the light reception signal input from the PD 50 with an amplifier (not illustrated), and performs A/D conversion of the amplified light reception signal. The light reception signal processing circuit 102 outputs the light reception signal digitized by A/D conversion to the distance measurement control unit 86.

The distance measurement control unit 86 controls the distance measurement unit 12 under control of the main control unit 80. The distance measurement control unit 86 is realized by an application specific integrated circuit (ASIC)

in the first embodiment. However, the technology of the present disclosure is not limited thereto. For example, the distance measurement control unit 86 may be realized by a field-programmable gate array (FPGA). In addition, the distance measurement control unit 86 may be realized by a computer that includes a central processing unit (CPU), a read only memory (ROM), and a random access memory (RAM). Furthermore, the distance measurement control unit 86 may be realized by a combination of a hardware configuration and a software configuration.

The distance measurement control unit 86 controls emission of the laser light by the LD 30 by controlling the LD driver 92 under control of the main control unit 80 and acquires the light reception signal from the light reception signal processing circuit 102. The distance measurement control unit 86 derives the distance to the subject based on a timing of emission of the laser light and a timing of acquisition of the light reception signal and outputs distance information indicating the derived distance to the main control unit 80.

Measurement of the distance to the subject by the distance measurement control unit 86 will be described in further detail.

Figure 2:
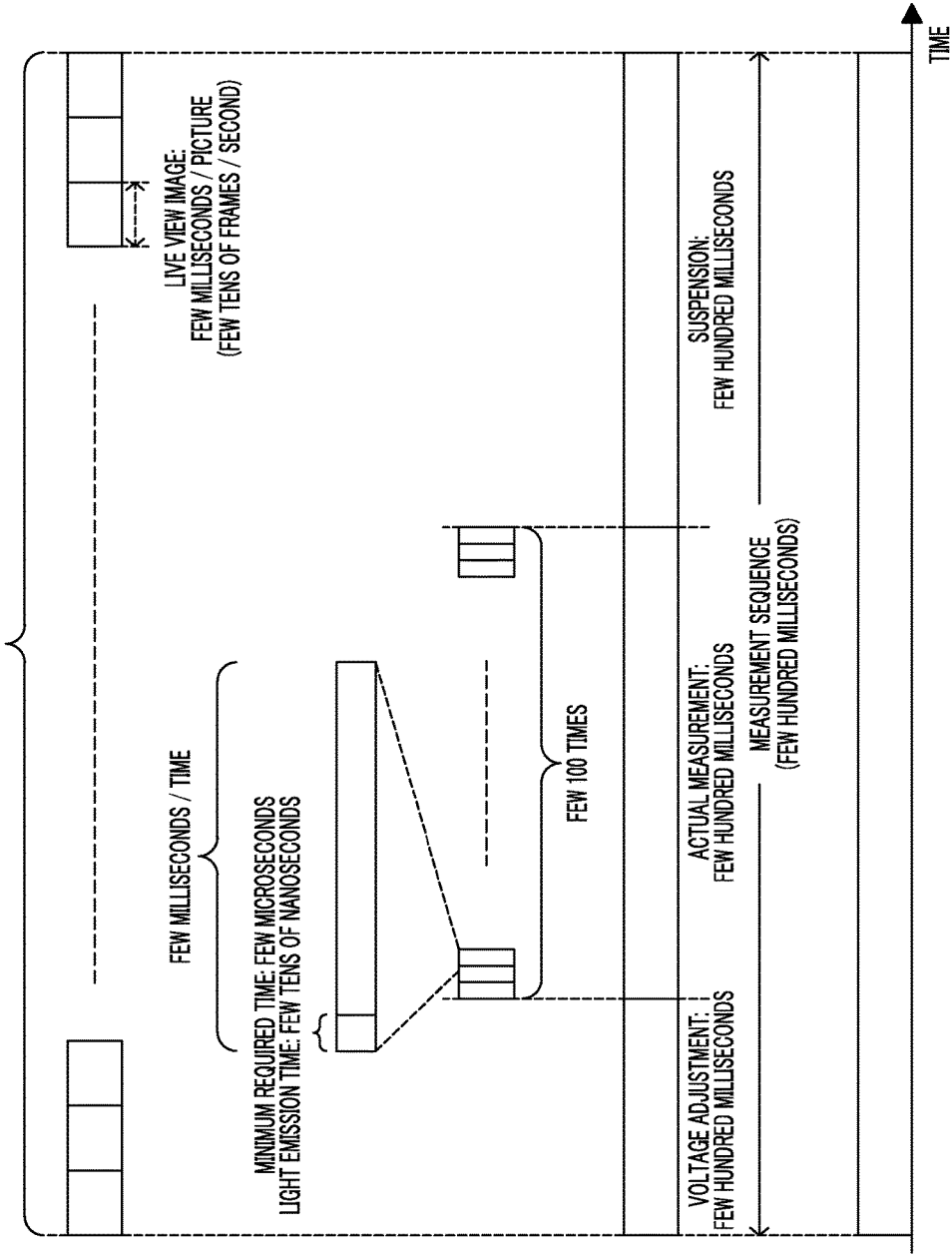
FIG. 2 is a time chart illustrating one example of a measurement sequence by a distance measurement device according to the first to third embodiments.

As illustrated in FIG. 2 as one example, one measurement sequence by the distance measurement device 10A is defined by a voltage adjustment period, an actual measurement period, and a suspension period.

The voltage adjustment period is a period of adjusting drive voltages of the LD 30 and the PD 50. The actual measurement period is a period of actual measurement of the distance to the subject and is one example of a distance measurement operation period according to the technology of the present disclosure. In the actual measurement period, an operation that causes the LD 30 to emit laser light and causes the PD 50 to receive reflective laser light is repeated a few hundred times, and the distance to the subject is derived based on the timing of emission of the laser light and the timing of acquisition of the light reception signal. The suspension period is a period for suspending driving of the LD 30 and the PD 50. Thus, in one measurement sequence, the distance to the subject is measured a few hundred times.

In the first embodiment, the voltage adjustment period is a few hundred milliseconds, the actual measurement period is a few hundred milliseconds, and the suspension period is a few hundred milliseconds.

Figure 3:
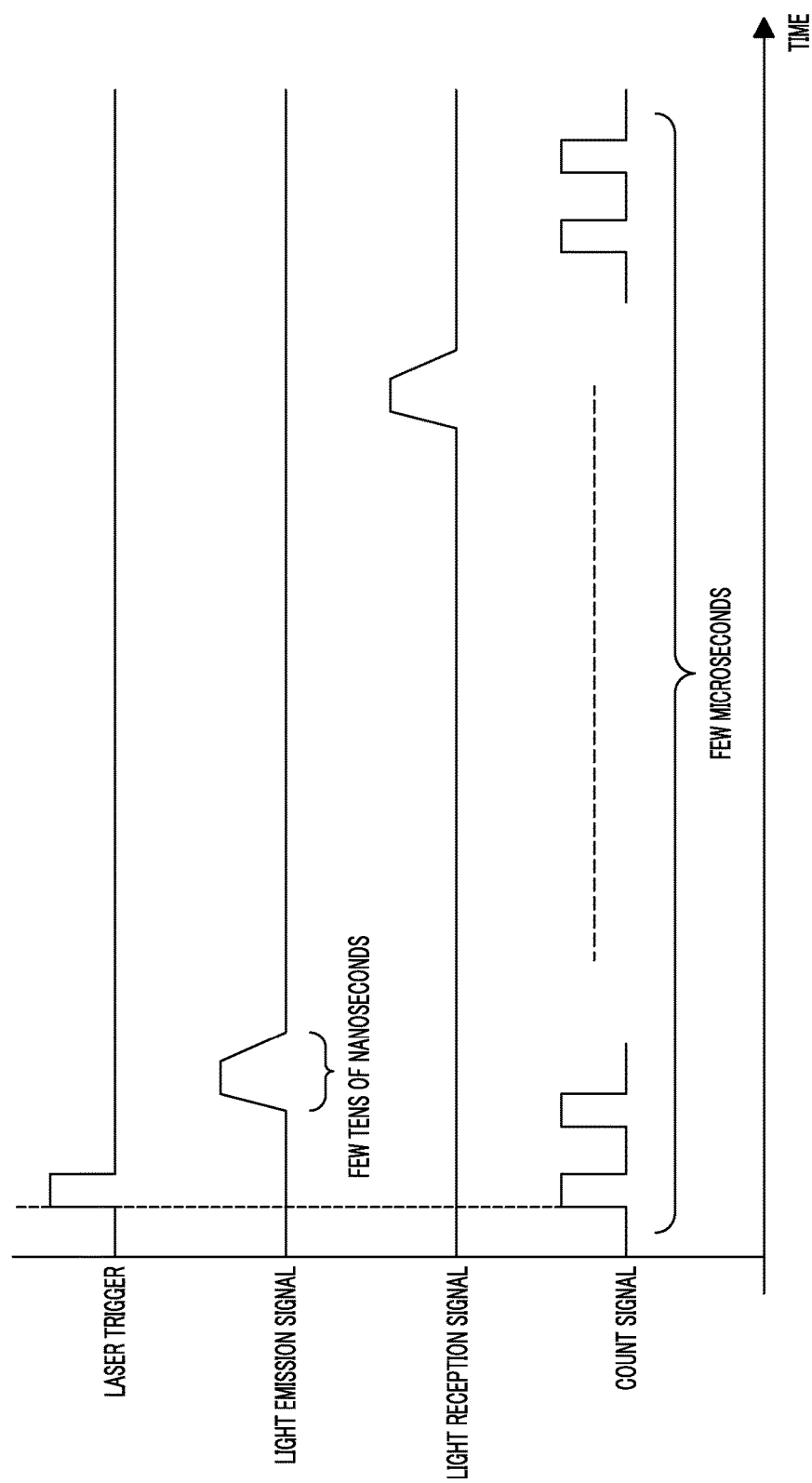
FIG. 3 is a time chart illustrating one example of a laser trigger, a light emission signal, a light reception signal, and a count signal required in the case of performing one measurement by the distance measurement device according to the first to third embodiments.

As illustrated in FIG. 3 as one example, the distance measurement control unit 86 is supplied with a count signal that defines a timing of provision of an instruction to emit laser light by the distance measurement control unit 86 and the timing of acquisition of the light reception signal. While the count signal is generated by the main control unit 80 and supplied to the distance measurement control unit 86 in the first embodiment, the count signal is not limited thereto and may be generated by a dedicated circuit, such as a time counter, connected to the busline 114 and supplied to the distance measurement control unit 86.

The distance measurement control unit 86 outputs a laser trigger for emission of laser light to the LD driver 92 in accordance with the count signal. The LD driver 92 drives the LD 30 to emit laser light in accordance with the laser trigger.

In the example illustrated in FIG. 3, the emission time of laser light is a few tens of nanoseconds. In this case, the time for the laser light emitted by the emission unit 26 toward the subject a few kilometers ahead to be received as reflective laser light by the PD 50 is "a few kilometers×2/speed of light"≈a few microseconds. Accordingly, in order to measure the distance to the subject a few kilometers ahead, a time of a few microseconds is required as the minimum required time as illustrated in FIG. 2 as one example.

As illustrated in FIG. 2 as one example, the time of one measurement is a few milliseconds in the first embodiment considering a round-trip time or the like of the laser light. However, since the round-trip time of the laser light differs depending on the distance to the subject, the time of one measurement may be changed in accordance with the assumed distance.

The distance measurement control unit 86, in the case of deriving the distance to the subject based on a measured value acquired from a few hundred measurements in one measurement sequence, for example, analyzes a histogram of the measured value acquired from a few hundred measurements and derives the distance to the subject.

Figure 4:
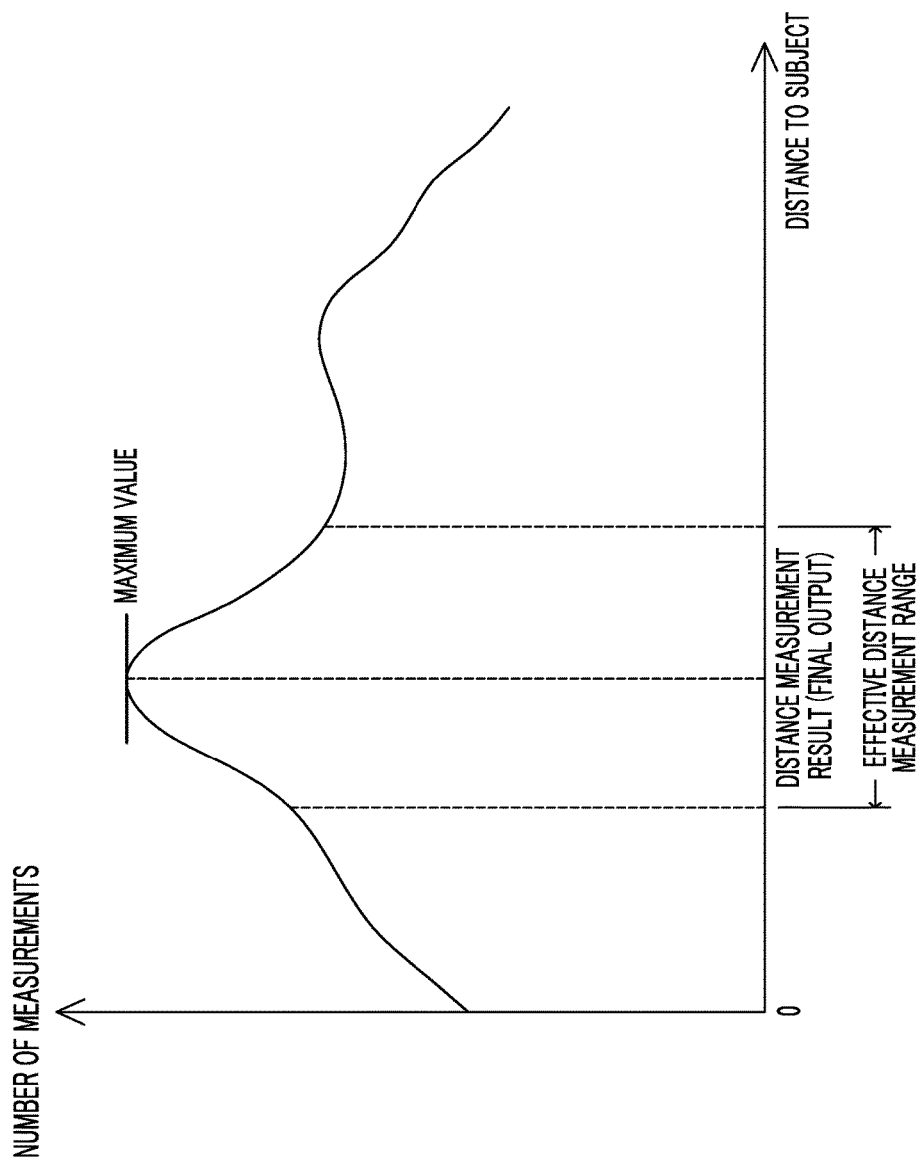
FIG. 4 is a graph illustrating one example of a histogram of a measured value (a histogram in the case of a distance to a subject (measured value) as a horizontal axis and the number of measurements as a vertical axis) acquired in the measurement sequence by the distance measurement device according to the first to third embodiments.

As illustrated in FIG. 4 as one example, in the histogram of the measured value acquired from a few hundred measurements in one measurement sequence, the horizontal axis is the distance to the subject, and the vertical axis is the number of measurements. The distance that corresponds to the maximum value of the number of measurements is derived as a distance measurement result by the distance measurement control unit 86. The histogram illustrated in FIG. 4 is merely one example. The histogram may be generated based on the round-trip time of the laser light (the elapsed time from light emission to light reception), ½ of the round-trip time of the laser light, or the like instead of the distance to the subject.

The imaging element driver 104 is connected to the imaging element 60 and supplies a drive pulse to the imaging element 60 under control of the main control unit 80. Each pixel of the imaging element 60 is driven in accordance with the drive pulse supplied by the imaging element driver 104.

The picture signal processing circuit 106 reads, per pixel, a picture signal corresponding to one frame from the imaging element 60 under control of the main control unit 80. The picture signal processing circuit 106 performs various processes such as a two correlation pile sampling process, automatic gain adjustment, and A/D conversion for the read picture signal. The picture signal processing circuit 106 outputs the picture signal digitized by various processes performed for the picture signal to the picture memory 84 per frame at a specific frame rate (for example, a few tens of frames/second) that is defined by a clock signal supplied from the main control unit 80.

The picture memory 84 temporarily retains the picture signal input from the picture signal processing circuit 106.

The picture processing unit 82 acquires the picture signal per frame at the specific frame rate from the picture memory 84 and performs various processes such as gamma correction, luminance and chrominance conversion, and a compression process for the acquired picture signal.

The picture processing unit 82 performs an electronic picture shake reduction process for the picture signal acquired from the picture memory 84. Hereinafter, for convenience of description, the electronic picture shake reduction process will be referred to as an "electronic reduction process".

The electronic reduction process is picture processing that reduces influence of variation of the optical axis P on the picture imaged and acquired by the imaging element 60, that is, a process of reducing a picture shake by processing the picture signal. The "picture shake" refers to, for example, a phenomenon of shifting of the acquired imaged picture from the reference position by relative movement of the optical axis P with respect to the subject by the hand shake or the like. In the first embodiment, "reduction of the picture shake" includes not only a meaning of preventing the picture shake but also a meaning of decreasing the picture shake.

In the electronic reduction process, first, the picture processing unit 82 compares time-series preceding and succeeding picture signals acquired from the picture memory 84. Next, the picture processing unit 82 calculates the amount of shifting and the direction of shifting (one example of a detection result according to the technology of the present disclosure) of the picture indicated by the succeeding picture signal from the picture indicated by the preceding picture signal based on the result of comparison of the picture signals. The picture processing unit 82 processes the succeeding picture signal into a picture signal that indicates a picture in which the amount of shifting and the direction of shifting calculated are eliminated.

The picture processing unit 82 outputs the picture signal acquired by various processes to the display control unit 88 per frame at the specific frame rate. In addition, the picture processing unit 82 outputs the picture signal acquired by various processes to the main control unit 80 in response to a request of the main control unit 80.

The display control unit 88 is connected to the electronic viewfinder 22 and controls the electronic viewfinder 22 under control of the main control unit 80. The display control unit 88 outputs the picture signal input from the picture processing unit 82 to the electronic viewfinder 22 per frame at the specific frame rate.

The electronic viewfinder 22 displays pictures, text information, and the like. The electronic viewfinder 22 displays, as a live view image, a picture that is indicated by the picture signal input from the display control unit 88 at the specific frame rate. The live view image has successive frame images acquired by imaging in successive frames and is referred to as a through-image. In addition, the electronic viewfinder 22 displays a still picture that is a single frame image acquired by imaging in a single frame. Furthermore, the electronic viewfinder 22 displays not only the live view image but also a reproduced picture, a menu screen, and the like.

The picture processing unit 82 and the display control unit 88 are realized by ASIC in the first embodiment. However, the technology of the present disclosure is not limited thereto. For example, the picture processing unit 82 and the display control unit 88 may be realized by FPGA. In addition, the picture processing unit 82 and the display control unit 88 may be realized by a computer that includes a CPU, a ROM, and a RAM. Furthermore, the picture processing unit 82 and the display control unit 88 may be realized by a combination of a hardware configuration and a software configuration.

The main control unit 80, in the case of receiving an instruction to image a still picture by the release button 20B in the still picture imaging mode, controls the imaging element driver 104 to make the imaging element 60 subjected to exposure corresponding to one frame. The main control unit 80 acquires, from the picture processing unit 82, the picture signal acquired by exposure corresponding to one frame and performs a compression process for the acquired picture signal to generate a still picture file of a specific still picture format. The specific still picture format refers to, for example, Joint Photographic Experts Group (JPEG).

The main control unit 80, in the case of receiving an instruction to image a motion picture by the release button 20B in the motion picture imaging mode, acquires, per frame at the specific frame rate, the picture signal that is output as the live view image to the display control unit 88 by the picture processing unit 82. The main control unit 80 performs a compression process for the picture signal acquired from the picture processing unit 82 to generate a motion picture file of a specific motion picture format. The specific motion picture format refers to, for example, Movie Picture Experts Group (MPEG). Hereinafter, for convenience of description, the still picture file and the motion picture file will be referred to as a picture file unless otherwise required to be distinguished from each other.

The media I/F 108 is connected to the memory card 24 and records and reads the picture file on the memory card 24 under control of the main control unit 80. The picture file that is read from the memory card 24 by the media I/F 108 is subjected to a decompression process by the main control unit 80 and displayed as a reproduced picture on the electronic viewfinder 22.

The main control unit 80 stores the distance information input from the distance measurement control unit 86 in correlation with the picture file in the memory card 24 through the media I/F 108. The distance information is read along with the picture file by the main control unit 80 from the memory card 24 through the media I/F 108, and the distance indicated by the read distance information is displayed along with the reproduced picture by the correlated picture file on the electronic viewfinder 22.

The position signal processing circuit 96 is connected to the position detection sensor 72, amplifies the imaging system position signal input from the position detection sensor 72, and performs A/D conversion of the amplified imaging system position signal. The position signal processing circuit 96 outputs the imaging system position signal digitized by A/D conversion to the main control unit 80.

The variation mechanism driver 100 is connected to the motive power source 70A and drives the motive power source 70A in accordance with an instruction of the main control unit 80.

Figure 5:
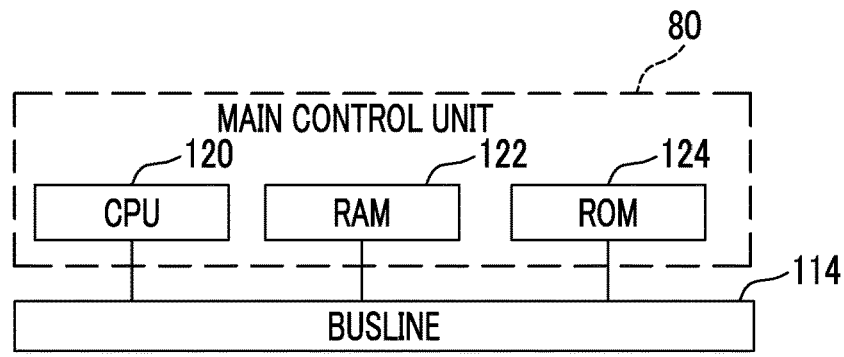
FIG. 5 is a block diagram illustrating one example of a hardware configuration of a main control unit included in the distance measurement device according to the first to third embodiments.

As illustrated in FIG. 5 as one example, the main control unit 80 includes a CPU 120, a RAM 122, and a ROM 124. The CPU 120 controls the entirety of the distance measurement device 10A. The RAM 122 is a volatile memory that is used as a work area or the like at the time of execution of various programs. The ROM 124 is a non-volatile memory that stores, in advance, a control program controlling operation of the distance measurement device 10A, various parameters, and the like. The CPU 120, the RAM 122, and the ROM 124 are mutually connected through the busline 114.

Figure 6:
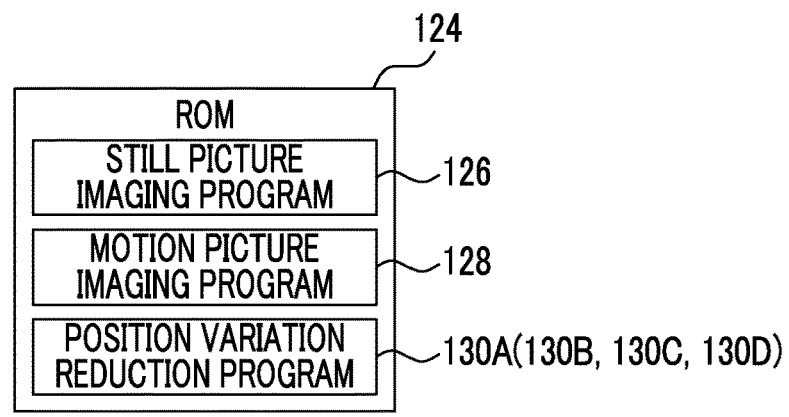
FIG. 6 is a conceptual diagram illustrating one example of a stored content of a ROM included in the main control unit illustrated in FIG. 5.

As illustrated in FIG. 6 as one example, the ROM 124 stores a still picture imaging program 126 and a motion picture imaging program 128. The CPU 120, in the case of the still picture imaging mode being set, reads and loads the still picture imaging program 126 from the ROM 124 into the RAM 122 and executes the still picture imaging program 126. In addition, the CPU 120, in the case of the motion picture imaging mode being set, reads and loads the motion picture imaging program 128 from the ROM 124 into the RAM 122 and executes the motion picture imaging program 128.

Figure 7:
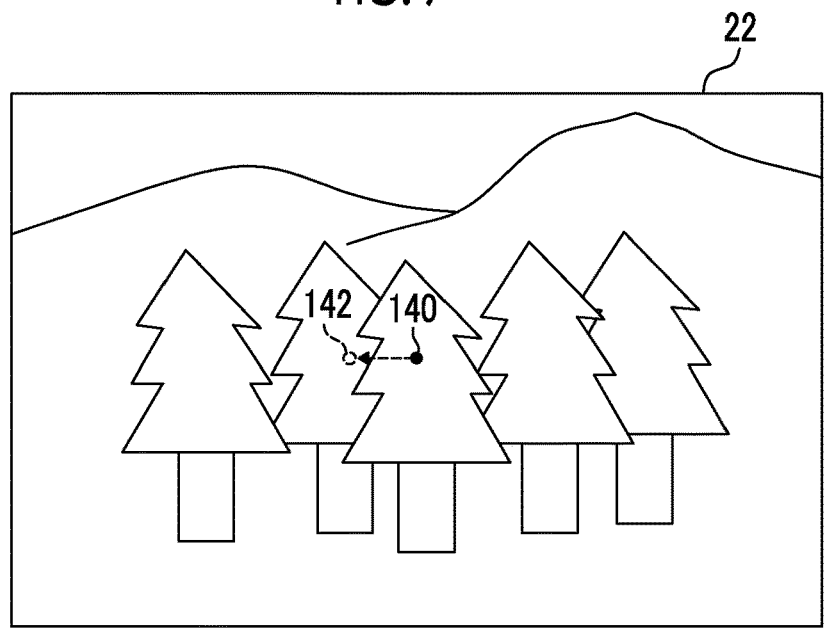
FIG. 7 is a screen diagram illustrating one example of a live view image displayed on an electronic viewfinder included in the distance measurement device according to the first to third embodiments.

In the distance measurement device 10A, the image shake is reduced if the image shake reduction unit 63 is operated, and the picture shake of the live view image displayed on the electronic viewfinder 22 is reduced if the electronic reduction process is executed. In the case of measuring distance during operation of the image shake reduction unit 63 or during execution of the electronic reduction process, the user aims at the subject of the distance measurement target by positioning the subject of the distance measurement target at a center 140 (refer to FIG. 7) of the live view image and pushes the distance measurement instruction button 20A. Accordingly, laser light is emitted by the emission unit 26. However, as illustrated in FIG. 7 as one example, a position variation phenomenon that is a phenomenon of variation of an irradiation position 142 of the laser light is generated in the live view image. In addition, in the state of occurrence of the position variation phenomenon, if a still picture is imaged in the still picture imaging mode or a motion picture is imaged in the motion picture imaging mode, the still picture or the motion picture in the state of the irradiation position 142 being shifted from the center 140 is consequently acquired.

The wavelength of the laser light emitted by the emission unit 26 is not an effective wavelength to which the imaging element 60 has sensitivity. Thus, the irradiation position 142 is not visually recognized by the user from the picture. Thus, it is difficult for the user to recognize the extent to which the irradiation position 142 is shifted from the center 140 by occurrence of the position variation phenomenon.

Therefore, in the distance measurement device 10A, as illustrated in FIG. 6 as one example, the ROM 124 stores a position variation reduction program 130A for reducing the position variation phenomenon. "Reduction of the position variation phenomenon" includes not only a meaning of preventing the position variation phenomenon but also a meaning of decreasing the position variation phenomenon. The position variation reduction program 130A is one example of a distance measurement control program according to the technology of the present disclosure.

Figure 8:
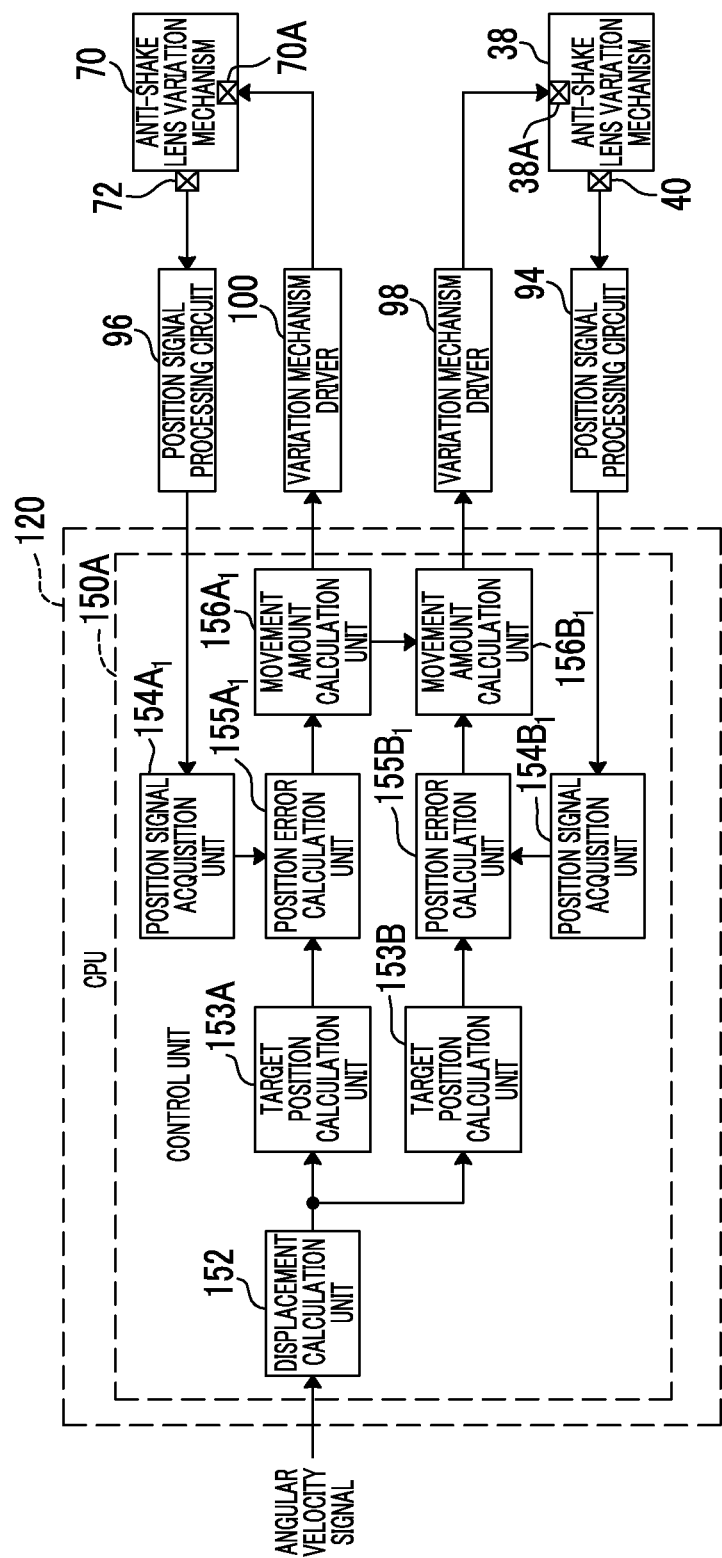
FIG. 8 is a block diagram illustrating one example of main functions of a CPU included in the main control unit of the distance measurement device according to the first embodiment.

The CPU 120 reads and loads the position variation reduction program 130A from the ROM 124 into the RAM 122 and executes the position variation reduction program 130A, thereby operating as a control unit 150A illustrated in FIG. 8 as one example.

The control unit 150A, in the case of executing the electronic reduction process and operating the laser shake reduction unit 33 at the same time, controls the picture processing unit 82 and the laser shake reduction unit 33 to reduce the position variation phenomenon.

The control unit 150A, in the case of operating the image shake reduction unit 63 and the laser shake reduction unit 33 at the same time, controls the image shake reduction unit 63 and the laser shake reduction unit 33 to reduce the position variation phenomenon.

As illustrated in FIG. 8 as one example, the control unit 150A has a displacement calculation unit 152, target position calculation units 153A and 153B, position signal acquisition units 154$A_1$ and 154$B_1$, position error calculation units 155$A_1$ and 155$B_1$, and movement amount calculation units 156$A_1$ and 156$B_1$.

The displacement calculation unit 152 acquires the angular velocity signal from the angular velocity sensor 18 through the sensor I/F 110 and calculates the direction of displacement and the amount of displacement (one example of the detection result according to the technology of the present disclosure) of the distance measurement device 10A based on the acquired angular velocity signal. The angular velocity sensor 18 and the displacement calculation unit 152 are one example of a detection unit according to the technology of the present disclosure and detect variation of the entirety of the distance measurement device 10A.

The target position calculation unit 153A calculates a target position of the imaging system anti-shake lens 66 based on the direction of displacement and the amount of displacement calculated by the displacement calculation unit 152. The target position of the imaging system anti-shake lens 66 means a target position that is required for reduction of the image shake.

The target position of the imaging system anti-shake lens 66 is calculated by a target position calculation formula for the imaging system anti-shake lens 66. The target position calculation formula for the imaging system anti-shake lens 66 is a calculation formula with the direction of displacement and the amount of displacement of the distance measurement device 10A as independent variables and the target position of the imaging system anti-shake lens 66 as a dependent variable. The target position of the imaging system anti-shake lens 66 may be derived, without using the target position calculation formula for the imaging system anti-shake lens 66, from a derivation table in which the direction of displacement and the amount of displacement of the distance measurement device 10A are associated with the target position of the imaging system anti-shake lens 66.

The target position calculation unit 153B calculates a target position of the emission system anti-shake lens 34 based on the direction of displacement and the amount of displacement indicated by a displacement signal input from the displacement calculation unit 152. The target position of the emission system anti-shake lens 34 means a target position that is required for reduction of the laser shake.

The target position of the emission system anti-shake lens 34 is calculated by a target position calculation formula for the emission system anti-shake lens 34. The target position calculation formula for the emission system anti-shake lens 34 is a calculation formula with the direction of displacement and the amount of displacement of the distance measurement device 10A as independent variables and the target position of the emission system anti-shake lens 34 as a dependent variable. The target position of the emission system anti-shake lens 34 may be derived, without using the target position calculation formula for the emission system anti-shake lens 34, from a derivation table in which the direction of displacement and the amount of displacement of the distance measurement device 10A are associated with the target position of the emission system anti-shake lens 34.

The position signal acquisition unit 154$A_1$ acquires the imaging system position signal from the position signal processing circuit 96. The position signal acquisition unit 154$B_1$ acquires the emission system position signal from the position signal processing circuit 94.

The position error calculation unit 155$A_1$ calculates an imaging system position error that is the difference between the current position of the imaging system anti-shake lens 66 indicated by the imaging system position signal acquired by the position signal acquisition unit 154$A_1$ and the target position of the imaging system anti-shake lens 66 calculated by the target position calculation unit 153A.

The position error calculation unit 155$B_1$ calculates an emission system position error that is the difference between the current position of the emission system anti-shake lens 34 indicated by the emission system position signal acquired by the position signal acquisition unit 154$B_1$ and the target position of the emission system anti-shake lens 34 calculated by the target position calculation unit 153B.

The movement amount calculation unit 156$A_1$ uses an imaging system optical axis movement amount calculation formula to calculate, from the imaging system position error calculated by the position error calculation unit 155$A_1$, an imaging system optical axis movement amount (one example of a first reduction amount according to the technology of the present disclosure) that is required for reduction of the image shake. The imaging system optical axis movement amount refers to the amount of movement of the optical axis P from the position thereof at the current point in time.

The imaging system optical axis movement amount calculation formula is a calculation formula with the imaging system position error as an independent variable and the imaging system optical axis movement amount as a dependent variable. While the imaging system optical axis movement amount calculation formula is illustrated, the technology of the present disclosure is not limited thereto. For example, the movement amount calculation unit $156A_1$ may derive the imaging system optical axis movement amount by using an imaging system optical axis movement amount table in which the imaging system position error is associated with the imaging system optical axis movement amount.

The variation mechanism driver 100 outputs, to the motive power source 70A, a drive pulse that corresponds to the imaging system optical axis movement amount input from the movement amount calculation unit $156A_1$. The distance of movement of the imaging system anti-shake lens 66 is determined in accordance with the number of drive pulses input into the motive power source 70A from the variation mechanism driver 100. The direction of movement of the imaging system anti-shake lens 66 is determined in accordance with the waveform of the drive pulse input into the motive power source 70A from the variation mechanism driver 100.

The variation mechanism driver 100 derives the drive pulse by using an imaging system drive pulse table in which the imaging system optical axis movement amount is associated with the drive pulse. However, the technology of the present disclosure is not limited thereto. For example, the variation mechanism driver 100 may calculate the drive pulse by using an imaging system drive pulse calculation formula with the imaging system optical axis movement amount as an independent variable and the drive pulse as a dependent variable.

The movement amount calculation unit $156B_1$ uses an emission system optical axis movement amount calculation formula to calculate, from the emission system position error calculated by the position error calculation unit $155B_1$, an emission system optical axis movement amount (one example of a second reduction amount according to the technology of the present disclosure) that is required for reduction of the laser shake. The emission system optical axis movement amount refers to the amount of movement of the optical axis L1 from the position thereof at the current point in time.

The emission system optical axis movement amount calculation formula is a calculation formula with the emission system position error as an independent variable and the emission system optical axis movement amount as a dependent variable. While the emission system optical axis movement amount calculation formula is illustrated, the technology of the present disclosure is not limited thereto. For example, the movement amount calculation unit $156B_1$ may derive the emission system optical axis movement amount by using an emission system optical axis movement amount table in which the emission system position error is associated with the emission system optical axis movement amount.

The movement amount calculation unit $156B_1$ compares the absolute value of the calculated emission system optical axis movement amount with the absolute value of the imaging system optical axis movement amount. The movement amount calculation unit $156B_1$, in the case of the absolute value of the calculated emission system optical axis movement amount being less than or equal to the absolute value of the imaging system optical axis movement amount, outputs the calculated emission system optical axis movement amount to the variation mechanism driver 98. The movement amount calculation unit $156B_1$, in the case of the absolute value of the calculated emission system optical axis movement amount exceeding the absolute value of the imaging system optical axis movement amount, adjusts the emission system optical axis movement amount in such a manner that the relationship "absolute value of emission system optical axis movement amount=absolute value of imaging system optical axis movement amount" is established. The movement amount calculation unit $156B_1$ outputs the emission system optical axis movement amount acquired after adjustment to the variation mechanism driver 98.

The variation mechanism driver 98 outputs, to the motive power source 38A, a drive pulse that corresponds to the emission system optical axis movement amount input from the movement amount calculation unit $156B_1$. The distance of movement of the emission system anti-shake lens 34 is determined in accordance with the number of drive pulses input into the motive power source 38A from the variation mechanism driver 98. The direction of movement of the emission system anti-shake lens 34 is determined in accordance with the waveform of the drive pulse input into the motive power source 38A from the variation mechanism driver 98.

The variation mechanism driver 98 derives the drive pulse by using an emission system drive pulse table in which the emission system optical axis movement amount is associated with the drive pulse. However, the technology of the present disclosure is not limited thereto. For example, the variation mechanism driver 98 may calculate the drive pulse by using an emission system drive pulse calculation formula with the emission system optical axis movement amount as an independent variable and the drive pulse as a dependent variable.

Next, the action of the distance measurement device 10A will be described.

First, a distance measurement process that is executed by the distance measurement control unit 86 under control of the main control unit 80 in the case of a power supply of the distance measurement device 10A being placed into an ON (powered) state will be described with reference to FIG. 9.

Figure 9:
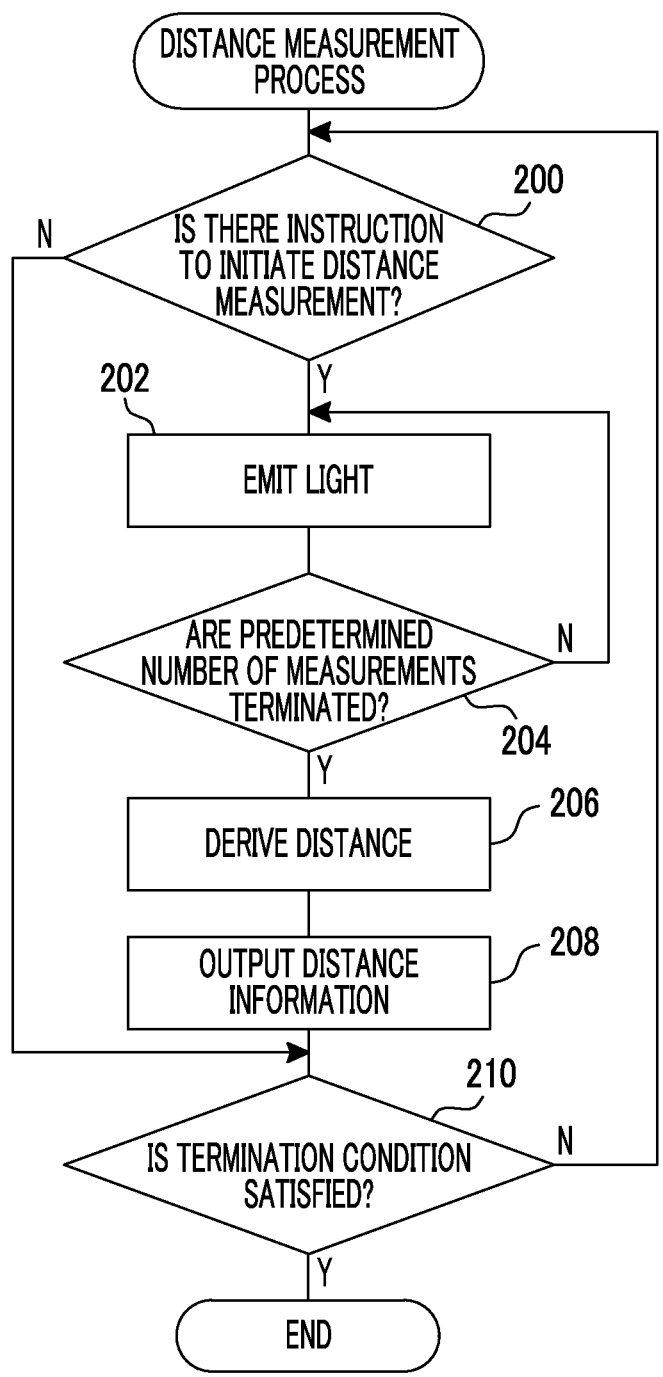
FIG. 9 is a flowchart illustrating one example of a flow of a distance measurement process according to the first to third embodiments.

In the distance measurement process illustrated in FIG. 9, first, in Step 200, the distance measurement control unit 86 determines whether or not there is an instruction to initiate distance measurement through the distance measurement instruction button 20A. In Step 200, in the case of absence of an instruction to initiate distance measurement through the distance measurement instruction button 20A, a negative determination is made, and a transition is made to Step 210. In Step 200, in the case of presence of an instruction to initiate distance measurement through the distance measurement instruction button 20A, a positive determination is made, and a transition is made to Step 202.

In Step 202, the distance measurement control unit 86 controls the LD driver 92 to cause the LD 30 to emit laser light. By the LD 30 emitting laser light, the laser light is emitted toward the subject by the emission unit 26, and reflective laser light is received by the PD 50. The distance measurement control unit 86 measures the elapsed time from emission of the laser light until reception of the reflective laser light, retains the measured elapsed time, and terminates one measurement in the actual measurement period.

In next Step 204, the distance measurement control unit 86 determines whether or not a predetermined number of measurements are terminated. In Step 204, in the case of a predetermined number of measurements not being terminated, a negative determination is made, and a transition is made to Step 202. In Step 204, in the case of a predetermined number of measurements being terminated, a positive determination is made, and a transition is made to Step 206.

In Step 206, the distance measurement control unit 86 derives the distance to the subject based on the elapsed time acquired by a predetermined number of measurements. That is, as illustrated in FIG. 4 as one example, the distance measurement control unit 86 generates a histogram related to the distance to the subject and derives the distance to the subject corresponding to the maximum value of the number of measurements as a measurement result from the generated histogram.

In the case of generation of a histogram related to time such as the round-trip time of the laser light, first, a time corresponding to the maximum value of the number of measurements may be derived, and the distance to the subject may be derived based on the derived time. For example, in the case of a histogram related to the round-trip time of the laser light, a value acquired by multiplying ½ of the round-trip time of the laser light corresponding to the maximum value of the number of measurements by the speed of light may be derived as the distance to the subject.

In Step 208, the distance measurement control unit 86 outputs distance information indicating the distance derived in Step 206 to the main control unit 80. Then, a transition is made to Step 210.

In Step 210, the distance measurement control unit 86 determines whether or not a condition for termination of the distance measurement process is satisfied. The condition for termination of the distance measurement process refers to, for example, a condition that an instruction to terminate the distance measurement process is received by the reception device 20, or a condition that there is no instruction to initiate distance measurement until a predetermined amount of time (for example, 10 minutes) elapses from initiation of execution of the distance measurement process.

In Step 210, in the case of the condition for termination of the distance measurement process not being satisfied, a negative determination is made, and a transition is made to Step 200. In Step 210, in the case of the condition for termination of the distance measurement process being satisfied, a positive determination is made, and the distance measurement process is terminated.

Next, a live view process that is executed by the picture processing unit 82 under control of the main control unit 80 in the case of the power supply of the distance measurement device 10A being placed into the ON state will be described with reference to FIG. 10. Hereinafter, for convenience of description, the picture signal that is periodically imaged and acquired by the imaging element 60 in accordance with an instruction of the main control unit 80 will be assumed to be input into the picture memory 84 per frame at the specific frame rate if the power supply of the distance measurement device 10A is placed into the ON state.

Figure 10:
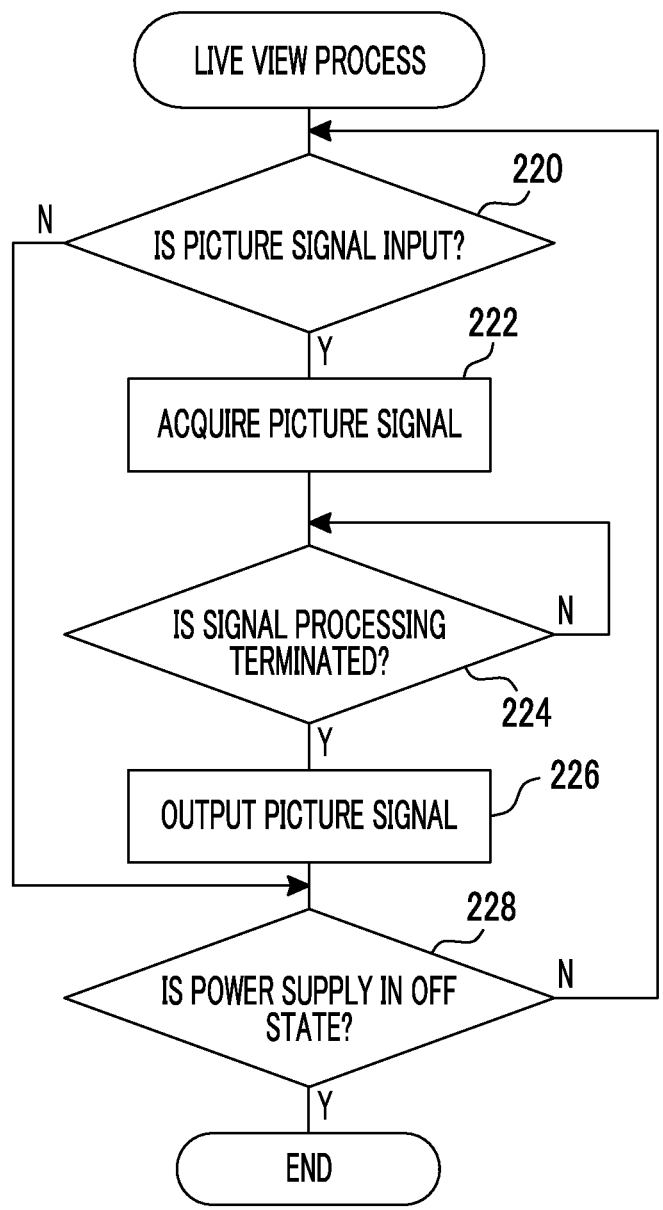
FIG. 10 is a flowchart illustrating one example of a flow of a live view process according to the first to third embodiments.

In the live view process illustrated in FIG. 10, in Step 220, the picture processing unit 82 determines whether or not the picture signal corresponding to one frame is input into the picture memory 84. In step 220, in the case of the picture signal corresponding to one frame not being input into the picture memory 84, a negative determination is made, and a transition is made to Step 228. In step 220, in the case of the picture signal corresponding to one frame being input into the picture memory 84, a positive determination is made, and a transition is made to Step 222.

In Step 222, the picture processing unit 82 acquires the picture signal corresponding to one frame from the picture memory 84. Then, a transition is made to Step 224.

In Step 224, the picture processing unit 82 determines whether or not all types of signal processing to be performed are executed for the picture signal acquired in the process of Step 222. In Step 224, in the case where all types of signal processing to be performed are not executed for the picture signal acquired in the process of Step 222, a negative determination is made, and the determination of Step 224 is performed again. In Step 224, in the case where all types of signal processing to be performed are executed for the picture signal acquired in the process of Step 222, a positive determination is made, and a transition is made to Step 226.

In Step 226, the picture processing unit 82 outputs the picture signal acquired after signal processing to the display control unit 88. Then, a transition is made to Step 228.

In Step 228, the picture processing unit 82 determines whether or not the power supply of the distance measurement device 10A is in an OFF state. In Step 228, in the case of the power supply of the distance measurement device 10A not being in the OFF state, a negative determination is made, and a transition is made to Step 220. In Step 228, in the case of the power supply of the distance measurement device 10A being in the OFF state, a positive determination is made, and the live view process is terminated.

If the live view process is executed, the process of Step 226 is executed per determined cycle at the specific frame rate. The display control unit 88 outputs, to the electronic viewfinder 22 at the specific frame rate, the picture signal that is input by execution of the process of Step 226 per frame from the picture processing unit 82. The electronic viewfinder 22 displays, as the live view image, a picture that is indicated by the picture signal input from the display control unit 88 at the specific frame rate.

Next, a still picture imaging process that is realized by the CPU 120 executing the still picture imaging program 126 in the case of the still picture imaging mode being set will be described with reference to FIG. 11. Hereinafter, for convenience of description, the live view process will be assumed to be executed by the picture processing unit 82 in parallel with the still picture imaging process.

Figure 11:
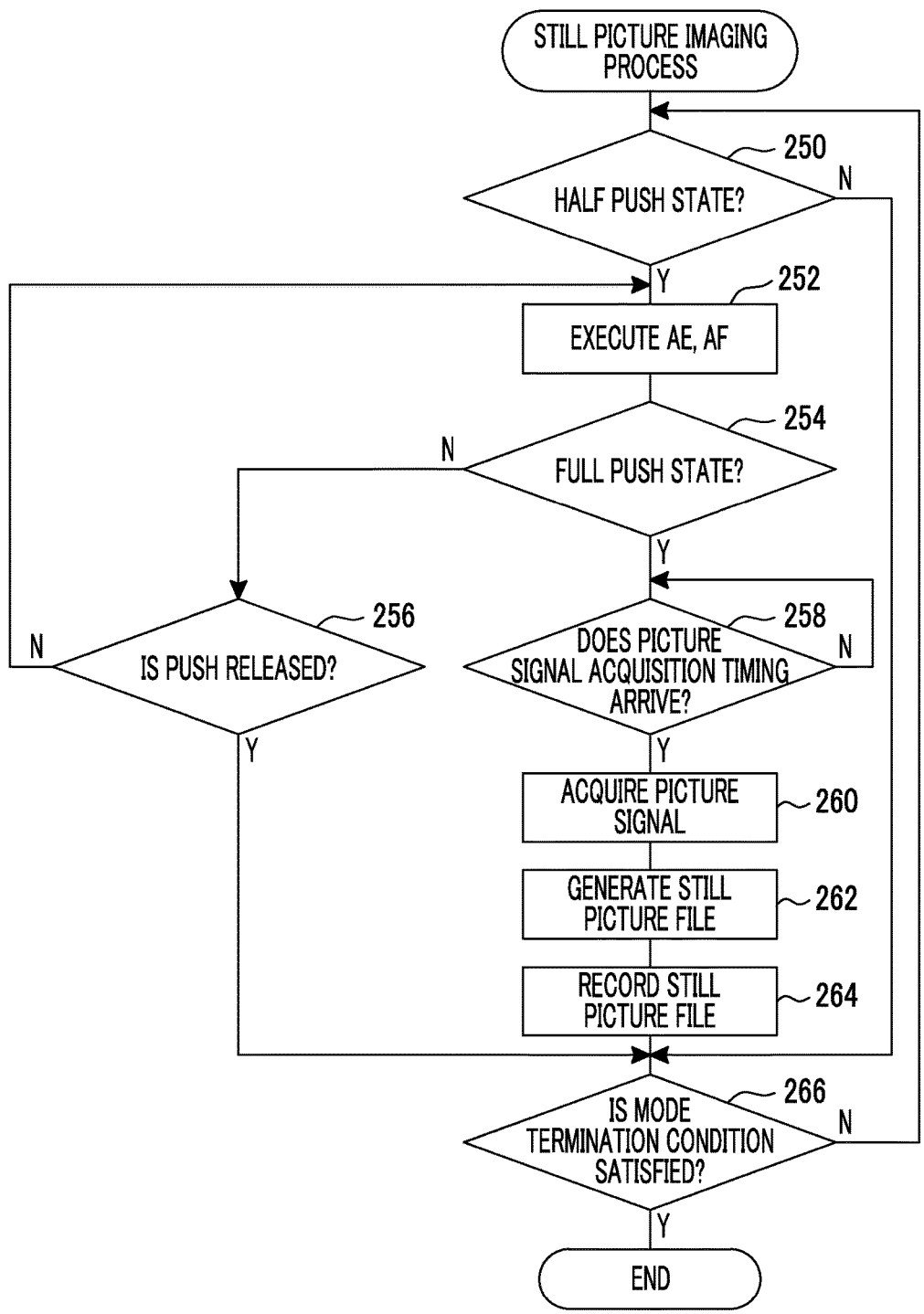
FIG. 11 is a flowchart illustrating one example of a flow of a still picture imaging process according to the first to third embodiments.

In the still picture imaging process illustrated in FIG. 11, first, in Step 250, the control unit 150A determines whether or not the release button 20B is in the half push state. In Step 250, in the case of the release button 20B not being in the half push state, a negative determination is made, and a transition is made to Step 266. In Step 250, in the case of the release button 20B being in the half push state, a positive determination is made, and a transition is made to Step 252.

In Step 252, the control unit 150A adjusts exposure by utilizing the AE function and controls focus by utilizing the AF function. Then, a transition is made to Step 254.

In Step 254, the control unit 150A determines whether or not the release button 20B is in the full push state. In Step 254, in the case of the release button 20B not being in the full push state, a negative determination is made, and a transition is made to Step 256. In Step 254, in the case of the release button 20B being in the full push state, a positive determination is made, and a transition is made to Step 258.

In Step 256, the control unit 150A determines whether or not the push input on the release button 20B is released. In Step 256, in the case of the push input on the release button 20B not being released, a negative determination is made, and a transition is made to Step 252. In Step 256, in the case of the push input on the release button 20B being released, a positive determination is made, and a transition is made to Step 266.

In Step 258, the control unit 150A determines whether or not a picture signal acquisition timing arrives. The "picture signal acquisition timing" refers to the case of the picture processing unit 82 performing various types of signal processing for the picture signal corresponding to one frame that is acquired by exposure by the imaging element 60 after a positive determination made in the process of Step 254.

In Step 258, in the case of non-arrival of the picture signal acquisition timing, a negative determination is made, and the determination of Step 258 is performed again. In Step 258, in the case of arrival of the picture signal acquisition timing, a positive determination is made, and a transition is made to Step 260.

In Step 260, the control unit 150A acquires, from the picture processing unit 82, the picture signal corresponding to one frame that is subjected to various types of signal processing by the picture processing unit 82. Then, a transition is made to Step 262.

In Step 262, the control unit 150A generates a still picture file from the picture signal acquired in the process of Step 260. Then, a transition is made to Step 264.

In Step 264, the control unit 150A records, in the memory card 24, the still picture file generated in the process of Step 262. Then, a transition is made to Step 266.

In Step 266, the control unit 150A determines whether or not a condition for termination of the still picture imaging mode is satisfied. The condition for termination of the still picture imaging mode refers to, for example, a condition that the motion picture imaging mode is set, or a condition that an instruction to display the reproduced picture on the electronic viewfinder 22 is received by the reception device 20.

In Step 266, in the case of the condition for termination of the still picture imaging mode not being satisfied, a negative determination is made, and a transition is made to Step 250. In Step 266, in the case of the condition for termination of the still picture imaging mode being satisfied, a positive determination is made, and the still picture imaging process is terminated.

Next, a motion picture imaging process that is realized by the CPU 120 executing the motion picture imaging program 128 in the case of the motion picture imaging mode being set will be described with reference to FIG. 12. Hereinafter, for convenience of description, the live view process will be assumed to be executed by the picture processing unit 82 in parallel with the motion picture imaging process.

Figure 12:
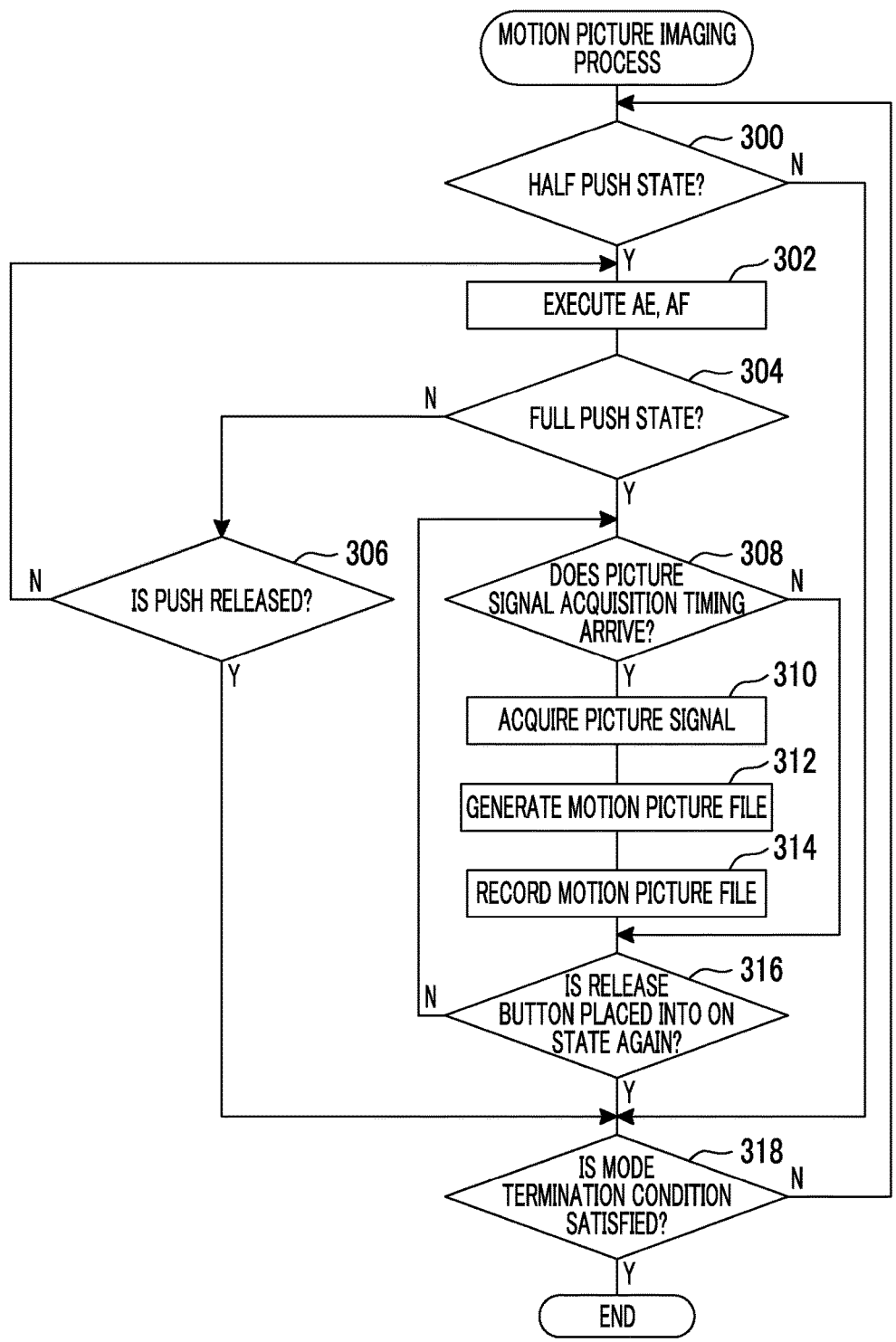
FIG. 12 is a flowchart illustrating one example of a flow of a motion picture imaging process according to the first to third embodiments.

In the motion picture imaging process illustrated in FIG. 12, first, in Step 300, the control unit 150A determines whether or not the release button 20B is in the half push state. In Step 300, in the case of the release button 20B not being in the half push state, a negative determination is made, and a transition is made to Step 318. In Step 300, in the case of the release button 20B being in the half push state, a positive determination is made, and a transition is made to Step 302.

In Step 302, the control unit 150A adjusts exposure by utilizing the AE function and controls focus by utilizing the AF function. Then, a transition is made to Step 304.

In Step 304, the control unit 150A determines whether or not the release button 20B is in the full push state. In Step 304, in the case of the release button 20B not being in the full push state, a negative determination is made, and a transition is made to Step 306. In Step 304, in the case of the release button 20B being in the full push state, a positive determination is made, and a transition is made to Step 308.

In Step 306, the control unit 150A determines whether or not the push input on the release button 20B is released. In Step 306, in the case of the push input on the release button 20B not being released, a negative determination is made, and a transition is made to Step 302. In Step 306, in the case of the push input on the release button 20B being released, a positive determination is made, and a transition is made to Step 318.

In Step 308, the control unit 150A determines whether or not a picture signal acquisition timing arrives. The "picture signal acquisition timing" refers to the case of the picture processing unit 82 performing various types of signal processing for the picture signal corresponding to one frame that is acquired by exposure by the imaging element 60 after a positive determination made in the process of Step 304.

In Step 308, in the case of non-arrival of the picture signal acquisition timing, a negative determination is made, and a transition is made to Step 316. In Step 308, in the case of arrival of the picture signal acquisition timing, a positive determination is made, and a transition is made to Step 310.

In Step 310, the control unit 150A acquires, from the picture processing unit 82, the picture signal corresponding to one frame that is subjected to various types of signal processing by the picture processing unit 82. Then, a transition is made to Step 312.

In Step 312, the control unit 150A generates a motion picture file from the picture signal acquired in the process of Step 310. Then, a transition is made to Step 314.

In Step 314, the control unit 150A records, in the memory card 24, the motion picture file generated in the process of Step 312. Then, a transition is made to Step 316.

In Step 316, the control unit 150A determines whether or not the release button 20B is placed into the ON state again. The release button 20B being placed into the ON state again means that, for example, the state of the push on the release button 20B is released and the release button 20B is pushed again and placed into the half push state or the full push state.

In Step 316, in the case of the release button 20B not being placed into the ON state again, a negative determination is made, and a transition is made to Step 308. In Step 316, in the case of the release button 20B being placed into the ON state again, a positive determination is made, and a transition is made to Step 318.

In Step 318, the control unit 150A determines whether or not a condition for termination of the motion picture imaging mode is satisfied. The condition for termination of the motion picture imaging mode refers to, for example, a condition that the still picture imaging mode is set, or a condition that an instruction to display the reproduced picture on the electronic viewfinder 22 is received by the reception device 20.

In Step 318, in the case of the condition for termination of the motion picture imaging mode not being satisfied, a negative determination is made, and a transition is made to Step 300. In Step 318, in the case of the condition for termination of the motion picture imaging mode being satisfied, a positive determination is made, and the motion picture imaging process is terminated.

Next, a position variation reduction process that is realized by the CPU 120 executing the position variation reduction program 130A in parallel with the case of execution of the live view process will be described with reference to FIG. 13.

Hereinafter, for convenience of description, any of the normal mode and the scan mode will be assumed to be set. In addition, hereinafter, for convenience of description, any of the still picture imaging mode and the motion picture imaging mode will be assumed to be set. In addition, hereinafter, for convenience of description, a sampling cycle of the angular velocity signal will be assumed to be 1.0 millisecond, and a sampling cycle of the position signal will be assumed to be 0.1 milliseconds. In addition, hereinafter, for convenience of description, the target position calculation units 153A and 153B will be assumed to operate in synchronization. In addition, hereinafter, for convenience of description, the position signal acquisition units 154A$_1$ and 154B$_1$ will be assumed to operate in synchronization. In addition, hereinafter, for convenience of description, the position error calculation units 155A$_1$ and 155B$_1$ will be assumed to operate in synchronization.

Figure 13:
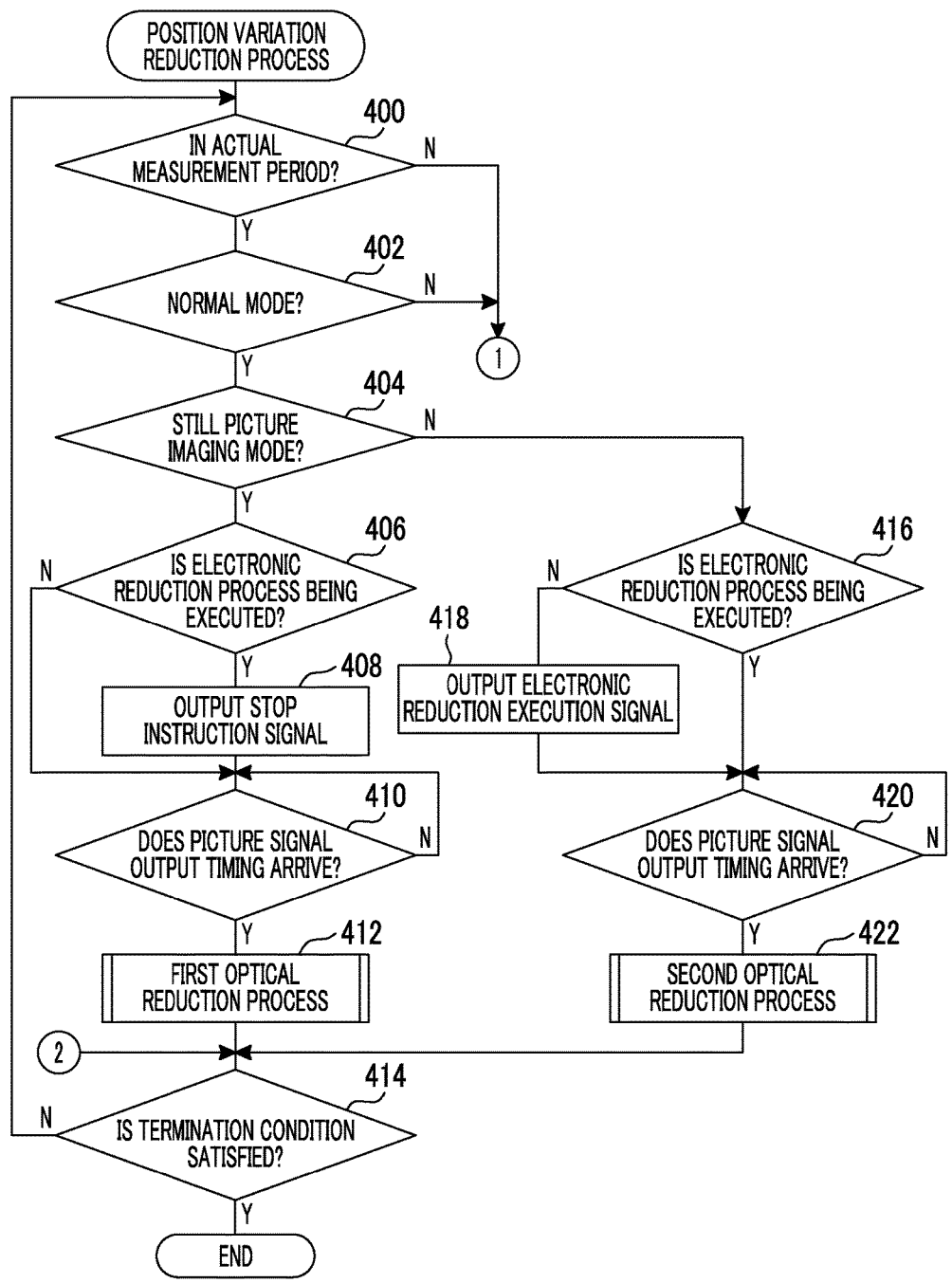
FIG. 13 is a flowchart illustrating one example of a flow of a position variation reduction process according to the first embodiment.

In the position variation reduction process illustrated in FIG. 13, first, in Step 400, the control unit 150A determines whether or not the control unit 150A is in the actual measurement period. In Step 400, in the case of the control unit 150A not being in the actual measurement period, a negative determination is made, and a transition is made to Step 424 illustrated in FIG. 14. In Step 400, in the case of the control unit 150A being in the actual measurement period, a positive determination is made, and a transition is made to Step 402.

Figure 26:
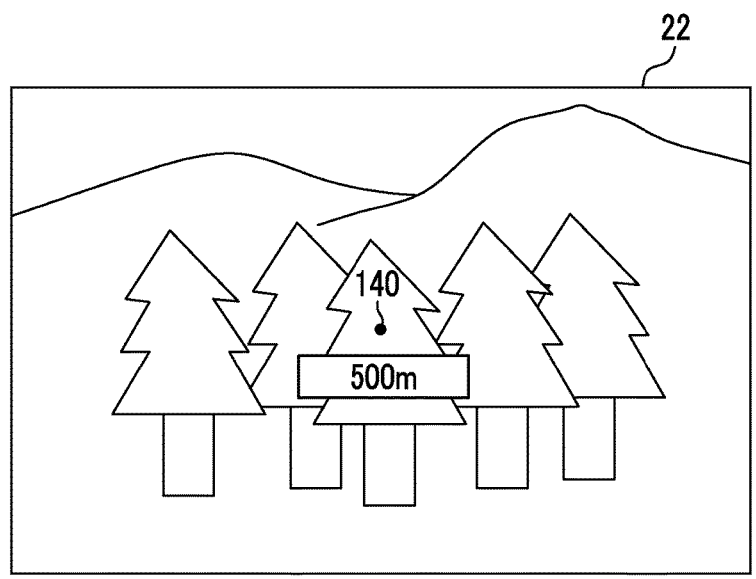
FIG. 26 is a screen diagram illustrating one example of the state of the distance as a distance measurement result being displayed in an overlaid manner on the live view image displayed on the electronic viewfinder included in the distance measurement device according to the first to third embodiments.

As illustrated in FIG. 26 as one example, the electronic viewfinder 22, under control of the control unit 150A, displays the distance calculated by the distance measurement control unit 86 in the actual measurement period in an overlaid manner on the live view image until a display termination condition is satisfied. In the example illustrated in FIG. 26, the state of "500 m (meters)" as the distance measurement result being displayed on the live view image is illustrated. The display termination condition refers to, for example, a condition that the distance measurement instruction button 20A is pushed, or a condition that a predetermined amount of time (for example, three seconds) elapses from initiation of display of the distance without a push of the distance measurement instruction button 20A.

In Step 402, the control unit 150A determines whether or not the normal mode is set. In Step 402, in the case of the normal mode not being set (in the case of the scan mode being set), a negative determination is made, and a transition is made to Step 424 illustrated in FIG. 14. In Step 402, in the case of the normal mode being set, a positive determination is made, and a transition is made to Step 404.

In Step 404, the control unit 150A determines whether or not the still picture imaging mode is set. In Step 404, in the case of the still picture imaging mode not being set (in the case of the motion picture imaging mode being set), a negative determination is made, and a transition is made to Step 416. In Step 404, in the case of the still picture imaging mode being set, a positive determination is made, and a transition is made to Step 406.

In Step 406, the control unit 150A determines whether or not the electronic reduction process is executed by the picture processing unit 82. In Step 406, in the case of the electronic reduction process being executed by the picture processing unit 82, a positive determination is made, and a transition is made to Step 408. In Step 406, in the case of the electronic reduction process not being executed by the picture processing unit 82, a negative determination is made, and a transition is made to Step 410.

In Step 408, the control unit 150A outputs, to the picture processing unit 82, a stop instruction signal that is an instruction to stop execution of the electronic reduction process. Then, a transition is made to Step 410. If the stop instruction signal is input into the picture processing unit 82 by execution of the process of Step 408, the picture processing unit 82 stops execution of the electronic reduction process.

In Step 410, the control unit 150A determines whether or not a picture signal output timing that is defined by the specific frame rate as a timing of the picture processing unit 82 outputting the picture signal to the display control unit 88 arrives. In Step 410, in the case of non-arrival of the picture signal output timing, a negative determination is made, and the determination of Step 410 is performed again. In Step 410, in the case of arrival of the picture signal output timing, a positive determination is made, and a transition is made to Step 412.

Figure 15:
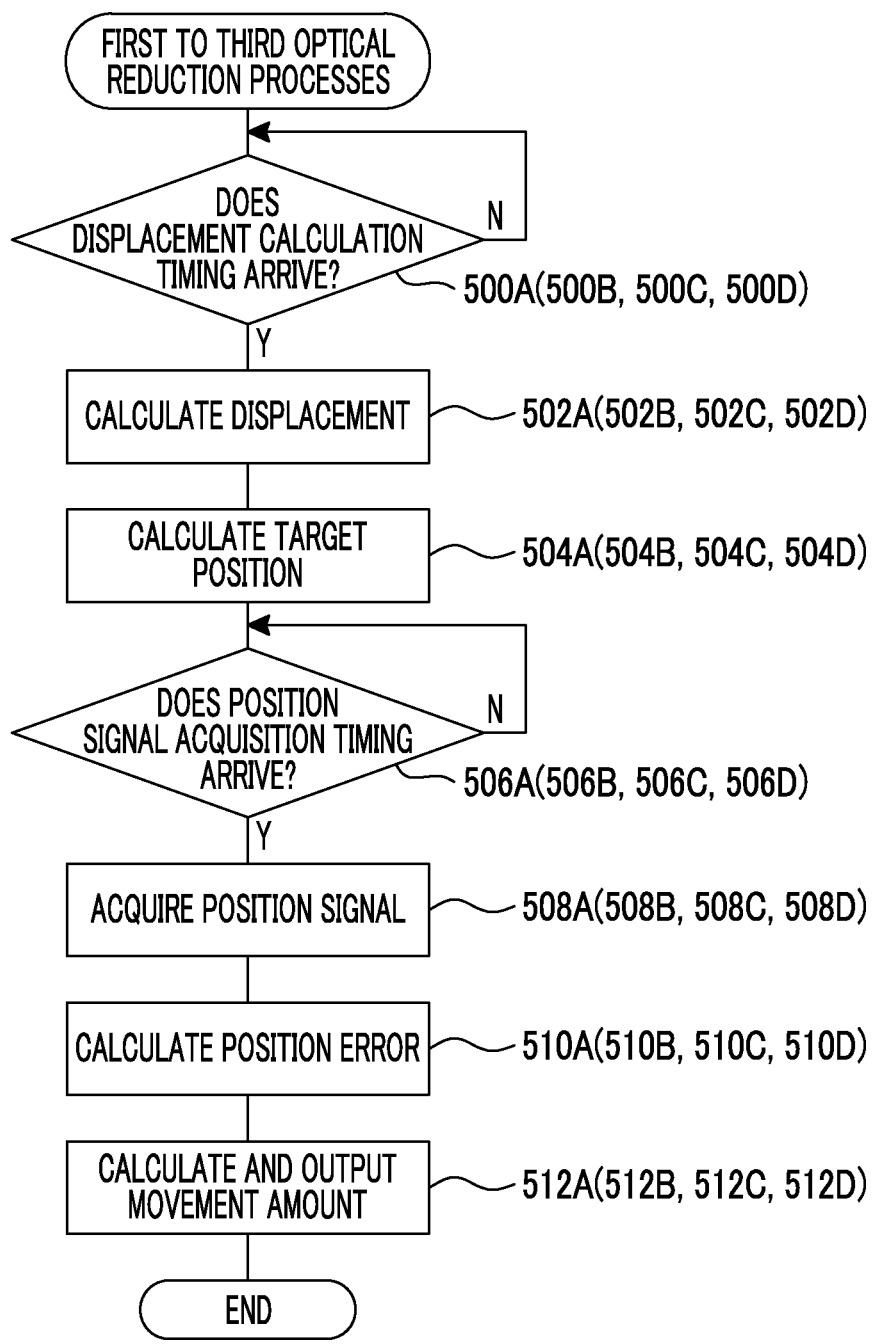
FIG. 15 is a flowchart illustrating one example of a flow of first to third optical reduction processes according to the first and second embodiments.

In Step 412, the control unit 150A executes a first optical reduction process illustrated in FIG. 15 as one example. Then, a transition is made to Step 414.

In the first optical reduction process illustrated in FIG. 15, first, in Step 500A, the displacement calculation unit 152 determines whether or not a displacement calculation timing that is defined by the sampling cycle of the angular velocity signal as a timing of calculation of the direction of displacement and the amount of displacement of the distance measurement device 10A arrives. In Step 500A, in the case of non-arrival of the displacement calculation timing, a negative determination is made, and the determination of Step 500A is performed again. In Step 500A, in the case of arrival of the displacement calculation timing, a positive determination is made, and a transition is made to Step 502A.

In Step 502A, the displacement calculation unit 152 acquires the angular velocity signal and calculates the direction of displacement and the amount of displacement of the distance measurement device 10A based on the acquired angular velocity signal.

In next Step 504A, the target position calculation unit 153A calculates the target position of the imaging system anti-shake lens 66 based on the direction of displacement and the amount of displacement calculated in the process of Step 502A. In addition, in Step 504A, the target position calculation unit 153B calculates the target position of the emission system anti-shake lens 34 based on the direction of displacement and the amount of displacement calculated in the process of Step 502A.

In next Step 506A, the position signal acquisition unit 154A$_1$ determines whether or not a position signal acquisition timing that is defined by the sampling cycle of the position signal as a timing of acquisition of the position signal arrives. In Step 506A, in the case of non-arrival of the position signal acquisition timing, a negative determination is made, and the determination of Step 506A is performed again. In Step 506A, in the case of arrival of the position signal acquisition timing, a positive determination is made, and a transition is made to Step 508A.

In Step 508A, the position signal acquisition unit 154A$_1$ acquires the imaging system position signal from the position signal processing circuit 96. In addition, in Step 508A, the position signal acquisition unit 154B$_1$ acquires the emission system position signal from the position signal processing circuit 94.

In next Step 510A, the position error calculation unit 155A$_1$ calculates the imaging system position error from the current position of the imaging system anti-shake lens 66 indicated by the imaging system position signal acquired in Step 508A and from the target position of the imaging system anti-shake lens 66 calculated in the process of Step 504A.

In Step 510A, the position error calculation unit 155B$_1$ calculates the emission system position error from the current position of the emission system anti-shake lens 34 indicated by the emission system position signal acquired in Step 508A and from the target position of the emission system anti-shake lens 34 calculated in the process of Step 504A.

In next Step 512A, the movement amount calculation unit 156A$_1$ uses the imaging system optical axis movement amount calculation formula to calculate the imaging system optical axis movement amount from the imaging system position error calculated in the process of Step 510A and outputs the calculated imaging system optical axis movement amount to the variation mechanism driver 100.

The variation mechanism driver 100 outputs, to the motive power source 70A, a drive pulse that corresponds to the imaging system optical axis movement amount input from the movement amount calculation unit 156A$_1$. The motive power transmission mechanism of the anti-shake lens variation mechanism 70 transmits the motive power generated by the motive power source 70A to the imaging system anti-shake lens 66 in accordance with the input drive pulse, thereby moving the imaging system anti-shake lens 66 by the distance of movement corresponding to the drive pulse in the direction of movement corresponding to the drive pulse.

In Step 512A, the movement amount calculation unit 156B$_1$ uses the emission system optical axis movement amount calculation formula to calculate the emission system optical axis movement amount from the emission system position error calculated in the process of Step 510A. The movement amount calculation unit 156B$_1$ adjusts the emission system optical axis movement amount if necessary.

The case of adjusting the emission system optical axis movement amount refers to the case of the absolute value of the calculated emission system optical axis movement amount exceeding the absolute value of the imaging system optical axis movement amount at the current point in time. The "imaging system optical axis movement amount at the current point in time" refers to the latest imaging system optical axis movement amount calculated by the movement amount calculation unit 156A$_1$.

The movement amount calculation unit 156B$_1$, in the case of the absolute value of the calculated emission system optical axis movement amount being less than or equal to the absolute value of the imaging system optical axis movement amount at the current point in time, outputs the calculated emission system optical axis movement amount to the variation mechanism driver 98. The movement amount calculation unit 156B$_1$, in the case of the absolute value of the calculated emission system optical axis movement amount exceeding the absolute value of the imaging system optical axis movement amount at the current point in time, adjusts the emission system optical axis movement amount in such a manner that the relationship "absolute value of emission system optical axis movement amount=absolute value of imaging system optical axis movement amount at current point in time" is established. The movement amount calculation unit 156B$_1$ outputs the emission system optical axis movement amount acquired after adjustment to the variation mechanism driver 98. Then, the first optical reduction process is terminated.

The variation mechanism driver 98 outputs, to the motive power source 38A, a drive pulse that corresponds to the emission system optical axis movement amount input from the movement amount calculation unit 156B$_1$. The motive power transmission mechanism of the anti-shake lens variation mechanism 38 transmits the motive power generated by the motive power source 38A to the emission system anti-shake lens 34 in accordance with the input drive pulse, thereby moving the emission system anti-shake lens 34 by the distance of movement corresponding to the drive pulse in the direction of movement corresponding to the drive pulse.

In Step 416 illustrated in FIG. 13, the control unit 150A determines whether or not the electronic reduction process is executed by the picture processing unit 82. In Step 416, in the case of the electronic reduction process not being executed by the picture processing unit 82, a negative determination is made, and a transition is made to Step 418. In Step 416, in the case of the electronic reduction process being executed by the picture processing unit 82, a positive determination is made, and a transition is made to Step 420.

In Step 418, the control unit 150A outputs, to the picture processing unit 82, the electronic reduction execution signal that is an instruction to execute the electronic reduction process. Then, a transition is made to Step 420. If the electronic reduction execution signal is input into the picture processing unit 82 by execution of the process of Step 418, the picture processing unit 82 initiates execution of the electronic reduction process.

In Step 420, the control unit 150A determines whether or not the picture signal output timing arrives. In Step 420, in the case of non-arrival of the picture signal output timing, a negative determination is made, and the determination of Step 420 is performed again. In Step 420, in the case of arrival of the picture signal output timing, a positive determination is made, and a transition is made to Step 422.

In Step 422, the control unit 150A executes a second optical reduction process illustrated in FIG. 15 as one example. Then, a transition is made to Step 414.

In the second optical reduction process illustrated in FIG. 15, first, in Step 500B, the displacement calculation unit 152 determines whether or not the displacement calculation timing arrives. In Step 500B, in the case of non-arrival of the displacement calculation timing, a negative determination is made, and the determination of Step 500B is performed again. In Step 500B, in the case of arrival of the displacement calculation timing, a positive determination is made, and a transition is made to Step 502B.

In Step 502B, the displacement calculation unit 152 acquires the angular velocity signal and calculates the direction of displacement and the amount of displacement of the distance measurement device 10A based on the acquired angular velocity signal.

In next Step 504B, the target position calculation unit 153B calculates the target position of the emission system anti-shake lens 34 based on the direction of displacement and the amount of displacement calculated in the process of Step 502B.

In next Step 506B, the position signal acquisition unit 154B$_1$ determines whether or not the position signal acquisition timing arrives. In Step 506B, in the case of non-arrival of the position signal acquisition timing, a negative determination is made, and the determination of Step 506B is performed again. In Step 506B, in the case of arrival of the position signal acquisition timing, a positive determination is made, and a transition is made to Step 508B.

In Step 508B, the position signal acquisition unit 154B$_1$ acquires the emission system position signal from the position signal processing circuit 94.

In next Step 510B, the position error calculation unit 155B$_1$ calculates the emission system position error from the current position of the emission system anti-shake lens 34 indicated by the emission system position signal acquired in Step 508B and from the target position of the emission system anti-shake lens 34 calculated in Step 504B.

In next Step 512B, the movement amount calculation unit 156B$_1$ uses the emission system optical axis movement amount calculation formula to calculate the emission system optical axis movement amount from the emission system position error calculated in the process of Step 510B. The movement amount calculation unit 156B$_1$ adjusts the emission system optical axis movement amount if necessary.

The case of adjusting the emission system optical axis movement amount refers to the case of the absolute value of the calculated emission system optical axis movement amount exceeding the absolute value of the imaging system optical axis movement amount at the current point in time. The "imaging system optical axis movement amount at the current point in time" refers to the latest imaging system optical axis movement amount that is necessarily determined from the amount of shifting of the picture calculated in the electronic reduction process which is executed by the picture processing unit 82 in parallel with the position variation reduction process. The latest imaging system optical axis movement amount is a physical quantity that corresponds to the latest imaging system optical axis movement amount acquired by execution of the process of Step 512A in the first optical reduction process. The latest imaging system optical axis movement amount, for example, is derived from a conversion table in which the amount of shifting of the picture is associated with the imaging system optical axis movement amount, or from the imaging system optical axis movement amount calculation formula with the amount of shifting of the picture as an independent variable and the imaging system optical axis movement amount as a dependent variable.

The movement amount calculation unit 156B$_1$, in the case of the absolute value of the calculated emission system optical axis movement amount being less than or equal to the absolute value of the imaging system optical axis movement amount at the current point in time, outputs the calculated emission system optical axis movement amount to the variation mechanism driver 98. The movement amount calculation unit 156B$_1$, in the case of the absolute value of the calculated emission system optical axis movement amount exceeding the absolute value of the imaging system optical axis movement amount at the current point in time, adjusts the emission system optical axis movement amount in such a manner that the relationship "absolute value of emission system optical axis movement amount=absolute value of imaging system optical axis movement amount at current point in time" is established. The movement amount calculation unit 156B$_1$ outputs the emission system optical axis movement amount acquired after adjustment to the variation mechanism driver 98. Then, the second optical reduction process is terminated.

If the movement amount calculation unit 156B$_1$ outputs the emission system optical axis movement amount to the variation mechanism driver 98 by execution of the process of Step 512B, the variation mechanism driver 98 and the anti-shake lens variation mechanism 38 operate in the same manner as in the case of execution of the first optical reduction process.

Figure 14:
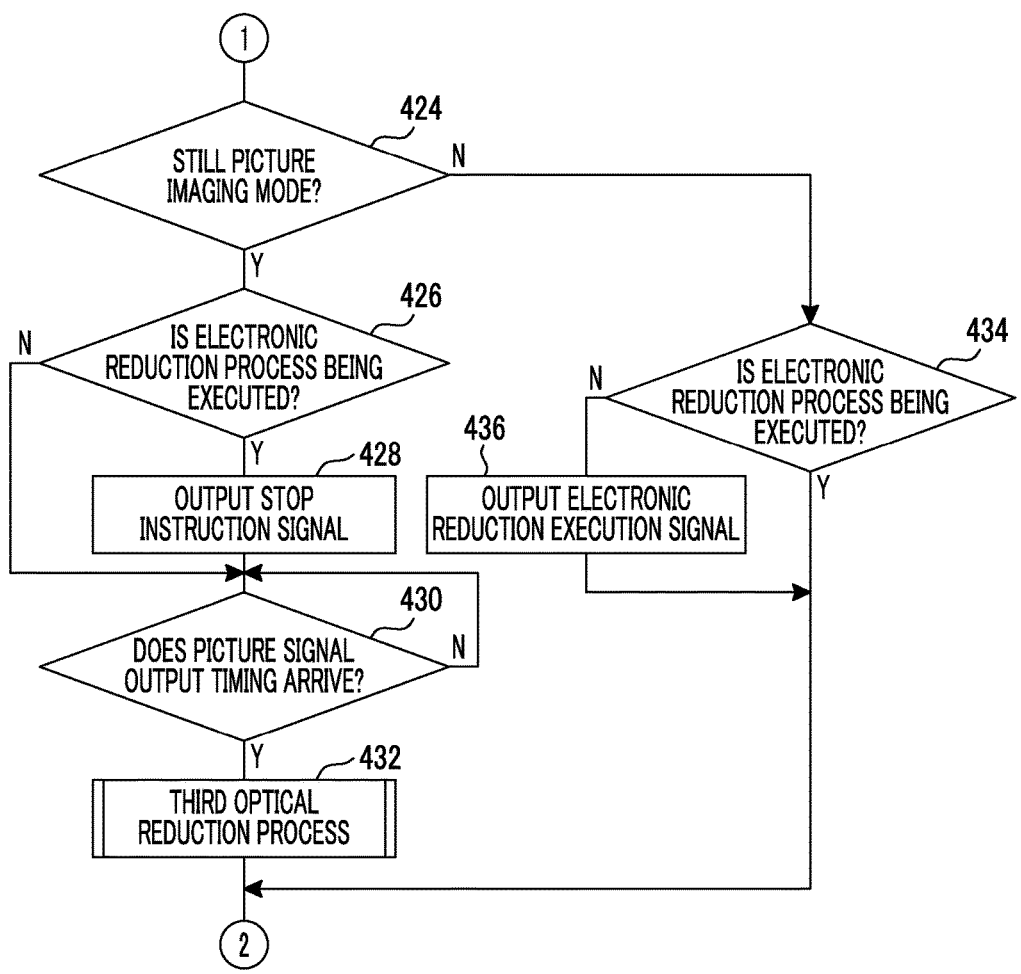
FIG. 14 is a flowchart continued from the flowchart illustrated in FIG. 13.

In Step 424 illustrated in FIG. 14, the control unit 150A determines whether or not the still picture imaging mode is set. In Step 424, in the case of the still picture imaging mode not being set (in the case of the motion picture imaging mode being set), a negative determination is made, and a transition is made to Step 434. In Step 424, in the case of the still picture imaging mode being set, a positive determination is made, and a transition is made to Step 426.

In Step 426, the control unit 150A determines whether or not the electronic reduction process is executed by the picture processing unit 82. In Step 426, in the case of the electronic reduction process being executed by the picture processing unit 82, a positive determination is made, and a transition is made to Step 428. In Step 426, in the case of the electronic reduction process not being executed by the picture processing unit 82, a negative determination is made, and a transition is made to Step 430.

In Step 428, the control unit 150A outputs, to the picture processing unit 82, the stop instruction signal that is an instruction to stop execution of the electronic reduction process. Then, a transition is made to Step 430. If the stop instruction signal is input into the picture processing unit 82 by execution of the process of Step 428, the picture processing unit 82 stops execution of the electronic reduction process.

In Step 430, the control unit 150A determines whether or not the picture signal output timing arrives. In Step 430, in the case of non-arrival of the picture signal output timing, a negative determination is made, and the determination of Step 430 is performed again. In Step 430, in the case of arrival of the picture signal output timing, a positive determination is made, and a transition is made to Step 432.

In Step 432, the control unit 150A executes a third optical reduction process illustrated in FIG. 15 as one example. Then, a transition is made to Step 414.

In the third optical reduction process illustrated in FIG. 15, first, in Step 500C, the displacement calculation unit 152 determines whether or not the displacement calculation timing arrives. In Step 500C, in the case of non-arrival of the displacement calculation timing, a negative determination is made, and the determination of Step 500C is performed again. In Step 500C, in the case of arrival of the displacement calculation timing, a positive determination is made, and a transition is made to Step 502C.

In Step 502C, the displacement calculation unit 152 acquires the angular velocity signal and calculates the direction of displacement and the amount of displacement of the distance measurement device 10A based on the acquired angular velocity signal.

In next Step 504C, the target position calculation unit 153A calculates the target position of the imaging system anti-shake lens 66 based on the direction of displacement and the amount of displacement calculated in the process of Step 502C.

In next Step 506C, the position signal acquisition unit 154A$_1$ determines whether or not the position signal acquisition timing arrives. In Step 506C, in the case of non-arrival of the position signal acquisition timing, a negative determination is made, and the determination of Step 506C is performed again. In Step 506C, in the case of arrival of the position signal acquisition timing, a positive determination is made, and a transition is made to Step 508C.

In Step 508C, the position signal acquisition unit 154A$_1$ acquires the imaging system position signal from the position signal processing circuit 96.

In next Step 510C, the position error calculation unit 155A$_1$ calculates the imaging system position error from the current position of the imaging system anti-shake lens 66 indicated by the imaging system position signal acquired in Step 508C and from the target position of the imaging system anti-shake lens 66 calculated in Step 504C.

In next Step 512C, the movement amount calculation unit 156A$_1$ uses the imaging system optical axis movement amount calculation formula to calculate the imaging system optical axis movement amount from the imaging system position error calculated in the process of Step 510C. The movement amount calculation unit 156A$_1$ outputs the calculated imaging system optical axis movement amount to the variation mechanism driver 100. Then, the third optical reduction process is terminated. Accordingly, the variation mechanism driver 100 and the anti-shake lens variation mechanism 70 operate in the same manner as in the case of execution of the first optical reduction process.

In Step 434 illustrated in FIG. 14, the control unit 150A determines whether or not the electronic reduction process is executed by the picture processing unit 82. In Step 434, in the case of the electronic reduction process not being executed by the picture processing unit 82, a negative determination is made, and a transition is made to Step 436. In Step 434, in the case of the electronic reduction process being executed by the picture processing unit 82, a positive determination is made, and a transition is made to Step 414.

In Step 436, the control unit 150A outputs the electronic reduction execution signal to the picture processing unit 82. Then, a transition is made to Step 414. If the electronic reduction execution signal is input into the picture processing unit 82 by execution of the process of Step 436, the picture processing unit 82 initiates execution of the electronic reduction process.

In Step 414 illustrated in FIG. 13, the control unit 150A determines whether or not a condition for termination of the position variation reduction process is satisfied. One example of the condition for termination of the position variation reduction process is exemplified by a condition that an instruction to terminate the position variation reduction process is received by the reception device 20, or a condition that a predetermined amount of time (for example, 30 minutes) elapses from initiation of the execution of the position variation reduction process.

In Step 414, in the case of the condition for termination of the position variation reduction process not being satisfied, a negative determination is made, and a transition is made to Step 400. In Step 414, in the case of the condition for termination of the position variation reduction process being satisfied, a positive determination is made, and the position variation reduction process is terminated.

As described heretofore, in the distance measurement device 10A, in the case of operating the image shake reduction unit 63 and the laser shake reduction unit 33 at the same time, the control unit 150A controls the image shake reduction unit 63 and the laser shake reduction unit 33 to reduce the position variation phenomenon.

Accordingly, the distance measurement device 10A can reduce shifting, by operation of the image shake reduction unit 63, of the irradiation position 142 from the center 140 in the picture, compared with the case of performing an operation of reducing the image shake and an operation of reducing the laser shake regardless of each other.

In the distance measurement device 10A, the control unit 150A, in the case of executing the electronic reduction process and operating the laser shake reduction unit 33 at the same time, controls the picture processing unit 82 and the laser shake reduction unit 33 to reduce the position variation phenomenon.

Accordingly, the distance measurement device 10A can reduce shifting, by execution of the electronic reduction process, of the irradiation position 142 from the center 140 in the picture, compared with the case of executing the electronic reduction process and performing an operation of reducing the laser shake regardless of each other. Hereinafter, for convenience of description, a phenomenon of shifting of the irradiation position 142 from the center 140 in the picture by operation of the image shake reduction unit 63 and a phenomenon of shifting of the irradiation position 142 from the center 140 in the picture by execution of the electronic reduction process will be referred to as a "shift phenomenon".

In the distance measurement device 10A, the target position calculation unit 153A calculates the target position of the imaging system anti-shake lens 66 based on a calculation result of the displacement calculation unit 152. The movement amount calculation unit 156A$_1$ calculates the imaging system optical axis movement amount in accordance with the target position of the imaging system anti-shake lens 66 and the imaging system position signal acquired by the position signal acquisition unit 154A$_1$, and the anti-shake lens variation mechanism 70 is controlled based on the imaging system optical axis movement amount. The target position calculation unit 153B calculates the target position of the emission system anti-shake lens 34 based on the calculation result of the displacement calculation unit 152.

In the case of operating the image shake reduction unit 63 and the laser shake reduction unit 33 at the same time, the movement amount calculation unit 156B$_1$ calculates the emission system optical axis movement amount in accordance with the target position of the emission system anti-shake lens 34 and the emission system position signal acquired by the position signal acquisition unit 154B$_1$. The anti-shake lens variation mechanism 38 is controlled based on the calculated emission system optical axis movement amount.

Accordingly, the distance measurement device 10A can reduce the shift phenomenon with high accuracy, compared with the case of controlling the anti-shake lens variation mechanism 38 without using the target position of the emission system anti-shake lens 34.

In the distance measurement device 10A, the image shake reduction unit 63 is used as a single mechanism that reduces the image shake. Accordingly, the distance measurement device 10A can reduce the image shake with a simple configuration, compared with the case of reducing the image shake by using a plurality of mechanisms.

In the distance measurement device 10A, the picture processing unit 82 executes the electronic reduction process. Accordingly, the distance measurement device 10A can easily reduce the picture shake, compared with the case of the picture processing unit 82 not executing the electronic reduction process.

In the distance measurement device 10A, the anti-shake lens variation mechanism 38 varies the emission system anti-shake lens 34 in accordance with variation of the optical axis L1. Accordingly, the distance measurement device 10A can reduce the laser shake with a simple configuration, compared with the case of not using the anti-shake lens variation mechanism 38.

In the distance measurement device 10A, during operation of the image shake reduction unit 63, the movement amount calculation unit 156B$_1$ calculates the emission system optical axis movement amount having an absolute value less than or equal to the absolute value of the imaging system optical axis movement amount and outputs the emission system optical axis movement amount to the variation mechanism driver 98. In addition, in the distance measurement device 10A, during execution of the electronic reduction process, the movement amount calculation unit 156B$_1$ calculates the emission system optical axis movement amount having an absolute value less than or equal to the absolute value of the imaging system optical axis movement amount and outputs the emission system optical axis movement amount to the variation mechanism driver 98. Accordingly, the emission system anti-shake lens 34 varies in accordance with variation of the optical axis L1 within the range of the imaging system optical axis movement amount.

Accordingly, the distance measurement device 10A can increase the accuracy of reduction of the shift phenomenon, compared with the case of calculating the emission system optical axis movement amount having an absolute value above the absolute value of the imaging system optical axis movement amount and outputting the emission system optical axis movement amount to the variation mechanism driver 98.

In the distance measurement device 10A, during operation of the image shake reduction unit 63 or execution of the electronic reduction process, the laser shake reduction unit 33 is not operated outside of the actual measurement period (Step 400: N), and the laser shake reduction unit 33 is operated in the actual measurement period (Step 400: Y). Accordingly, the distance measurement device 10A can reduce power consumption, compared with the case of operating the laser shake reduction unit 33 at all times during operation of the image shake reduction unit 63 or execution of the electronic reduction process.

In the distance measurement device 10A, in the case of the scan mode being set (Step 402: N) during operation of the image shake reduction unit 63, the control unit 150A controls the laser shake reduction unit 33 not to operate the laser shake reduction unit 33. Accordingly, the distance measurement device 10A can reduce occurrence of the actual scan range of laser light being narrower than an intended scan range of the user, compared with the case of operating the laser shake reduction unit 33 in the state of the scan mode being set during operation of the image shake reduction unit 63.

In the distance measurement device 10A, in the case of the scan mode being set (Step 402: N) during execution of the electronic reduction process, the control unit 150A controls the laser shake reduction unit 33 not to operate the laser shake reduction unit 33. Accordingly, the distance measurement device 10A can reduce occurrence of the actual scan range of laser light being narrower than the intended scan range of the user, compared with the case of operating the laser shake reduction unit 33 in the state of the scan mode being set during execution of the electronic reduction process.

In the distance measurement device 10A, the imaging element 60 is employed. Accordingly, the distance measurement device 10A can acquire a picture with the shift phenomenon reduced, compared with the case of not employing the imaging element 60.

In the distance measurement device 10A, the image shake reduction unit 63 is operated in the case of the still picture imaging mode being set, and the picture processing unit 82 executes the electronic reduction process in the case of the motion picture imaging mode being set. Accordingly, the distance measurement device 10A can reduce power consumption, compared with the case of operating the image shake reduction unit 63 at all times regardless of the operating mode of the imaging system.

In the distance measurement device 10A, during operation of the anti-shake lens variation mechanism 70 or execution of the electronic reduction process, the laser shake reduction unit 33 is operated per interval that is determined in accordance with the specific frame rate (Steps 410, 420, and 430: Y). Accordingly, the distance measurement device 10A can reduce the shift phenomenon with simple control, compared with the case of operating the laser shake reduction unit 33 at an irrelevant timing to the specific frame rate.

In the distance measurement device 10A, the distance calculated by the distance measurement control unit 86 in the actual measurement period is displayed in a display region of the live view image. Accordingly, the distance measurement device 10A can cause the user to easily recognize, along with the corresponding live view image, the distance that is acquired in a situation where the shift phenomenon is reduced, compared with the case of not displaying the distance calculated by the distance measurement control unit 86 in the display region of the live view image.

While the first embodiment illustrates the case of the movement amount calculation unit 156B$_1$ adjusting the emission system optical axis movement amount in such a manner that the relationship "absolute value of emission system optical axis movement amount=absolute value of imaging system optical axis movement amount at current point in time" is established, the technology of the present disclosure is not limited thereto. For example, the emission system optical axis movement amount may be adjusted in such a manner that the relationship "0<absolute value of emission system optical axis movement amount<absolute value of imaging system optical axis movement amount at current point in time" is established.

While the first embodiment does not operate the laser shake reduction unit 33 in the case of the scan mode being set during operation of the image shake reduction unit 63 or execution of the electronic reduction process, the technology of the present disclosure is not limited thereto. For example, an operation level of the laser shake reduction unit 33 may be decreased without stopping operation in the case of the scan mode being set during operation of the image shake reduction unit 63 or execution of the electronic reduction process.

While the first embodiment describes the case of reducing the shift phenomenon assuming that the center 140 is the reference position, the technology of the present disclosure is not limited thereto. For example, shifting of the irradiation position 142 from the reference position may be reduced by executing the position variation reduction process with a specific fixed position other than the center 140 of the live view image as the reference position (a position where the irradiation position 142 is supposed to be present).

While the first embodiment illustrates the electronic reduction process that reduces the picture shake by comparing time-series preceding and succeeding two picture signals, the technology of the present disclosure is not limited thereto. For example, an electronic reduction process that, like the first and third optical reduction processes, reduces the picture shake based on the imaging system optical axis movement amount which is determined in accordance with the previously acquired picture signal and the calculation result of the displacement calculation unit 152 may be employed.

[Second Embodiment]

While the first embodiment illustrates the case of using the target position calculation units 153A and 153B together, a second embodiment will describe the case of not using the target position calculation unit 153B. In the second embodiment, the same constituents as the constituents described in the first embodiment will be designated by the same reference signs and will not be described.

As illustrated in FIG. 6 as one example, a distance measurement device 10B (refer to FIG. 1) according to the second embodiment is different from the distance measurement device 10A according to the first embodiment in that the ROM 124 stores a position variation reduction program 130B instead of the position variation reduction program 130A.

Figure 16:
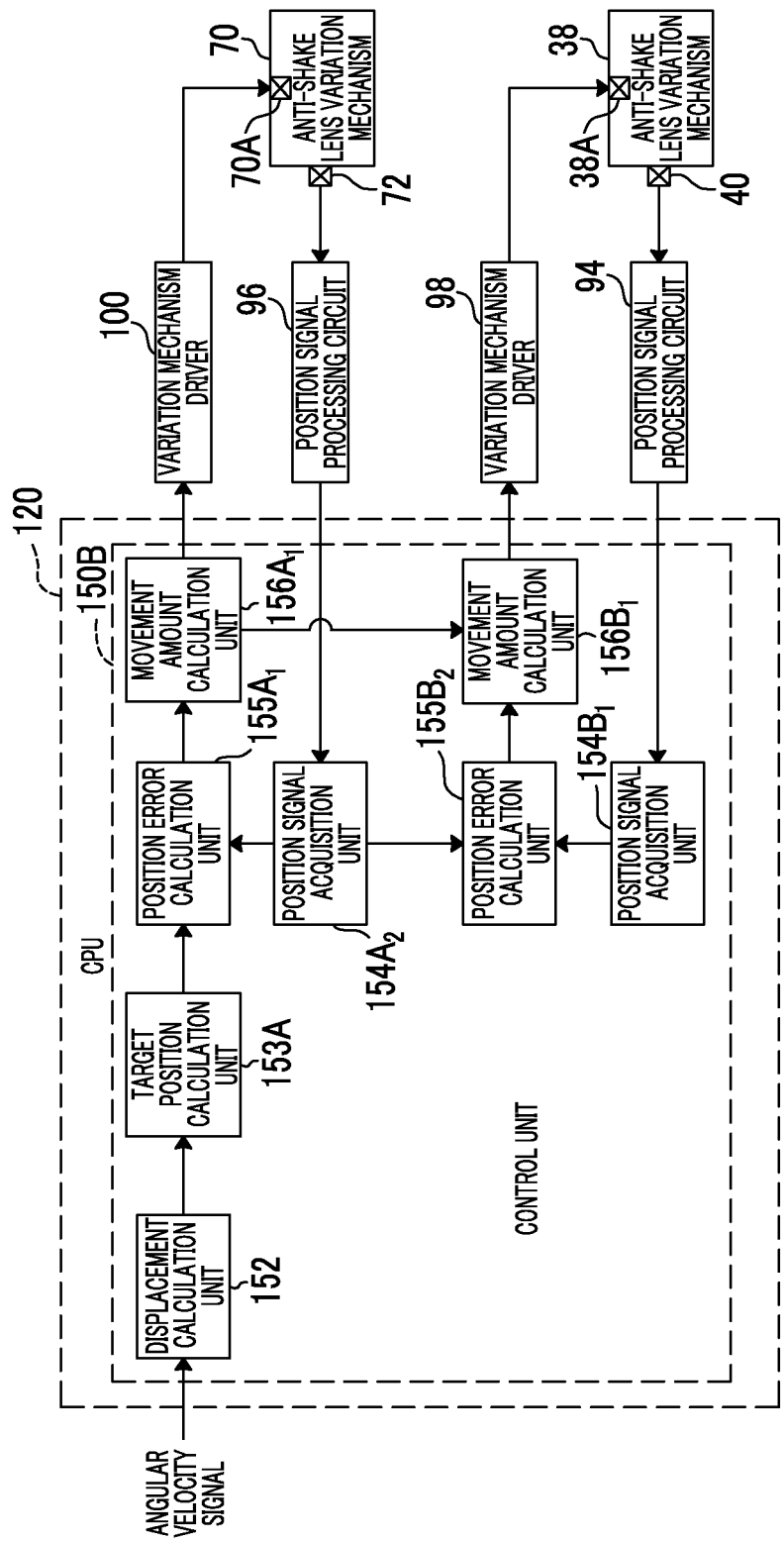
FIG. 16 is a block diagram illustrating one example of main functions of a CPU included in the main control unit of the distance measurement device according to the second embodiment.

The CPU 120 reads and loads the position variation reduction program 130B from the ROM 124 into the RAM 122 and executes the position variation reduction program 130B, thereby operating as a control unit 150B illustrated in FIG. 16 as one example.

As illustrated in FIG. 16 as one example, the control unit 150B is different from the control unit 150A illustrated in FIG. 8 in that the control unit 150B does not have the target position calculation unit 153B. In addition, the control unit 150B is different from the control unit 150A illustrated in FIG. 8 in that the control unit 150B has a position signal acquisition unit $154A_2$ instead of the position signal acquisition unit $154A_1$ and has a position error calculation unit $155B_2$ instead of the position error calculation unit $155B_1$.

The position signal acquisition unit $154A_2$ is different from the position signal acquisition unit $154A_1$ illustrated in FIG. 8 in that the position signal acquisition unit $154A_2$ outputs the imaging system position signal to the position error calculation unit $155B_2$ as well.

The position error calculation unit $155B_2$ calculates a current position difference. The current position difference refers to the difference between the current position of the imaging system anti-shake lens 66 indicated by the imaging system position signal input from the position signal acquisition unit $154A_2$ and the current position of the emission system anti-shake lens 34 indicated by the emission system position signal input from the position signal acquisition unit $154B_1$.

The position error calculation unit $155B_2$ calculates the emission system position error described in the first embodiment from an emission system position error calculation formula by using the calculated current position difference.

The emission system position error calculation formula refers to, for example, a calculation formula with the current position difference as an independent variable and the emission system position error as a dependent variable.

The position error calculation unit $155B_2$ may derive the emission system position error from an emission system position error derivation table in which the current position difference is associated with the emission system position error, without using the emission system position error calculation formula.

Next, a different part of the action of the distance measurement device 10B from the content described in the first embodiment will be described.

First, a first optical reduction process according to the second embodiment will be described with reference to FIG. 15.

In the first optical reduction process according to the second embodiment, in Step 500D, the displacement calculation unit 152 determines whether or not the displacement calculation timing that is defined by the sampling cycle of the angular velocity signal as a timing of calculation of the direction of displacement and the amount of displacement of the distance measurement device 10B arrives. In Step 500D, in the case of non-arrival of the displacement calculation timing, a negative determination is made, and the determination of Step 500D is performed again. In Step 500D, in the case of arrival of the displacement calculation timing, a positive determination is made, and a transition is made to Step 502D.

In Step 502D, the displacement calculation unit 152 acquires the angular velocity signal and calculates the direction of displacement and the amount of displacement of the distance measurement device 10B based on the acquired angular velocity signal.

In next Step 504D, the target position calculation unit 153A calculates the target position of the imaging system anti-shake lens 66 based on the direction of displacement and the amount of displacement calculated in the process of Step 502D.

In next Step 506D, the position signal acquisition unit $154A_2$ determines whether or not the position signal acquisition timing arrives. In Step 506D, in the case of non-arrival of the position signal acquisition timing, a negative determination is made, and the determination of Step 506D is performed again. In Step 506D, in the case of arrival of the position signal acquisition timing, a positive determination is made, and a transition is made to Step 508D.

In Step 508D, the position signal acquisition unit $154A_2$ acquires the imaging system position signal from the position signal processing circuit 96. In addition, in Step 508D, the position signal acquisition unit $154B_1$ acquires the emission system position signal from the position signal processing circuit 94.

In next Step 510D, the position error calculation unit $155A_1$ calculates the imaging system position error from the current position of the imaging system anti-shake lens 66 indicated by the imaging system position signal acquired in Step 508D and from the target position of the imaging system anti-shake lens 66 calculated in Step 504D.

In Step 510D, the position error calculation unit $155B_2$ calculates the current position difference from the imaging system position signal and the emission system position signal acquired in the process of Step 508D. The position error calculation unit $155B_2$ calculates the emission system position error described in the first embodiment from the emission system position error calculation formula by using the current position difference.

In next Step 512D, the movement amount calculation unit $156A_1$ uses the imaging system optical axis movement amount calculation formula to calculate the imaging system optical axis movement amount from the imaging system position error calculated in the process of Step 510D and outputs the calculated imaging system optical axis movement amount to the variation mechanism driver 100. Accordingly, the variation mechanism driver 100 and the anti-shake lens variation mechanism 70 operate in the same manner as in the case of execution of the first optical reduction process according to the first embodiment.

In Step 512D, the movement amount calculation unit $156B_1$ uses the emission system optical axis movement amount calculation formula to calculate the emission system optical axis movement amount from the emission system position error calculated in the process of Step 510D. The movement amount calculation unit $156B_1$ adjusts the emission system optical axis movement amount if necessary.

In Step 512D, the movement amount calculation unit $156B_1$, in the case of the absolute value of the calculated emission system optical axis movement amount being less than or equal to the absolute value of the imaging system optical axis movement amount at the current point in time, outputs the calculated emission system optical axis movement amount to the variation mechanism driver 98.

In Step 512D, the movement amount calculation unit 156B$_1$, in the case of the absolute value of the calculated emission system optical axis movement amount exceeding the absolute value of the imaging system optical axis movement amount at the current point in time, adjusts the emission system optical axis movement amount in the same manner as Step 512A. The movement amount calculation unit 156B$_1$ outputs the emission system optical axis movement amount acquired after adjustment to the variation mechanism driver 98. Then, the first optical reduction process is terminated.

If the emission system optical axis movement amount is output to the variation mechanism driver 98 by execution of the process of Step 512D, the variation mechanism driver 98 and the anti-shake lens variation mechanism 38 operate in the same manner as in the case of execution of the first optical reduction process according to the first embodiment.

Figure 17:
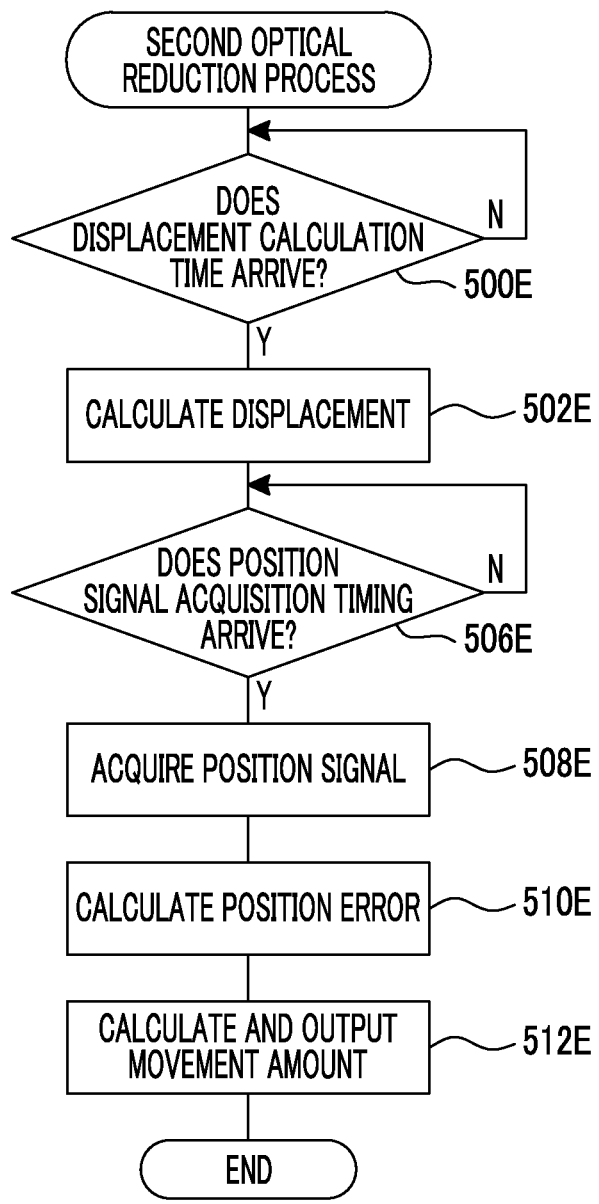
FIG. 17 is a flowchart illustrating one example of a flow of the second optical reduction process according to the second embodiment.

Next, a second optical reduction process according to the second embodiment will be described with reference to FIG. 17.

In the second optical reduction process according to the second embodiment, in Step 500E, the displacement calculation unit 152 determines whether or not the displacement calculation timing arrives. In Step 500E, in the case of non-arrival of the displacement calculation timing, a negative determination is made, and the determination of Step 500E is performed again. In Step 500E, in the case of arrival of the displacement calculation timing, a positive determination is made, and a transition is made to Step 502E.

In Step 502E, the displacement calculation unit 152 acquires the angular velocity signal and calculates the direction of displacement and the amount of displacement of the distance measurement device 10B based on the acquired angular velocity signal, and a transition is made to Step 506E.

In Step 506E, the position signal acquisition unit 154B$_1$ determines whether or not the position signal acquisition timing arrives. In Step 506E, in the case of non-arrival of the position signal acquisition timing, a negative determination is made, and the determination of Step 506E is performed again. In Step 506E, in the case of arrival of the position signal acquisition timing, a positive determination is made, and a transition is made to Step 508E.

In Step 508E, the position signal acquisition unit 154A$_2$ acquires the imaging system position signal from the position signal processing circuit 96. In addition, in Step 508E, the position signal acquisition unit 154B$_1$ acquires the emission system position signal from the position signal processing circuit 94.

In next Step 510E, the position error calculation unit 155B$_2$ calculates the current position difference from the imaging system position signal and the emission system position signal acquired in the process of Step 508E. The position error calculation unit 155B$_2$ calculates the emission system position error described in the first embodiment from the emission system position error calculation formula by using the current position difference.

In next Step 512E, the movement amount calculation unit 156B$_1$ uses the emission system optical axis movement amount calculation formula to calculate the emission system optical axis movement amount from the emission system position error calculated in the process of Step 510E. The movement amount calculation unit 156B$_1$, in the same manner as in Step 512D, adjusts the emission system optical axis movement amount if necessary.

In Step 512E, the movement amount calculation unit 156B$_1$, in the case of the absolute value of the calculated emission system optical axis movement amount being less than or equal to the absolute value of the imaging system optical axis movement amount at the current point in time, outputs the calculated emission system optical axis movement amount to the variation mechanism driver 98.

In Step 512E, the movement amount calculation unit 156B$_1$, in the case of the absolute value of the calculated emission system optical axis movement amount exceeding the absolute value of the imaging system optical axis movement amount at the current point in time, adjusts the emission system optical axis movement amount in the same manner as Step 512D. The movement amount calculation unit 156B$_1$ outputs the emission system optical axis movement amount acquired after adjustment to the variation mechanism driver 98. Then, the second optical reduction process is terminated.

If the emission system optical axis movement amount is output to the variation mechanism driver 98 by execution of the process of Step 512E, the variation mechanism driver 98 and the anti-shake lens variation mechanism 38 operate in the same manner as in the case of execution of the second optical reduction process according to the first embodiment.

As described heretofore, in the distance measurement device 10B, the target position calculation unit 153A calculates the target position of the imaging system anti-shake lens 66 based on the calculation result of the displacement calculation unit 152. The movement amount calculation unit 156A$_1$ calculates the imaging system optical axis movement amount in accordance with the target position of the imaging system anti-shake lens 66 and the imaging system position signal acquired by the position signal acquisition unit 154A$_2$, and the anti-shake lens variation mechanism 70 is controlled based on the imaging system optical axis movement amount.

In the case of operating the image shake reduction unit 63 and the laser shake reduction unit 33 at the same time, the movement amount calculation unit 156B$_1$ calculates the emission system optical axis movement amount in accordance with the imaging system position signal and the emission system position signal acquired by the position signal acquisition unit 154B$_1$. The anti-shake lens variation mechanism 38 is controlled based on the calculated emission system optical axis movement amount.

Accordingly, the distance measurement device 10B can reduce the shift phenomenon with a simple configuration, compared with the case of calculating the target position of the emission system anti-shake lens 34 based on the calculation result of the displacement calculation unit 152.

While the position error calculation unit 155B$_2$ calculates the emission system position error based on the imaging system position signal and the emission system position signal in the second embodiment, the technology of the present disclosure is not limited thereto. For example, the position error calculation unit 155B$_2$ may calculate the emission system position error from the imaging system position error and the emission system position signal or may calculate the emission system position error from the imaging system position error and the imaging system position signal by using a predetermined table or calculation formula.

[Third Embodiment]

While the first and second embodiments describe the distance measurement devices 10A and 10B that do not have an optical zoom function, a third embodiment will describe a distance measurement device 10C (refer to FIG. 18) that has an optical zoom function. In the third embodiment, the same constituents as the constituents described in the first embodiment will be designated by the same reference signs and will not be described. Hereinafter, for convenience of description, the imaging system optical axis movement amount and the emission system optical axis movement amount will be referred to as an "optical axis movement amount" unless otherwise required to be distinguished from each other. In addition, hereinafter, for convenience of description, the variation mechanism drivers 98 and 100 will be referred to as a "variation mechanism driver" without the reference signs unless otherwise required to be distinguished from each other.

Figure 18:
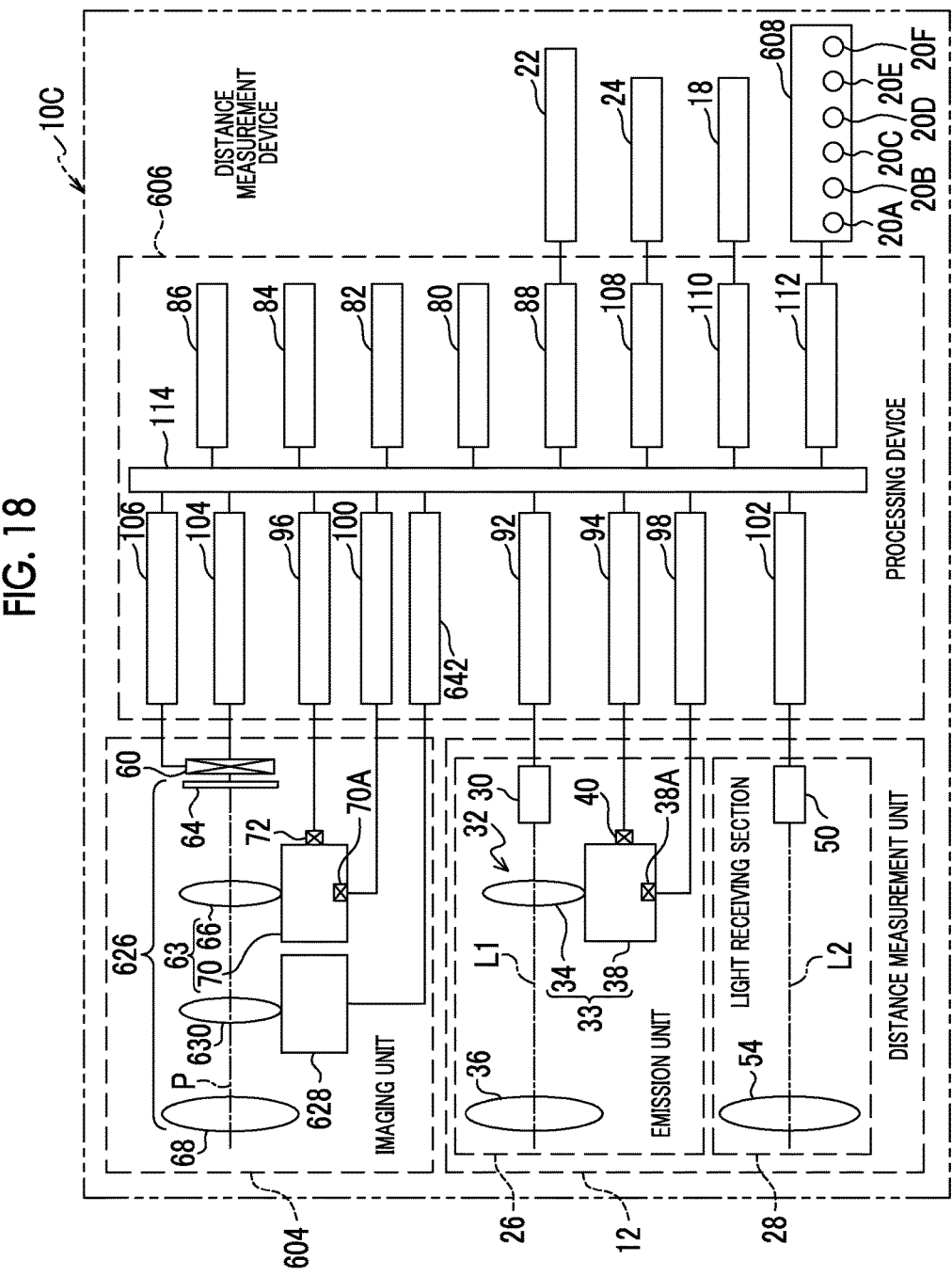
FIG. 18 is a block diagram illustrating one example of a hardware configuration of a main portion of the distance measurement device according to the third embodiment.

As illustrated in FIG. 18 as one example, the distance measurement device 10C according to the third embodiment is different from the distance measurement device 10A in that the distance measurement device 10C has an imaging unit 604 instead of the imaging unit 14. In addition, the distance measurement device 10C is different from the distance measurement device 10A in that the distance measurement device 10C has a processing device 606 instead of the processing device 16. Furthermore, the distance measurement device 10C is different from the distance measurement device 10A in that the distance measurement device 10C has a reception device 608 instead of the reception device 20.

The imaging unit 604 is different from the imaging unit 14 in that the imaging unit 604 has an image formation optical system 626 instead of the image formation optical system 62 and has a zoom lens movement mechanism 628. The image formation optical system 626 is different from the image formation optical system 62 in that the image formation optical system 626 has a zoom lens 630.

The zoom lens 630 is arranged between the imaging system anti-shake lens 66 and the imaging lens 68. The zoom lens movement mechanism 628 includes a motive power source (not illustrated) and moves the zoom lens 630 along the optical axis P in accordance with motive power generated by the motive power source. Thus, the angle of view is changed by moving the zoom lens 630 along the optical axis P. One example of the motive power source included in the zoom lens movement mechanism 628 is exemplified by a stepping motor or the like. However, the motive power source is not limited thereto and may be another kind of motor.

The processing device 606 is different from the processing device 16 in that the processing device 606 has a movement mechanism driver 642. The movement mechanism driver 642 is connected to the busline 114 and controls the motive power source of the zoom lens movement mechanism 628 in accordance with an instruction of the main control unit 80.

The reception device 608 is different from the reception device 20 in that the reception device 608 has a wide angle instruction button 20E and a telephoto angle instruction button 20F. The wide angle instruction button 20E is a push button that receives an instruction to change the angle of view to a wide angle. The amount of change in the angle of view to a wide angle side is determined within an allowed range in accordance with a push time in which a push on the wide angle instruction button 20E is continued. The telephoto angle instruction button 20F is a push button that receives an instruction to change the angle of view to a telephoto angle. The amount of change in the angle of view to a telephoto angle side is determined within an allowed range in accordance with a push time in which a push on the telephoto angle instruction button 20F is continued. Hereinafter, for convenience of description, the wide angle instruction button 20E and the telephoto angle instruction button 20F will be referred to as a "view angle instruction button" unless otherwise required to be distinguished from each other.

As illustrated in FIG. 6 as one example, the distance measurement device 10C is different from the distance measurement device 10A in that the ROM 124 stores a position variation reduction program 130C instead of the position variation reduction program 130A.

Figure 19:
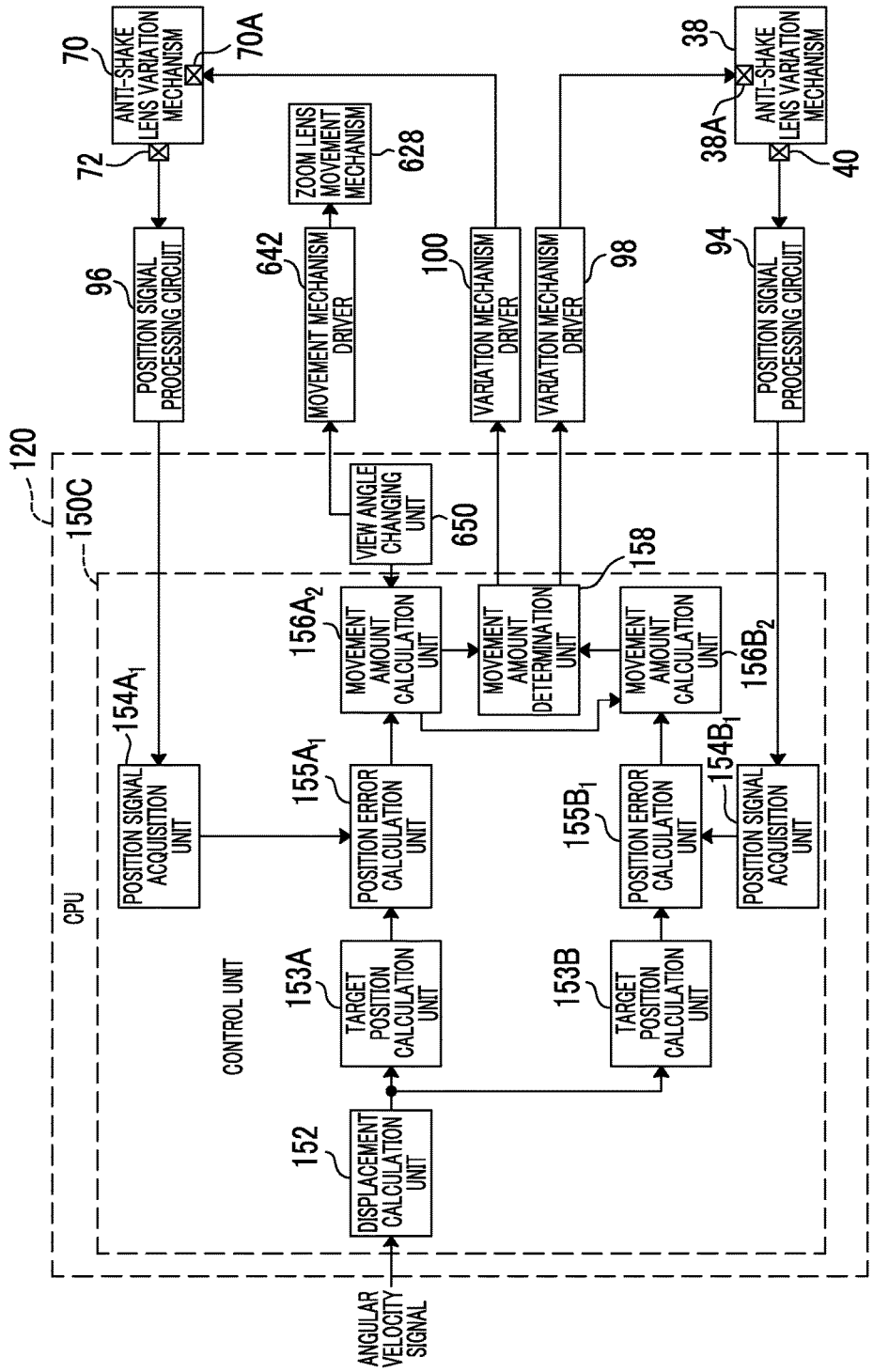
FIG. 19 is a block diagram illustrating one example of main functions of a CPU included in the main control unit of the distance measurement device according to the third embodiment.

The CPU 120 reads and loads the position variation reduction program 130C from the ROM 124 into the RAM 122 and executes the position variation reduction program 130C, thereby operating as a view angle changing unit 650 and a control unit 150C illustrated in FIG. 19 as one example.

The view angle changing unit 650 controls the movement mechanism driver 642 in accordance with the push time of the view angle instruction button to drive the zoom lens movement mechanism 628, thereby moving the zoom lens 630 and changing the angle of view of the subject image.

The control unit 150C is different from the control unit 150A in that the control unit 150C has a movement amount calculation unit $156A_2$ instead of the movement amount calculation unit $156A_1$. In addition, the control unit 150C is different from the control unit 150A in that the control unit 150C has a movement amount calculation unit $156B_2$ instead of the movement amount calculation unit $156B_1$. Furthermore, the control unit 150C is different from the control unit 150A in that the control unit 150C has a movement amount determination unit 158.

The movement amount calculation unit $156A_2$ calculates the imaging system optical axis movement amount in the same manner as the movement amount calculation unit $156A_1$ described in the first embodiment. The movement amount calculation unit $156A_2$ uses an imaging system optical axis movement amount conversion formula to convert the calculated imaging system optical axis movement amount to an imaging system optical axis movement amount that corresponds to the amount of change in the angle of view by the view angle changing unit 650.

The imaging system optical axis movement amount conversion formula is a calculation formula with the imaging system optical axis movement amount as an independent variable and the imaging system optical axis movement amount corresponding to the amount of change in the angle of view by the view angle changing unit 650 as a dependent variable. In addition, the imaging system optical axis movement amount conversion formula is, for example, a calculation formula that has a characteristic such that the dependent variable is decreased in correspondence with change in the angle of view toward the wide angle side and that the dependent variable is increased in correspondence with change in the angle of view toward the telephoto angle side. Accordingly, the imaging system optical axis movement amount that is acquired by conversion from the imaging system optical axis movement amount conversion formula by the movement amount calculation unit $156A_2$ is decreased along with change in the angle of view toward the wide angle side and is increased along with change in the angle of view toward the telephoto angle side.

The movement amount calculation unit $156B_2$, in the same manner as the movement amount calculation unit $156B_1$ described in the first embodiment, calculates the emission system optical axis movement amount and adjusts the calculated emission system optical axis movement amount if necessary.

Figure 20:
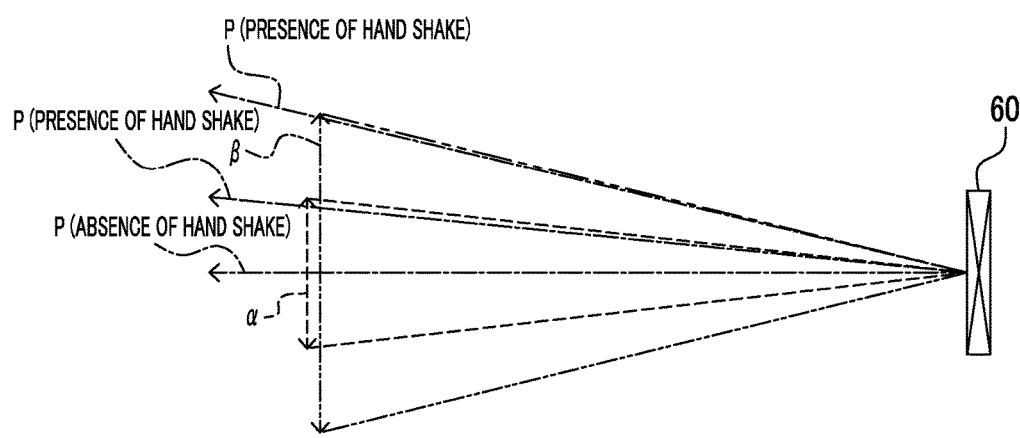
FIG. 20 is a conceptual diagram illustrating one example of a positional relationship between an optical axis of an image formation optical system and an imaging range in an imaging unit of the distance measurement device according to the third embodiment.

The imaging unit 604 is equipped with the optical zoom function by the zoom lens 630. Thus, an imaging range is changed by utilizing the optical zoom function. For example, as illustrated in FIG. 20, an imaging range α on the telephoto angle side is narrower than an imaging range β on the wide angle side. Thus, responsiveness for reduction of the image shake caused by the optical axis P reaching one end of the imaging range β is better than responsiveness for reduction of the image shake caused by the optical axis P reaching one end of the imaging range α.

"Good responsiveness for reduction of the image shake" means that, for example, the amount of movement of the imaging system anti-shake lens 66 required for reduction of the image shake is small. Conversely, "bad responsiveness for reduction of the image shake" means that, for example, the amount of movement of the imaging system anti-shake lens 66 required for reduction of the image shake is large. Hereinafter, for convenience of description, "responsiveness for reduction of the image shake" will be referred to as "imaging system responsiveness".

The emission unit 26 is not equipped with the optical zoom function. Thus, the irradiation range of laser light is fixed in the emission unit 26. Thus, depending on the size of the imaging range, a difference may be generated between responsiveness for reduction of the image shake and responsiveness for reduction of the laser shake. "Good responsiveness for reduction of the laser shake" means that, for example, the amount of movement of the emission system anti-shake lens 34 required for reduction of the laser shake is small. Conversely, "bad responsiveness for reduction of the laser shake" means that, for example, the amount of movement of the emission system anti-shake lens 34 required for reduction of the laser shake is large. Hereinafter, for convenience of description, "responsiveness for reduction of the laser shake" will be referred to as "laser system responsiveness". The imaging system responsiveness and the laser system responsiveness will be referred to as "responsiveness" unless otherwise required to be distinguished from each other.

If a difference is generated between the imaging system responsiveness and the laser system responsiveness as described above, the degree of reduction of the image shake may not be balanced with the degree of reduction of the laser shake in some cases if the image shake reduction unit 63 and the laser shake reduction unit 33 are operated. For example, if the imaging system responsiveness becomes relatively better than the laser system responsiveness in accordance with an increase in the amount of change in the angle of view to the telephoto angle side, the emission system anti-shake lens 34 may not follow operation of the imaging system anti-shake lens 66 unless moving beyond an operable range. If the imaging system responsiveness becomes worse in accordance with an increase in the amount of change in the angle of view to the wide angle side, the calculated imaging system optical axis movement amount may not be in correspondence with an operable range of the imaging system anti-shake lens 66, and the imaging system anti-shake lens 66 may not follow operation of the emission system anti-shake lens 34.

Therefore, the movement amount determination unit 158 determines whether or not first to fourth conditions are satisfied, determines an optical axis movement amount to be output to the variation mechanism driver 98 based on a determination result, and outputs the determined optical axis movement amount to the variation mechanism driver.

The first condition refers to a condition that the calculated imaging system optical axis movement amount is determined to be within an allowed range. The second condition refers to a condition that the calculated emission system optical axis movement amount is determined to be within an allowed range. The third condition refers to a condition that movement of the imaging system anti-shake lens 66 for realizing movement of the optical axis P by the calculated imaging system optical axis movement amount is determined to be sufficiently within the operable range of the imaging system anti-shake lens 66. The fourth condition refers to a condition that movement of the emission system anti-shake lens 34 for realizing movement of the optical axis L1 by the calculated emission system optical axis movement amount is determined to be sufficient within the operable range of the emission system anti-shake lens 34.

The allowed range of the imaging system optical axis movement amount refers to an allowed range that is found by a preliminary experiment, simulation, or the like as a finally employed allowed range of the imaging system optical axis movement amount. The allowed range of the imaging system optical axis movement amount is uniquely determined by the structure of the imaging unit 604 and the characteristic of the view angle changing unit 650. The allowed range of the emission system optical axis movement amount refers to an allowed range that is found by a preliminary experiment, simulation, or the like as a finally employed allowed range of the emission system optical axis movement amount. The allowed range of the emission system optical axis movement amount is uniquely determined by the structure of the distance measurement unit 12, particularly the structure of the emission unit 26.

The operable range of the imaging system anti-shake lens 66 refers to a range in which the imaging system anti-shake lens 66 is movable in the imaging system two-dimensional plane described in the first embodiment. The operable range of the imaging system anti-shake lens 66 is one example of "a range in which the first reduction unit is movable" according to the technology of the present disclosure and is uniquely determined by the structure of the image shake reduction unit 63. The operable range of the emission system anti-shake lens 34 refers to a range in which the emission system anti-shake lens 34 is movable in the emission system two-dimensional plane described in the first embodiment. The operable range of the emission system anti-shake lens 34 is one example of "a range in which the second reduction unit is movable" according to the technology of the present disclosure and is uniquely determined by the structure of the laser shake reduction unit 33.

An electronic reduction process according to the third embodiment includes a process that corresponds to a process performed by the movement amount calculation unit 156A$_2$ and the movement amount determination unit 158. That is, the electronic reduction process according to the third embodiment includes a process of calculating the imaging system optical axis movement amount corresponding to the amount of change in the angle of view and a process of determining whether or not the first to fourth conditions are satisfied and, based on the determination result, determining the optical axis movement amount to be output to the variation mechanism driver 98. In addition, the electronic reduction process according to the third embodiment includes a process of processing the picture signal in the same manner as the first embodiment based on the optical axis movement amount finally determined by the movement amount determination unit 158. Thus, execution of the electronic reduction process according to the third embodiment by the picture processing unit 82 realizes reduction of the picture shake to the same extent as reduction of the image shake by the image shake reduction unit 63.

Next, a different part of the action of the distance measurement device 10C from the content described in the first embodiment will be described.

Figure 21:
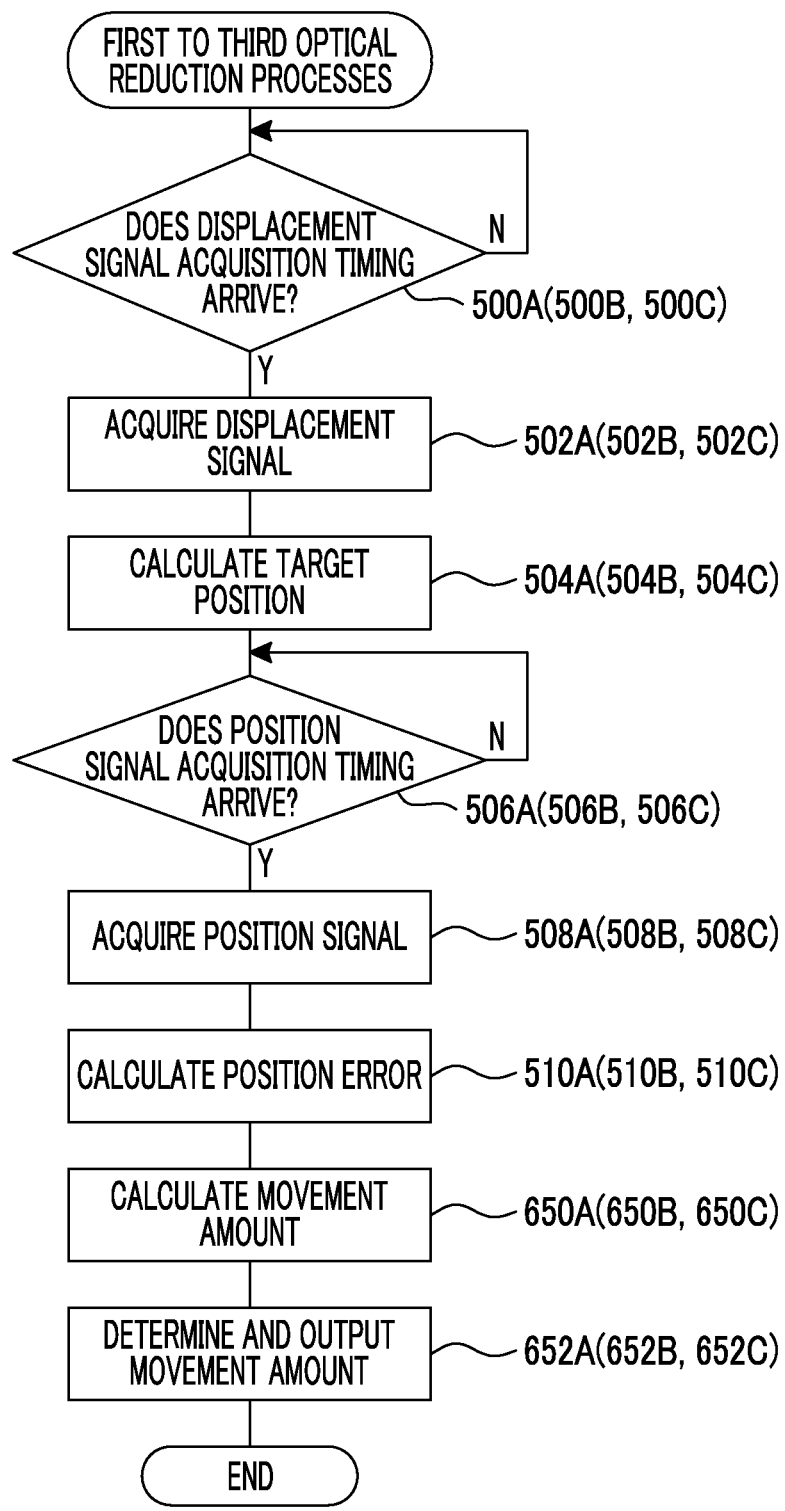
FIG. 21 is a flowchart illustrating one example of a flow of first to third optical reduction processes according to the third embodiment.

First, a first optical reduction process according to the third embodiment will be described with reference to FIG. 21.

The first optical reduction process according to the third embodiment is different from the first optical reduction process according to the first embodiment (refer to FIG. 15) in that the first optical reduction process according to the third embodiment has processes of Steps 650A and 652A instead of the process of Step 512A.

In the first optical reduction process according to the third embodiment, in Step 650A, the movement amount calculation unit $156A_2$ uses the imaging system optical axis movement amount calculation formula to calculate the imaging system optical axis movement amount from the imaging system position error calculated in the process of Step 510A. The movement amount calculation unit $156A_2$ uses the imaging system optical axis movement amount conversion formula to convert the calculated imaging system optical axis movement amount to an imaging system optical axis movement amount that corresponds to the amount of change in the angle of view by the view angle changing unit 650.

In Step 650A, the movement amount calculation unit $156B_2$ uses the emission system optical axis movement amount calculation formula to calculate the emission system optical axis movement amount from the emission system position error calculated in the process of Step 510A. The movement amount calculation unit $156B_2$, in the same manner as in the process of Step 512A described in the first embodiment, adjusts the emission system optical axis movement amount if necessary.

In next Step 652A, the movement amount determination unit 158 determines whether or not the first to fourth conditions are satisfied, and executes any of first to third output processes based on a determination result. Then, the first optical reduction process is terminated.

The movement amount determination unit 158 executes the first output process in the case of at least one condition of the first condition or the second condition not being satisfied and the third condition and the fourth condition being satisfied.

If the first output process is executed by the movement amount determination unit 158, the optical axis movement amount that corresponds to bad responsiveness of the imaging system responsiveness and the laser system responsiveness is output to the variation mechanism driver. That is, in the case of the bad responsiveness being the imaging system responsiveness, the imaging system optical axis movement amount calculated by the movement amount calculation unit $156A_2$ is output to the variation mechanism drivers 98 and 100. In the case of the bad responsiveness being the laser system responsiveness, the emission system optical axis movement amount calculated by the movement amount calculation unit $156B_2$ is output to the variation mechanism drivers 98 and 100.

The movement amount determination unit 158 executes the second output process in the case of at least one of the third condition or the fourth condition not being satisfied independently of whether or not the first condition and the second condition are satisfied.

If the second output process is executed by the movement amount determination unit 158, an upper limit value of the allowed range of the imaging system optical axis movement amount calculated by the movement amount calculation unit $156A_2$ is output to the variation mechanism driver 100. In addition, an upper limit value of the allowed range of the emission system optical axis movement amount calculated by the movement amount calculation unit $156B_2$ is output to the variation mechanism driver 98.

The movement amount determination unit 158 executes the third output process in the case of all of the first to fourth conditions being satisfied. If the third output process is executed by the movement amount determination unit 158, the imaging system optical axis movement amount calculated by the movement amount calculation unit $156A_2$ is output to the variation mechanism driver 100. In addition, the emission system optical axis movement amount calculated by the movement amount calculation unit $156B_2$ is output to the variation mechanism driver 98.

If the imaging system optical axis movement amount is output to the variation mechanism driver 100 by execution of the process of Step 652A, the variation mechanism driver 100 and the anti-shake lens variation mechanism 70 operate in the same manner as in the case of execution of the first optical reduction process according to the first embodiment. In addition, if the emission system optical axis movement amount is output to the variation mechanism driver 98 by execution of the process of Step 652A, the variation mechanism driver 98 and the anti-shake lens variation mechanism 38 operate in the same manner as in the case of execution of the first optical reduction process according to the first embodiment.

Next, a second optical reduction process according to the third embodiment will be described with reference to FIG. 21.

The second optical reduction process according to the third embodiment is different from the second optical reduction process according to the first embodiment (refer to FIG. 15) in that the second optical reduction process according to the third embodiment has processes of Steps 650B and 652B instead of the process of Step 512B. For convenience of description, the above electronic reduction process according to the third embodiment will be assumed to be executed by the picture processing unit 82.

In the second optical reduction process according to the third embodiment, in Step 650B, the movement amount calculation unit $156B_2$ uses the emission system optical axis movement amount calculation formula to calculate the emission system optical axis movement amount from the emission system position error calculated in the process of Step 510B. The movement amount calculation unit $156B_2$, in the same manner as in the process of Step 512B described in the first embodiment, adjusts the emission system optical axis movement amount if necessary.

In next Step 652B, the movement amount determination unit 158 determines whether or not the first to fourth conditions are satisfied, and executes any of fourth to sixth output processes based on a determination result. Then, the second optical reduction process is terminated.

The movement amount determination unit 158 executes the fourth output process in the case of at least one condition of the first condition or the second condition not being satisfied and the third condition and the fourth condition being satisfied.

If the fourth output process is executed by the movement amount determination unit 158, the optical axis movement amount that corresponds to bad responsiveness of the imaging system responsiveness and the laser system responsiveness is output to the variation mechanism driver 98.

That is, in the case of the bad responsiveness being the imaging system responsiveness, the picture processing unit 82 executes the electronic reduction process to calculate the imaging system optical axis movement amount, and the calculated imaging system optical axis movement amount is output to the variation mechanism driver 98. In the case of the bad responsiveness being the laser system responsiveness, the emission system optical axis movement amount calculated by the movement amount calculation unit 156B$_2$ is output to the variation mechanism driver 98.

If the fourth output process is executed by the movement amount determination unit 158, the picture shake is reduced to the same extent as reduction of the image shake in the case of moving the optical axis P by the imaging system optical axis movement amount calculated by execution of the electronic reduction process by the picture processing unit 82. That is, reduction of the picture shake is performed to the same extent as reduction of the image shake achieved by execution of the above first output process.

The movement amount determination unit 158 executes the fifth output process in the case of at least one of the third condition or the fourth condition not being satisfied independently of whether or not the first condition and the second condition are satisfied.

If the fifth output process is executed by the movement amount determination unit 158, an upper limit value of the allowed range of the emission system optical axis movement amount calculated by the movement amount calculation unit 156B$_2$ is output to the variation mechanism driver 98.

If the fifth output process is executed by the movement amount determination unit 158, the picture shake is reduced to the same extent as reduction of the image shake in the case of moving the optical axis P by the upper limit value of the allowed range of the imaging system optical axis movement amount calculated by execution of the electronic reduction process by the picture processing unit 82. That is, reduction of the picture shake is performed to the same extent as reduction of the image shake achieved by execution of the above second output process.

The movement amount determination unit 158 executes the sixth output process in the case of all of the first to fourth conditions being satisfied. If the sixth output process is executed by the movement amount determination unit 158, the emission system optical axis movement amount calculated by the movement amount calculation unit 156B$_2$ is output to the variation mechanism driver 98. In addition, if the sixth output process is executed by the movement amount determination unit 158, the picture shake is reduced to the same extent as reduction of the image shake in the case of moving the optical axis P by the imaging system optical axis movement amount calculated by execution of the electronic reduction process by the picture processing unit 82. That is, reduction of the picture shake is performed to the same extent as reduction of the image shake achieved by execution of the above third output process.

If the emission system optical axis movement amount is output to the variation mechanism driver 98 by execution of the process of Step 652B, the variation mechanism driver 98 and the anti-shake lens variation mechanism 38 operate in the same manner as in the case of execution of the second optical reduction process according to the first embodiment.

Next, a third optical reduction process according to the third embodiment will be described with reference to FIG. 21.

The third optical reduction process according to the third embodiment is different from the third optical reduction process according to the first embodiment (refer to FIG. 15) in that the third optical reduction process according to the third embodiment has processes of Steps 650C and 652C instead of the process of Step 512C.

In the third optical reduction process according to the third embodiment, in Step 650C, the movement amount calculation unit 156A$_2$ uses the imaging system optical axis movement amount calculation formula to calculate the imaging system optical axis movement amount from the imaging system position error calculated in the process of Step 510C. The movement amount calculation unit 156A$_2$ uses the imaging system optical axis movement amount conversion formula to convert the calculated imaging system optical axis movement amount to an imaging system optical axis movement amount that corresponds to the amount of change in the angle of view by the view angle changing unit 650.

In next Step 652C, the movement amount determination unit 158 determines whether or not the first to fourth conditions are satisfied, and executes any of seventh to ninth output processes based on the determination result. Then, the third optical reduction process is terminated.

The movement amount determination unit 158 executes the seventh output process in the case of at least one condition of the first condition or the second condition not being satisfied and the third condition and the fourth condition being satisfied.

If the seventh output process is executed by the movement amount determination unit 158, the imaging system optical axis movement amount calculated by the movement amount calculation unit 156A$_2$ is output to the variation mechanism driver 100.

The movement amount determination unit 158 executes the eighth output process in the case of at least one of the third condition or the fourth condition not being satisfied independently of whether or not the first condition and the second condition are satisfied.

If the eighth output process is executed by the movement amount determination unit 158, an upper limit value of the allowed range of the imaging system optical axis movement amount calculated by the movement amount calculation unit 156A$_2$ is output to the variation mechanism driver 100.

The movement amount determination unit 158 executes the ninth output process in the case of all of the first to fourth conditions being satisfied. If the ninth output process is executed by the movement amount determination unit 158, the imaging system optical axis movement amount calculated by the movement amount calculation unit 156A$_2$ is output to the variation mechanism driver 100.

If the imaging system optical axis movement amount is output to the variation mechanism driver 100 by execution of the process of Step 652C, the variation mechanism driver 100 and the anti-shake lens variation mechanism 70 operate in the same manner as in the case of execution of the third optical reduction process according to the first embodiment.

As described heretofore, in the distance measurement device 10C, the target position calculation unit 153A calculates the target position of the imaging system anti-shake lens 66 based on the calculation result of the displacement calculation unit 152. The movement amount calculation unit 156A$_2$ calculates the imaging system optical axis movement amount in accordance with the target position of the imaging system anti-shake lens 66, the imaging system position signal acquired by the position signal acquisition unit 154A$_1$, and the amount of change in the angle of view by the view angle changing unit 650. The anti-shake lens variation mechanism 70 is controlled based on the imaging system optical axis movement amount calculated by the movement amount calculation unit 156A$_2$.

Accordingly, the distance measurement device 10C can reduce the shift phenomenon with high accuracy even if the angle of view is changed, compared with the case of calculating the imaging system optical axis movement amount without considering the amount of change in the angle of view.

In the distance measurement device 10C, the movement amount determination unit 158 determines whether or not the first to fourth conditions are satisfied, and the optical axis movement amount that is determined based on the determination result is output to the variation mechanism driver.

Accordingly, the distance measurement device 10C can reduce the difference between the degree of reduction of the image shake and the degree of reduction of the laser shake, compared with the case of reducing the image shake and the laser shake without considering the optical axis movement amount, the allowed range, and the operable range. In addition, the distance measurement device 10C can reduce the difference between the degree of reduction of the picture shake and the degree of reduction of the laser shake, compared with the case of reducing the picture shake and the laser shake without considering the optical axis movement amount, the allowed range, and the operable range.

While the third embodiment illustratively describes the optical zoom function, the technology of the present disclosure is not limited thereto. The technology of the present disclosure is established with a digital zoom function as well.

While the third embodiment illustrates the case of using the target position calculation units 153A and 153B together, the technology of the present disclosure is not limited thereto. The technology of the present disclosure is established without using the target position calculation unit 153B as described in the second embodiment.

In this case, the ROM 124 stores a position variation reduction program 130D instead of the position variation reduction program 130C. The CPU 120 reads and loads the position variation reduction program 130D from the ROM 124 into the RAM 122 and executes the position variation reduction program 130D, thereby operating as a control unit 150D illustrated in FIG. 22 as one example.

Figure 22:
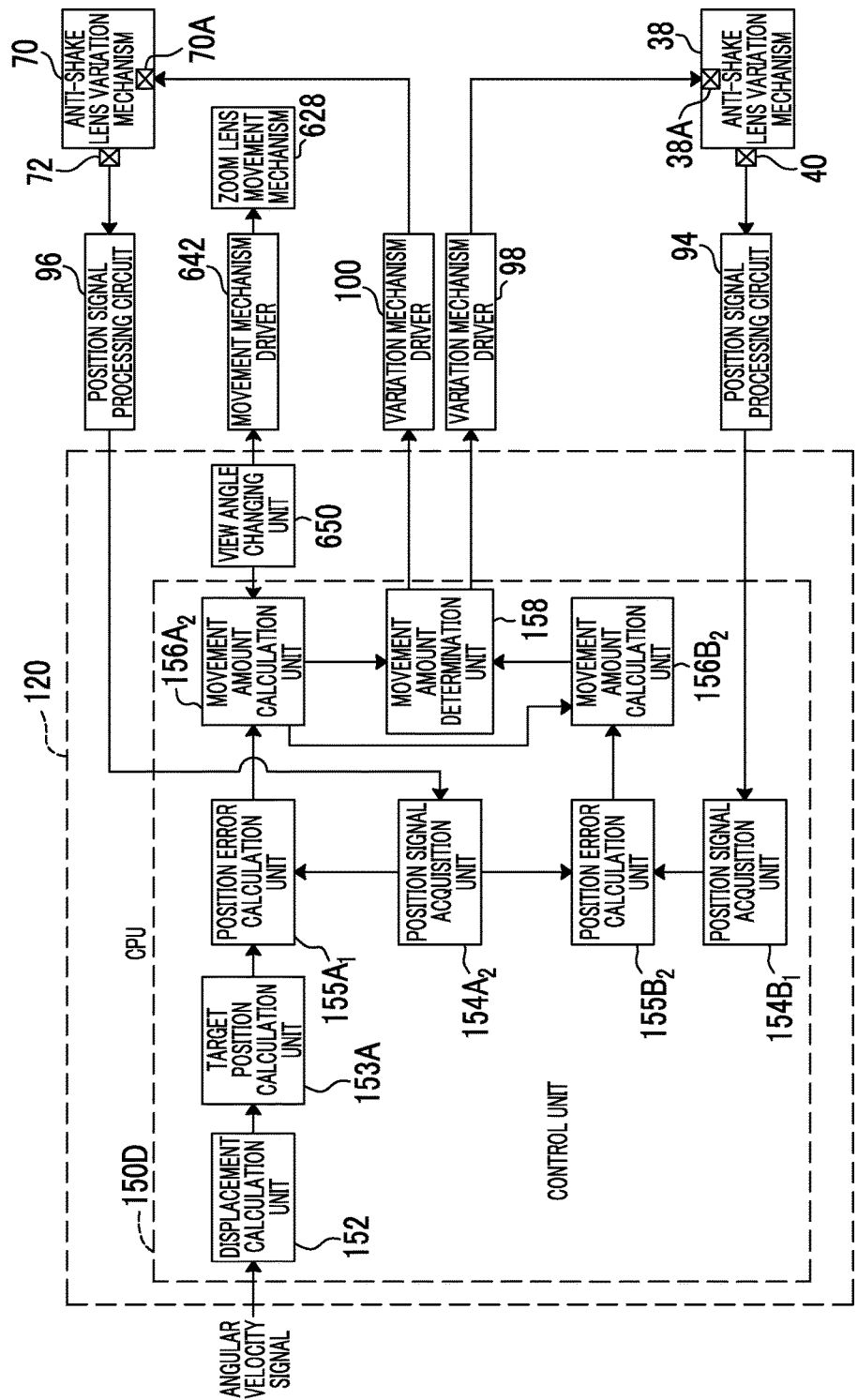
FIG. 22 is a block diagram illustrating a modification example of the main functions of the CPU included in the main control unit of the distance measurement device according to the third embodiment.

As illustrated in FIG. 22 as one example, the control unit 150D is different from the control unit 150C illustrated in FIG. 19 in that the control unit 150D does not have the target position calculation unit 153B. In addition, the control unit 150D is different from the control unit 150C illustrated in FIG. 19 in that the control unit 150D has the position signal acquisition unit 154A$_2$ described in the second embodiment instead of the position signal acquisition unit 154A$_1$. In addition, the control unit 150D is different from the control unit 150C illustrated in FIG. 19 in that the control unit 150D has the position error calculation unit 155B$_2$ described in the second embodiment instead of the position error calculation unit 155B$_1$. Thus, the distance measurement device 10C, by operating the CPU 120 as the control unit 150D, can achieve the same effect as the distance measurement device 10B according to the second embodiment.

While, for convenience of description, the third embodiment assumes that a view angle change shift phenomenon that is a phenomenon of shifting of the position of the laser light in the picture by change in the angle of view is not generated, a distance measurement device 10D may be employed to reduce the view angle change shift phenomenon.

Figure 23:
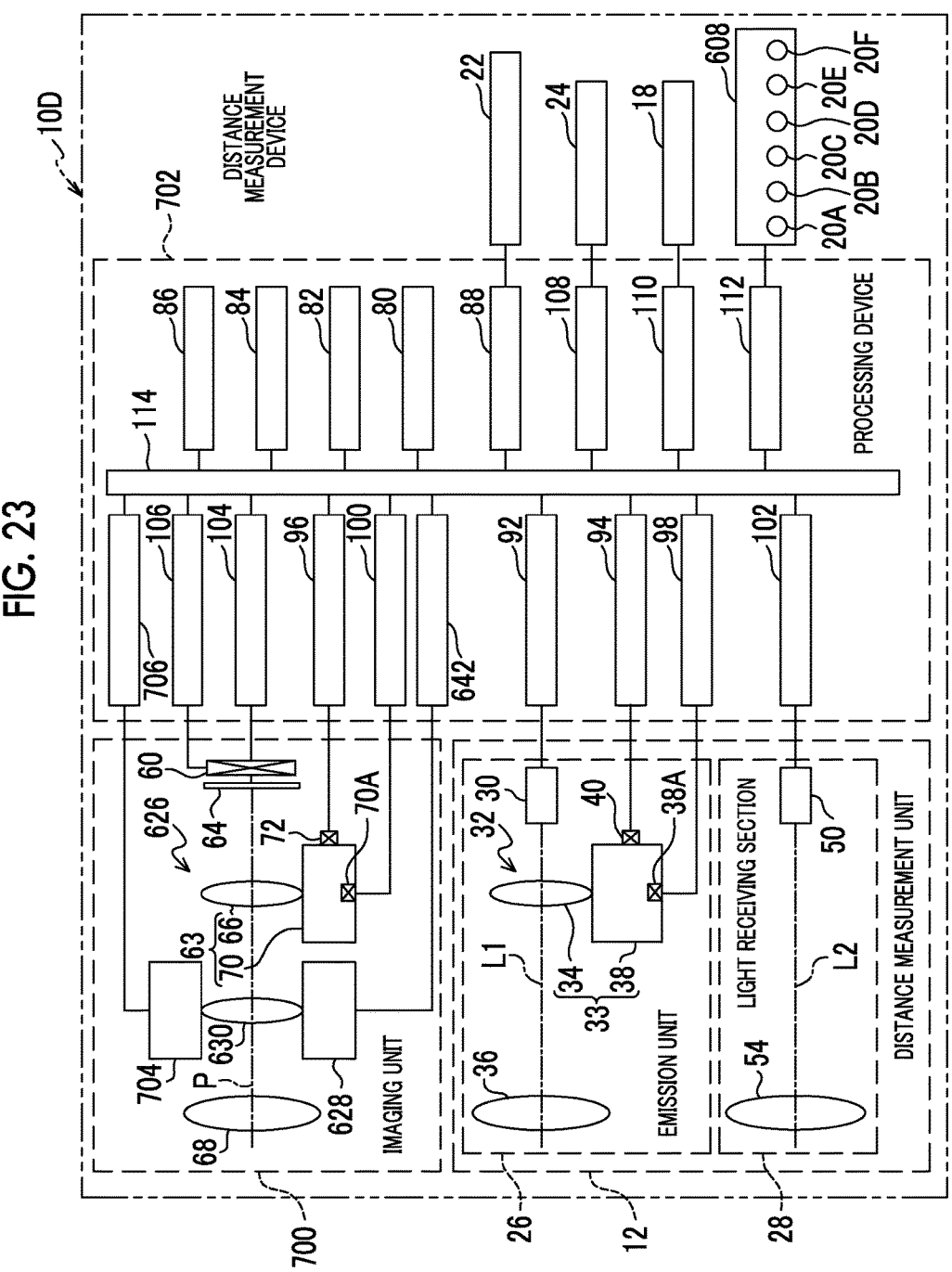
FIG. 23 is a block diagram illustrating a first modification example of the hardware configuration of the main portion of the distance measurement device according to the third embodiment.

As illustrated in FIG. 23 as one example, the distance measurement device 10D is different from the distance measurement device 10C (refer to FIG. 18) in that the distance measurement device 10D has an imaging unit 700 instead of the imaging unit 604 and has a processing device 702 instead of the processing device 606.

The imaging unit 700 is different from the imaging unit 604 in that the imaging unit 700 has a zoom lens inclination mechanism 704. The processing device 702 is different from the processing device 606 in that the processing device 702 has an inclination mechanism driver 706.

The zoom lens inclination mechanism 704 includes a motive power source (not illustrated) and inclines the zoom lens 630 with respect to a reference axis in accordance with motive power generated by the motive power source. The reference axis refers to, for example, the optical axis P in the state of absence of the hand shake. One example of the motive power source included in the zoom lens inclination mechanism 704 is exemplified by a stepping motor or the like. However, the motive power source is not limited thereto and may be another kind of motor or a piezo element.

The inclination mechanism driver 706 is connected to the busline 114 and controls the motive power source of the zoom lens inclination mechanism 704 in accordance with an instruction of the main control unit 80 to drive the zoom lens inclination mechanism 704, thereby inclining the zoom lens 630 with respect to the reference axis.

The CPU 120, in the case of moving the zoom lens 630 to change the angle of view, uses an inclination angle derivation table (not illustrated) to derive, from the amount of change in the angle of view, an inclination angle that is an angle of inclination of the zoom lens 630 with respect to the reference axis. The inclination angle derivation table is a table in which the amount of change in the angle of view is associated with the inclination angle. The inclination angle of the inclination angle derivation table is an inclination angle that is found by a preliminary experiment, simulation, or the like as an inclination angle with which the irradiation position of the laser light in the picture is maintained before and after change in the angle of view.

The CPU 120 may calculate the inclination angle by using, instead of the inclination angle derivation table, an inclination angle calculation formula with the amount of change in the angle of view as an independent variable and the inclination angle as a dependent variable.

The CPU 120 controls the inclination mechanism driver 706 to incline the zoom lens 630 at the inclination angle derived by using the inclination angle derivation table, thereby driving the zoom lens inclination mechanism 704. Consequently, the zoom lens 630 is inclined at the inclination angle derived from the inclination angle derivation table, and the irradiation position of the laser light in the picture is maintained before and after change in the angle of view.

Accordingly, the distance measurement device 10D can reduce the view angle change shift phenomenon, compared with the case of a relative positional relationship between the optical axis P and the zoom lens 630 being fixed independently of movement of the zoom lens 630.

While the example illustrated in FIG. 23 illustrates reducing the view angle change shift phenomenon by changing the inclination of the zoom lens 630, reduction of the view angle change shift phenomenon is not limited thereto and may be performed by the picture processing unit 82 processing the picture signal under control of the main control unit 80.

While FIG. 23 illustrates the distance measurement device 10D having the image shake reduction unit 63 and the laser shake reduction unit 33, the technology of the present disclosure is not limited thereto. For example, as illustrated in FIG. 24, a distance measurement device 10E may be employed instead of the distance measurement device 10D.

Figure 24:
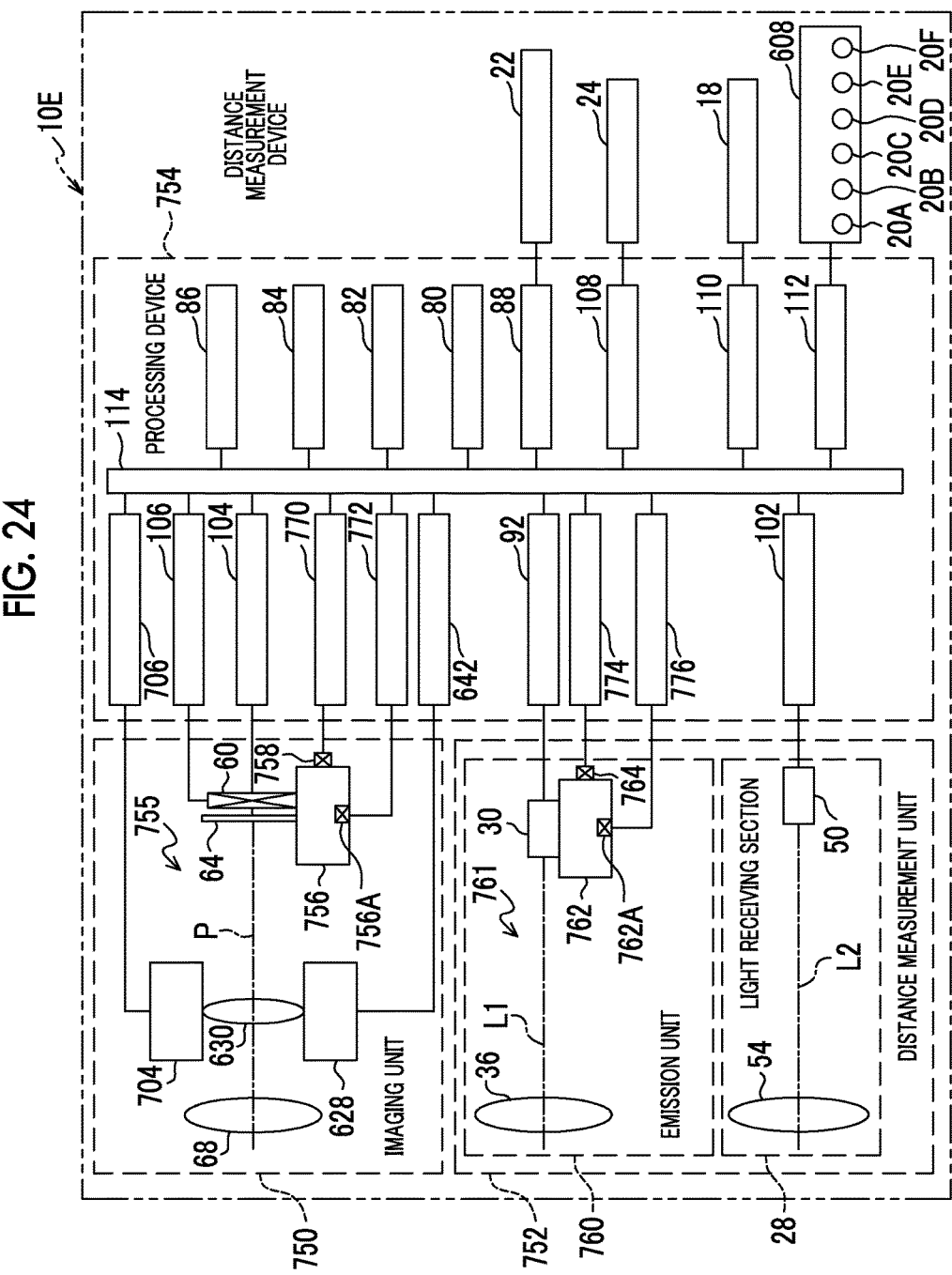
FIG. 24 is a block diagram illustrating a second modification example of the hardware configuration of the main portion of the distance measurement device according to the third embodiment.

As illustrated in FIG. 24 as one example, the distance measurement device 10E is different from the distance measurement device 10D in that the distance measurement device 10E has an imaging unit 750 instead of the imaging unit 700. In addition, the distance measurement device 10E is different from the distance measurement device 10D in that the distance measurement device 10E has a distance measurement unit 752 instead of the distance measurement unit 12. In addition, the distance measurement device 10E is different from the distance measurement device 10D in that the distance measurement device 10E has a processing device 754 instead of the processing device 702.

The imaging unit 750 is different from the imaging unit 700 in that the imaging unit 750 has an image formation optical system 755 instead of the image formation optical system 626, has an imaging element variation mechanism 756 instead of the image shake reduction unit 63, and has a position detection sensor 758 instead of the position detection sensor 72.

The image formation optical system 755 is different from the image formation optical system 626 in that the image formation optical system 755 does not have the imaging system anti-shake lens 66.

The imaging element variation mechanism 756 includes a motive power source 756A and a third motive power transmission mechanism (not illustrated). The motive power source 756A generates motive power. The third motive power transmission mechanism receives the motive power generated by the motive power source 756A and transmits the received motive power to the imaging element 60, thereby varying the imaging element 60 along an imaging element two-dimensional plane. The imaging element two-dimensional plane refers to, for example, a two-dimensional plane that is approximately parallel to the light receiving surface of the imaging element 60.

One example of the motive power source 756A is exemplified by a piezo element that expands and contracts along the imaging element two-dimensional plane. However, the technology of the present disclosure is not limited thereto, and a voice coil motor, a stepping motor, or the like may be used.

The position detection sensor 758 detects the current position of the imaging element 60 and outputs an imaging element position signal that indicates the detected current position. The current position of the imaging element 60 refers to a current position in the imaging element two-dimensional plane. The imaging element position signal is a signal that corresponds to the imaging system position signal described in the first embodiment.

The distance measurement unit 752 is different from the distance measurement unit 12 in that the distance measurement unit 752 has an emission unit 760 instead of the emission unit 26. The emission unit 760 is different from the emission unit 26 in that the emission unit 760 has an emission optical system 761 instead of the emission optical system 32, has an LD variation mechanism 762 instead of the laser shake reduction unit 33, and has a position detection sensor 764 instead of the position detection sensor 40. The LD variation mechanism 762 is one example of a light emitting element variation mechanism according to the technology of the present disclosure.

The emission optical system 761 is different from the emission optical system 32 in that the emission optical system 761 does not have the emission system anti-shake lens 34.

The LD variation mechanism 762 includes a motive power source 762A and a fourth motive power transmission mechanism (not illustrated). The motive power source 762A generates motive power. The fourth motive power transmission mechanism receives the motive power generated by the motive power source 762A and transmits the received motive power to the LD 30, thereby varying the LD 30 along an LD two-dimensional plane. The LD two-dimensional plane refers to, for example, a two-dimensional plane that is approximately parallel to a laser light emitting surface of the LD 30.

One example of the motive power source 762A is exemplified by a piezo element that expands and contracts along the LD two-dimensional plane. However, the technology of the present disclosure is not limited thereto, and a voice coil motor, a stepping motor, or the like may be used.

The position detection sensor 764 detects the current position of the LD 30 and outputs an LD position signal that indicates the detected current position. The current position of the LD 30 refers to a current position in the LD two-dimensional plane. The LD position signal is a signal that corresponds to the emission system position signal described in the first embodiment.

The processing device 754 is different from the processing device 702 in that the processing device 754 has a position signal processing circuit 770 instead of the position signal processing circuit 96 and has a variation mechanism driver 772 instead of the variation mechanism driver 100. The processing device 754 is different from the processing device 702 in that the processing device 754 has a position signal processing circuit 774 instead of the position signal processing circuit 94 and has a variation mechanism driver 776 instead of the variation mechanism driver 98.

The position signal processing circuits 770 and 774 and the variation mechanism drivers 772 and 776 are connected to the busline 114.

The position signal processing circuit 770 is connected to the position detection sensor 758, amplifies the imaging element position signal input from the position detection sensor 758, and performs A/D conversion of the amplified imaging element position signal. The position signal processing circuit 770 outputs the imaging element position signal digitized by A/D conversion to the main control unit 80.

The variation mechanism driver 772 is connected to the motive power source 756A and drives the motive power source 756A in accordance with an instruction of the main control unit 80. That is, the variation mechanism driver 772 controls the variation mechanism driver 772 based on the imaging system optical axis movement amount input from the main control unit 80 to drive the motive power source 756A, thereby varying the imaging element 60 along the imaging element two-dimensional plane.

The position signal processing circuit 774 is connected to the position detection sensor 764, amplifies the LD position signal input from the position detection sensor 764, and performs A/D conversion of the amplified LD position signal. The position signal processing circuit 774 outputs the LD position signal digitized by A/D conversion to the main control unit 80.

The variation mechanism driver 776 is connected to the motive power source 762A and drives the motive power source 762A in accordance with an instruction of the main control unit 80. That is, the variation mechanism driver 776 controls the variation mechanism driver 776 based on the emission system optical axis movement amount input from the main control unit 80 to drive the motive power source 762A, thereby varying the LD 30 along the LD two-dimensional plane.

Accordingly, the distance measurement device 10E can reduce the shift phenomenon without posing limitation on the degree of freedom in design of the image formation optical system 755, compared with the case of using the image shake reduction unit 63. In addition, the distance measurement device 10E can reduce the shift phenomenon without posing limitation on the degree of freedom in design of the emission optical system 761, compared with the case of using the laser shake reduction unit 33.

While the emission unit 760 does not have the laser shake reduction unit 33 in the example illustrated in FIG. 24, the technology of the present disclosure is not limited thereto. The laser shake reduction unit 33 may be disposed in the emission unit 760, and the LD variation mechanism 762 may be disposed as an auxiliary.

While FIG. 23 illustrates the distance measurement device 10D having the electronic viewfinder 22, the technology of the present disclosure is not limited thereto. For example, as illustrated in FIG. 25, a distance measurement device 10F may be employed instead of the distance measurement device 10D.

Figure 25:
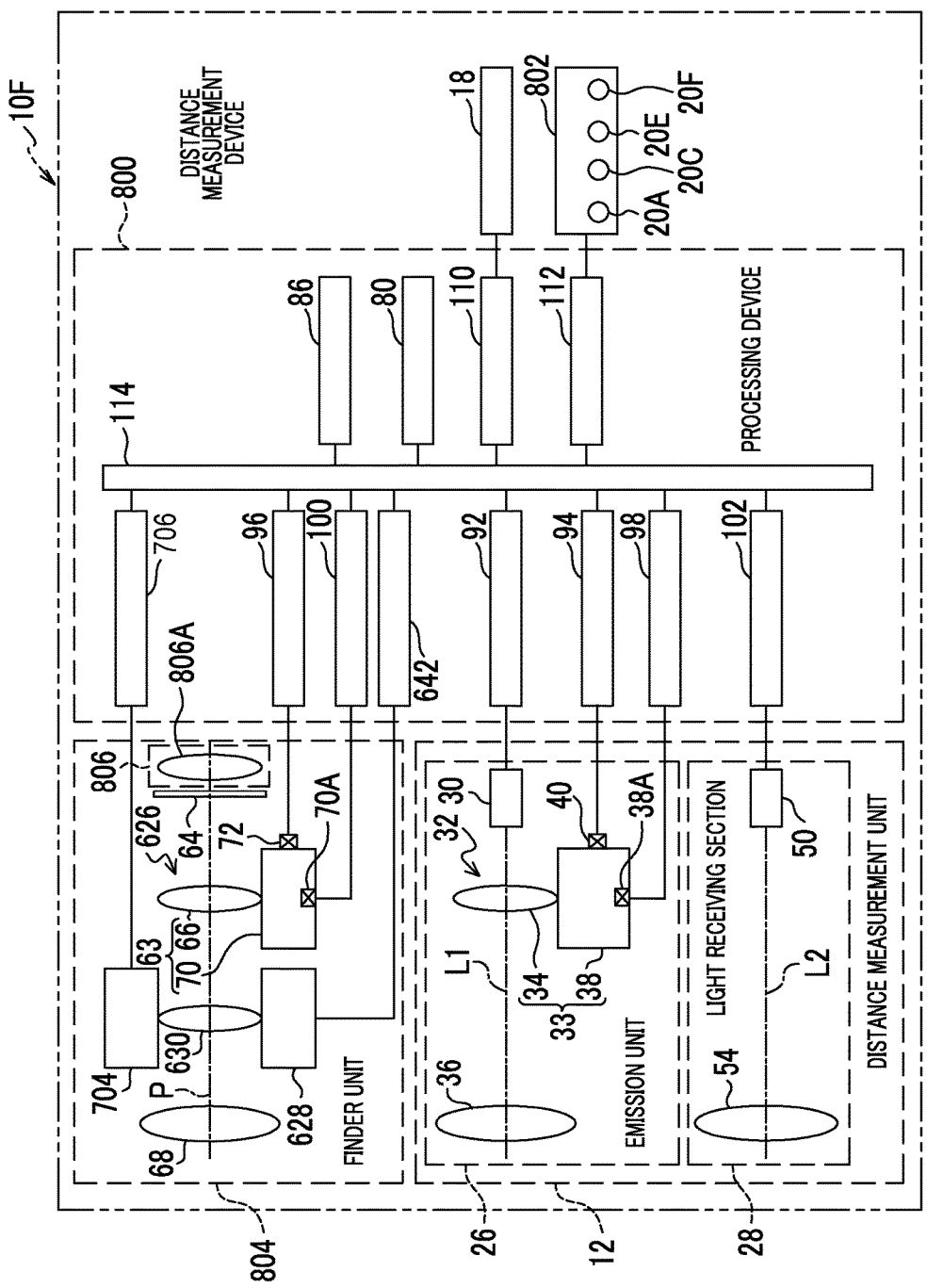
FIG. 25 is a block diagram illustrating a third modification example of the hardware configuration of the main portion of the distance measurement device according to the third embodiment.

As illustrated in FIG. 25 as one example, the distance measurement device 10F is different from the distance measurement device 10D in that the distance measurement device 10F does not have the electronic viewfinder 22 and the memory card 24. In addition, the distance measurement device 10F is different from the distance measurement device 10D in that the distance measurement device 10F has a processing device 800 instead of the processing device 702. In addition, the distance measurement device 10F is different from the distance measurement device 10D in that the distance measurement device 10F has a reception device 802 instead of the reception device 608. Furthermore, the distance measurement device 10F is different from the distance measurement device 10D in that the distance measurement device 10F has a finder unit 804 instead of the imaging unit 700.

The processing device 800 is different from the processing device 702 in that the processing device 800 does not have the picture processing unit 82, the picture memory 84, the display control unit 88, the imaging element driver 104, the picture signal processing circuit 106, and the media I/F 108.

The reception device 802 is different from the reception device 608 in that the reception device 802 does not have the release button 20B and the imaging system operating mode switching button 20D.

The finder unit 804 is different from the imaging unit 700 in that the finder unit 804 has an observation optical system 806 instead of the imaging element 60. The observation optical system 806 is an optical system realizing an optical finder function that causes the user to visually recognize the subject image as an optical image. The observation optical system 806 has an ocular lens 806A. The ocular lens 806A receives the subject light passing the image formation optical system 626 as the subject image. The subject image that is indicated by the subject light received by the ocular lens 806A is visually recognized by the user through the ocular lens 806A.

In the distance measurement device 10F, the main control unit 80, in the case of controlling the image shake reduction unit 63 and the laser shake reduction unit 33 at the same time, executes the position variation reduction process to control the image shake reduction unit 63 and the laser shake reduction unit 33.

Accordingly, the distance measurement device 10F can reduce the shift phenomenon even if the observation optical system 806 is employed instead of the imaging element 60, compared with the case of not using the image shake reduction unit 63. In addition, the distance measurement device 10F, with a simple configuration, can cause the user to visually recognize the subject image with the reduced shift phenomenon, compared with the case of not using the finder unit 804.

While the example illustrated in FIG. 25 illustrates the case of the user visually recognizing the subject image through only the observation optical system 806, the technology of the present disclosure is not limited thereto. For example, an electronic finder function by the electronic viewfinder 22 and the optical finder function by the observation optical system 806 may be selectively used in accordance with an input on a switch (not illustrated). In this case, for example, switching a liquid crystal shutter (not illustrated) between a light blocking state and a light non-blocking state in accordance with an input on the switch by the user causes the user to visually recognize an electronic image by the electronic finder function and an optical image by the optical finder function alternately.

While above each embodiment illustrates the case of not displaying a target mark, the technology of the present disclosure is not limited thereto. For example, a target mark that follows a specific subject on the live view image may be displayed in an overlaid manner on the live view image.

While above each embodiment illustrates the case of displaying the picture on the electronic viewfinder 22, the technology of the present disclosure is not limited thereto. For example, the picture may be displayed on a display unit of an external device that is used as being connected to the distance measurement device 10A. One example of the display unit of the external device that is used as being connected to the distance measurement device 10A is exemplified by a display unit of a smart device, a display unit of a personal computer (PC), or a display unit of a glass type or wristwatch type wearable terminal device.

While above each embodiment illustrates the case of displaying the distance calculated by the distance measurement control unit 86 in the actual measurement period in an overlaid manner on the live view image (refer to FIG. 26), the technology of the present disclosure is not limited thereto. For example, the distance calculated by the distance measurement control unit 86 in the actual measurement period may be displayed on a different display unit (for example, a liquid crystal display) from the electronic viewfinder 22. The display unit is not required to be disposed in the distance measurement device 10A and may be, for example, a display unit of an external device that is used as being connected to the distance measurement device 10A. One example of the external device that is used as being connected to the distance measurement device 10A is exemplified by a display unit of a smart device, a display unit of a PC, or a display unit of a glass type or wristwatch type wearable terminal device.

The distance calculated by the distance measurement control unit 86 in the actual measurement period may be displayed on a light transmitting display (not illustrated) that is disposed in an overlaid manner on the observation optical system 806. In this case, the user can visually recognize the distance as the distance measurement result while visually recognizing the subject image.

A display form of display of the distance is not limited to visible display and may be audible display by audio output from an audio reproduction device, may be permanent visible display by a printed matter, or may be a combination of two or more of visible display, audible display, and permanent visible display.

While above each embodiment describes the case of the reception device 20 having the distance measurement instruction button 20A and the release button 20B, an instruction to initiate distance measurement and an instruction to initiate imaging may be received by one button. In addition, an instruction to initiate distance measurement and an instruction to initiate imaging may be received by a reception device of an external device that is used as being connected to the distance measurement device 10A. One example of the external device that is used as being connected to the distance measurement device 10A is exemplified by a reception device of a smart device, a reception device of a PC, or a reception device of a glass type or wristwatch type wearable terminal device.

While above each embodiment illustrates the case of providing an instruction to image a still picture and an instruction to image a motion picture to the distance measurement device 10A by pushing the release button 20B, the technology of the present disclosure is not limited thereto. For example, an instruction to image a still picture and an instruction to image a motion picture may be provided to the distance measurement device 10A in the case of an ocular detection unit (not illustrated) detecting an eye portion of the user approaching the electronic viewfinder 22.

While above each embodiment illustrates the case of variation of the optical axes P and L1 due to the hand shake, a cause of variation of the optical axes P and L1 is not limited to the hand shake. For example, in the case of the distance measurement device 10A being mounted in a vehicle, transmission of vibration of the vehicle may vary the optical axes P and L1. In addition, the optical axes P and L1 may vary due to transmission of vibration to the distance measurement device 10A from an external device (not illustrated) that is used as being connected to the distance measurement device 10A. Furthermore, the optical axes P and L1 may vary due to vibration of an internal device (for example, a motor) that is mounted in the distance measurement device 10A.

While above each embodiment illustrates laser light as light for distance measurement, the technology of the present disclosure is not limited thereto, and directional light that is light having directivity may be used. For example, directional light that is acquired by a light emitting diode (LED) or a super luminescent diode (SLD) may be used. The directivity of the directional light is preferably directivity of approximately the same degree as the directivity of the laser light and is preferably directivity that can be used in measuring distance in, for example, a range of a few meters to a few kilometers.

Figure 27:
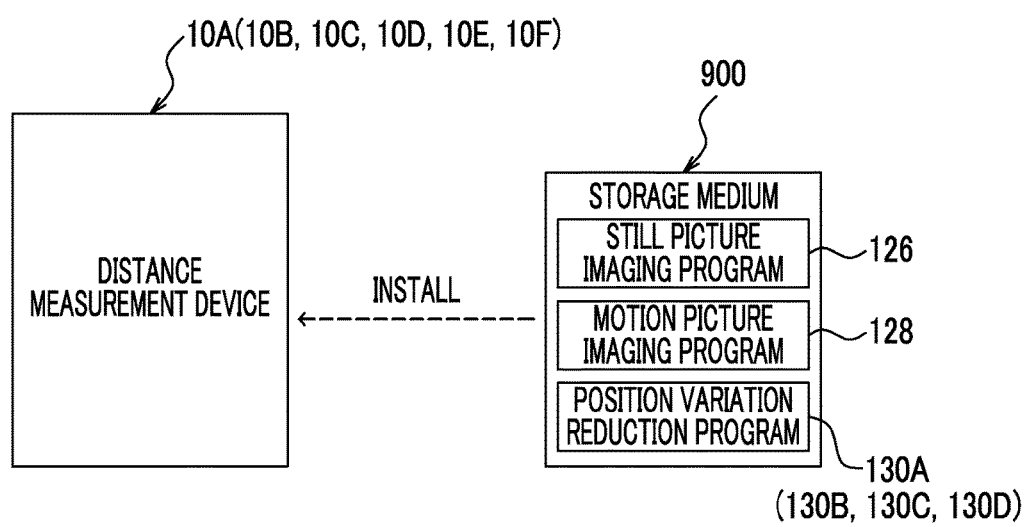
FIG. 27 is a conceptual diagram illustrating one example of a form of installation of a program according to an embodiment on the distance measurement device from a storage medium storing the program.

While above each embodiment illustrates the case of reading various programs from the ROM 124, the programs are not required to be stored in the ROM 124 from the beginning. For example, as illustrated in FIG. 27, the still picture imaging program 126, the motion picture imaging program 128, and the position variation reduction program 130A (130B, 130C, or 130D) (hereinafter, referred to as a "program") may be stored first in any portable type storage medium 900 such as a solid state drive (SSD), a Universal Serial Bus (USB) memory, or a magneto-optical disk that is used as being connected to the distance measurement device 10A, 10B, 10C, 10D, 10E, or 10F (hereinafter, referred to as the "distance measurement device 10A or the like"). In this case, the program stored in the storage medium 900 may be installed on the distance measurement device 10A or the like, and the installed program may be executed by the CPU 120. In addition, the program may be stored in a storage unit of another computer, server apparatus, or the like that is connected to the distance measurement device 10A through a communication network (not illustrated), and the program may be downloaded in response to a request of the distance measurement device 10A or the like. In this case, the downloaded program is executed by the CPU 120.

The still picture imaging process (refer to FIG. 11), the motion picture imaging process (refer to FIG. 12), and the position variation reduction process (refer to FIG. 13) described in above each embodiment are merely one example. Accordingly, to the extent not departing from the gist, steps that are not required may be removed, new steps may be added, or the process order may be changed. In addition, each process included in the motion picture imaging process and the position variation reduction process may be realized by only a hardware configuration such as ASIC or may be realized by a combination of a software configuration using a computer and a hardware configuration.

The entire content of the disclosure of Japanese Patent Application No. 2015-057911 filed on Mar. 20, 2015 is incorporated in the present specification by reference.

All literature, patent applications, and technical standards disclosed in the present specification are incorporated in the present specification by reference to the same extent as in the case of specific and individual incorporation of each of the literature, patent applications, and technical standards by reference.

What is claimed is:

1. A distance measurement device comprising:
   a light receiving section that receives reflective light from a subject as a subject image through an image formation optical system;
   an emission unit that has a light emitting element emitting directional light which is light having directivity, and emits the directional light toward the subject on a different optical path from an optical path of the image formation optical system;
   a detection unit that detects variation exerted on the device;
   a first reduction unit which performs image shake reduction, that is any of a single mechanism and a subject image processing unit and reduces, based on a detection result of the detection unit, influence of variation of an optical axis of the image formation optical system on the subject image received as light by the light receiving section;
   a second reduction unit which performs laser shake reduction, that reduces variation of an optical axis of the directional light with respect to the subject based on the detection result of the detection unit; and
   a control unit that, in a case of operating the first reduction unit and the second reduction unit at the same time, controls the first reduction unit and the second reduction unit to reduce variation of an irradiation position of the directional light in the subject image received as light by the light receiving section; wherein
   the control unit controls the first reduction unit to reduce influence of variation of the optical axis of the image formation optical system on the subject image with a first reduction amount determined in accordance with the detection result of the detection unit and a reduction result of the first reduction unit and, in the case of operating the first reduction unit and the second reduction unit at the same time, controls the second reduction unit to reduce variation of the optical axis of the directional light with respect to the subject with a second reduction amount determined in accordance with the reduction result of the first reduction unit and a reduction result of the second reduction unit; and wherein the distance measurement device further comprises a view angle changing unit that changes an angle of view of the subject image, wherein the first reduction amount is determined in accordance with the detection result of the detection unit, the reduction result of the first reduction unit, and an amount of change in the angle of view by the view angle changing unit.

2. The distance measurement device according to claim 1, wherein the control unit controls the first reduction unit to reduce influence of variation of the optical axis of the image formation optical system on the subject image with a first reduction amount determined in accordance with the detection result of the detection unit and a reduction result of the first reduction unit and, in the case of operating the first reduction unit and the second reduction unit at the same time, controls the second reduction unit to reduce variation of the optical axis of the directional light with respect to the subject with a second reduction amount determined in accordance with the detection result of the detection unit and a reduction result of the second reduction unit.

3. The distance measurement device according to claim 1, wherein the control unit, based on the first reduction amount acquired by change in the angle of view by the view angle changing unit, the second reduction amount, an allowed range of the first reduction amount, an allowed range of the second reduction amount, an operable range of the first reduction unit, and an operable range of the second reduction unit, controls the first reduction unit to reduce influence of variation of the optical axis of the image formation optical system on the subject image and controls the second reduction unit to reduce variation of the optical axis of the directional light with respect to the subject.

4. The distance measurement device according to claim 1, wherein the single mechanism is a first anti-shake lens mechanism that includes a first anti-shake lens disposed on the optical path of the image formation optical system and a first lens variation mechanism varying the first anti-shake lens.

5. The distance measurement device according to claim 1, wherein the subject image processing unit is a subject image processing unit that processes the subject image by performing signal processing for the subject image.

6. The distance measurement device according to claim 1, wherein the second reduction unit is at least one of a second anti-shake lens mechanism that includes a second anti-shake lens disposed on a different optical path from the optical path of the image formation optical system and a second lens variation mechanism varying the second anti-shake lens, or a light emitting element variation mechanism that varies the light emitting element.

7. The distance measurement device according to claim 1, wherein the control unit, during operation of the first reduction unit, controls the second reduction unit to reduce variation of the optical axis of the directional light with respect to the subject within a range of a reduction amount of the first reduction unit.

8. The distance measurement device according to claim 1, wherein the control unit, during operation of the first reduction unit, controls the second reduction unit not to operate the second reduction unit outside of a distance measurement operation period and to operate the second reduction unit within the distance measurement operation period.

9. The distance measurement device according to claim 1, wherein the control unit, during operation of the first reduction unit, controls the second reduction unit to reduce operation of the second reduction unit in a case of working of a scan distance measurement function that measures distance while scanning the directional light.

10. The distance measurement device according to claim 1, wherein the image formation optical system has a zoom lens, and
the control unit, in a case of change in an angle of view by movement of the zoom lens, performs a control to maintain, before and after change in the angle of view, an irradiation position of the directional light in the subject image received as light by the light receiving section.

11. The distance measurement device according to claim 1, wherein the light receiving section is an observation optical system.

12. The distance measurement device according to claim 11, wherein the control unit, in a case of operating the single mechanism and the second reduction unit at the same time, controls the single mechanism and the second reduction unit to reduce variation of an irradiation position of the directional light in the subject image received as light by the observation optical system.

13. The distance measurement device according to claim 1, wherein the light receiving section is an imaging element that picks up the subject image.

14. The distance measurement device according to claim 13, wherein the single mechanism is an imaging element variation mechanism that varies the imaging element.

15. The distance measurement device according to claim 13, wherein the control unit controls the single mechanism and the subject image processing unit to operate the single mechanism as the first reduction unit in a case of imaging a still picture by the imaging element and to operate the subject image processing unit as the first reduction unit in a case of imaging a motion picture by the imaging element.

16. The distance measurement device according to claim 13, wherein the control unit, during operation of the first reduction unit, controls the second reduction unit to operate the second reduction unit per interval that is determined in accordance with a frame rate of a picture imaged and acquired by the imaging element.

17. The distance measurement device according to claim 13, wherein the control unit controls a display unit that displays a picture imaged and acquired by the imaging element, to display, in a display region of the picture, a distance measurement result that is acquired based on a round-trip time of the directional light emitted toward the subject by the emission unit.

18. A distance measurement control method for a distance measurement device comprising:
a light receiving section that receives reflective light from a subject as a subject image through an image formation optical system;
an emission unit that has a light emitting element emitting directional light which is light having directivity, and emits the directional light toward the subject on a different optical path from an optical path of the image formation optical system;
a detection unit that detects variation exerted on the device;

a first reduction unit which performs image shake reduction, that is any of a single mechanism and a subject image processing unit and reduces, based on a detection result of the detection unit, influence of variation of an optical axis of the image formation optical system on the subject image received as light by the light receiving section;

a second reduction unit which performs laser shake reduction, that reduces variation of an optical axis of the directional light with respect to the subject based on the detection result of the detection unit; and a control unit;

the method comprising:

in a case of operating the first reduction unit and the second reduction unit included in the distance measurement device at the same time, controlling the first reduction unit and the second reduction unit to reduce variation of an irradiation position of the directional light in the subject image received as light by the light receiving section; wherein the control unit controls the first reduction unit to reduce influence of variation of the optical axis of the image formation optical system on the subject image with a first reduction amount determined in accordance with the detection result of the detection unit and a reduction result of the first reduction unit and, in the case of operating the first reduction unit and the second reduction unit at the same time, controls the second reduction unit to reduce variation of the optical axis of the directional light with respect to the subject with a second reduction amount determined in accordance with the reduction result of the first reduction unit and a reduction result of the second reduction unit; and wherein the distance measurement device further comprises a view angle changing unit that changes an angle of view of the subject image, wherein the first reduction amount is determined in accordance with the detection result of the detection unit, the reduction result of the first reduction unit, and an amount of change in the angle of view by the view angle changing unit.

19. A non-transitory computer readable medium storing a program that causes a computer to execute a process to control a distance measurement device, the distance measurement device comprising:

a light receiving section that receives reflective light from a subject as a subject image through an image formation optical system;

an emission unit that has a light emitting element emitting directional light which is light having directivity, and emits the directional light toward the subject on a different optical path from an optical path of the image formation optical system;

a detection unit that detects variation exerted on the device;

a first reduction unit which performs image shake reduction, that is any of a single mechanism and a subject image processing unit and reduces, based on a detection result of the detection unit, influence of variation of an optical axis of the image formation optical system on the subject image received as light by the light receiving section; and a second reduction unit which performs laser shake reduction, that reduces variation of an optical axis of the directional light with respect to the subject based on the detection result of the detection unit; and a control unit;

the process comprising:

in a case of operating the first reduction unit and the second reduction unit included in the distance measurement device at the same time, controlling the first reduction unit and the second reduction unit to reduce variation of an irradiation position of the directional light in the subject image received as light by the light receiving section; wherein the control unit controls the first reduction unit to reduce influence of variation of the optical axis of the image formation optical system on the subject image with a first reduction amount determined in accordance with the detection result of the detection unit and a reduction result of the first reduction unit and, in the case of operating the first reduction unit and the second reduction unit at the same time, controls the second reduction unit to reduce variation of the optical axis of the directional light with respect to the subject with a second reduction amount determined in accordance with the reduction result of the first reduction unit and a reduction result of the second reduction unit; and wherein the distance measurement device further comprises a view angle changing unit that changes an angle of view of the subject image, wherein the first reduction amount is determined in accordance with the detection result of the detection unit, the reduction result of the first reduction unit, and an amount of change in the angle of view by the view angle changing unit.

\* \* \* \* \*